(12) United States Patent
Komatsu et al.

(10) Patent No.: US 9,202,328 B2
(45) Date of Patent: Dec. 1, 2015

(54) AUTHENTICATION VERIFYING METHOD, AUTHENTICATION VERIFYING MEMBER AND AUTHENTICATION VERIFYING MEMBER PRODUCING METHOD

(75) Inventors: Nobuaki Komatsu, Tokyo (JP); Shin-ichiro Nanjo, Tokyo (JP); Tomoko Ito, Tokyo (JP)

(73) Assignee: INTERNATIONAL FRONTIER TECHNOLOGY LABORATORY, INC., Tokyo (JP)

( * ) Notice: Subject to any disclaimer, the term of this patent is extended or adjusted under 35 U.S.C. 154(b) by 157 days.

(21) Appl. No.: 12/745,629

(22) PCT Filed: Nov. 18, 2008

(86) PCT No.: PCT/JP2008/070894
§ 371 (c)(1),
(2), (4) Date: Jun. 1, 2010

(87) PCT Pub. No.: WO2009/072387
PCT Pub. Date: Jun. 11, 2009

(65) Prior Publication Data
US 2010/0306532 A1     Dec. 2, 2010

(30) Foreign Application Priority Data
Dec. 3, 2007    (JP) ................................ 2007-312861

(51) Int. Cl.
*H04L 29/06* (2006.01)
*G07D 7/00* (2006.01)
(Continued)

(52) U.S. Cl.
CPC ............ *G07D 7/0093* (2013.01); *G07D 7/0033* (2013.01); *G07D 7/121* (2013.01); *G09C 5/00* (2013.01); *H04L 9/3263* (2013.01)

(58) Field of Classification Search
CPC ........................ H04L 63/0823; H04L 9/3294
USPC .......................................... 713/156; 726/2, 4
See application file for complete search history.

(56) References Cited

U.S. PATENT DOCUMENTS 6,240,516 B1 *   5/2001   Vainsencher ................. 713/190
6,450,536 B1     9/2002   Chen et al.
(Continued)

FOREIGN PATENT DOCUMENTS

CA    2 332 350 A1   11/1999
JP    8-289159 A     11/1996
(Continued)

OTHER PUBLICATIONS

International Search Report of PCT/JP2008/070894, Mailing Date of Feb. 17, 2009.
(Continued)

*Primary Examiner* — Anthony Brown
(74) *Attorney, Agent, or Firm* — Westerman, Hattori, Daniels & Adrian, LLP

(57) ABSTRACT

Authentication verifying for an object to be certified is carried out. An authentication verifying chip in which authentication verifying information is stored is mounted non-removably on a certificate. A confirmation chip in which the authentication verifying information is encrypted by a crypt key of a certificate issuer and is stored is mounted non-removably on the object to be certified. When verifying the authenticity of the object to be certified, the encrypted authentication verifying information in the confirmation chip is decrypted by the crypt key of the certificate issuer, and it is compared to the authentication verifying information in the authentication verifying chip.

13 Claims, 35 Drawing Sheets

(51) Int. Cl.
*G07D 7/12* (2006.01)
*G09C 5/00* (2006.01)
*H04L 9/32* (2006.01)

(56) References Cited

U.S. PATENT DOCUMENTS

| | | | |
|---|---|---|---|
| 2002/0023218 A1* | 2/2002 | Lawandy et al. | 713/176 |
| 2003/0163719 A1* | 8/2003 | Ebihara | 713/193 |
| 2004/0104273 A1 | 6/2004 | Nakamura | |
| 2005/0146006 A1* | 7/2005 | Yamazaki et al. | 257/679 |
| 2007/0005367 A1 | 1/2007 | DeJean et al. | |

FOREIGN PATENT DOCUMENTS

| | | |
|---|---|---|
| JP | 10-044650 A | 2/1998 |
| JP | 2000-11114 A | 1/2000 |
| JP | 2000-011114 A | 1/2000 |
| JP | 2001-518414 A | 10/2001 |
| JP | 2003-029636 A | 1/2003 |
| JP | 08-289159 A | 2/2012 |
| RU | 2 263 967 C2 | 11/2002 |
| WO | 99/60534 A1 | 11/1999 |
| WO | 2007-072793 A1 | 6/2007 |
| WO | 2007-072794 A1 | 6/2007 |
| WO | 2007-072795 A1 | 6/2007 |
| WO | 2007-072796 A1 | 6/2007 |

OTHER PUBLICATIONS

Russian Office Action dated Sep. 19, 2012, issued in corresponding Russian Patent Application No. 2010127253, with English translation (5 pages).

* cited by examiner (a)  (b)

AUTHENTICATION VERIFYING METHOD, AUTHENTICATION VERIFYING MEMBER AND AUTHENTICATION VERIFYING MEMBER PRODUCING METHOD

FIELD OF THE INVENTION

The present invention relates to an authentication judging method of an object, which is often counterfeited and/or forged, and for which authentication verification is needed to find out as to whether the object is counterfeited or not. The invention also relates to a member used for the authentication judging and a reading device for reading a chip to be used for the authentication judging.

BACKGROUND ART

Commodities manufactured by influential manufacturers, so-called big-name brands are often produced and sold by just copied or in similar form with brand names by others. This distribution of the false brand-name products in the market creates big social problem. Among the false brand-name products, some of them can be identified at a first glance that they are not authentic products, while some are manufactured so elaborately that it is often difficult to identify that these products are not authentic.

Also, in some area, consumers are not very conscious in recognizing that the false brand-name products are illegitimate products, and the false brand-name products are distributed in the market while people know that these are false brand-name products. In recent years, more and more such types of false brand-name products are increasingly sold directly to the consumers via Internet not through the distribution channel.

Further, there are cases where a stolen vehicle is, while its registered vehicle number is altered, exported overseas, asserting that it is not a stolen vehicle.

To cope with such situations, the manufacturers or the sellers of authentic products prepare a certificate to certify that it is an authentic product and delivers the certificate together with the product to the purchaser. In the worst case, however, the certificate itself is forged.

Another method to prevent the forgery is to attach a tag with an embossed hologram, which is difficult to copy, to the authentic product to facilitate the confirmation of the product being authentic. However, the copying of the hologram tag is merely very difficult, and it is far from impossible to copy.

Moreover, the confirmation of the hologram is checked by visual inspection, i.e., by human sense. Because the confirmation is made by human sense, there are variations due to the ability of each individual to confirm. And further, even in case of the same person, there may be variation due to environmental conditions, psychological conditions, or physical conditions, and accordingly, its reliability is not high.

Further, when a skillfully falsified hologram is mounted on a product, it is almost impossible to confirm the authenticity of the product by human ability.

It is also practiced that an IC chip is attached on an authentic product, and the authenticity is confirmed by the digital data stored in the IC chip. However, by reading the digital data stored in the correct IC chip and by writing this in another IC chip, it is not very difficult to falsify the IC chip for confirmation.

Japanese Patent Laid-Open Publication No. H10-44650 discloses an authentication verifying chip, which verifies the authenticity of a card by using metal granules mixed in a transparent medium.

Japanese Patent Laid-Open Publication No. 2003-29636 discloses another authentication verifying chip to verify the authenticity of a card by using fibers mixed in a transparent medium.

A method to verify the authenticity of a card automatically and not by human sense is described in the International Patent Publication WO2007/072793 filed by the applicant of the present invention.

An authentication verifying chip, an authentication verifying method and an authentication verifying device to verify the authenticity of a card by using an embossed hologram are described in the International Patent Publication WO2007/072794 filed by the applicant of the present invention.

An authentication verifying chip, an authentication verifying method and an authentication verifying device to verify the authenticity of a card by using fluorescent granules are described in the International Patent Publication WO2007/072795 filed by the applicant of the present invention.

An authentication verifying chip, an authentication verifying method and an authentication verifying device to verify the authenticity of a card by using radioactive granules are described in the International Patent Publication WO2007/072796 filed by the applicant of the present invention.

According to these prior inventions, it is possible to verify the authenticity of a card where authentication verifying chip is mounted. It is based on the assumption that the authentication verifying chip can be mounted, and that digital data of the authentication verifying chip thus mounted can be read.

However, it is actually impossible to mount an authentication verifying chip, where the digital data therein can be read, on a product, which is an object for the falsification. Thus, the technique to verify the authenticity of a product is not practically realized.

[Patent Document 1] Japanese Patent Laid-Open Publication No. H10-44650
[Patent Document 2] Japanese Patent Laid-Open Publication No. 2003-29636
[Patent Document 3] International Patent publication WO2007/072793
[Patent Document 4] International Patent publication WO2007/072794
[Patent Document 5] International Patent publication WO2007/072795
[Patent Document 6] International Patent publication WO2007/072796

DISCLOSURE OF THE INVENTION

Object of the Invention

The present invention provides a method to easily and reliably distinguish an authentic object from a falsified illegitimate object and to certify the verification of the object thus distinguished. The invention also provides verification means to be used in this method, and a method for producing the verification means.

According to the invention of the present application, an authentication verifying chip having copy-unable authentication verifying information is non-removably mounted on a certificate issued by the authorities, which are authorized to issue the certificate. Then, the authentication verifying information of the authentication verifying chip is read as digital data, the digital data is encrypted by using a crypt key of the authorities, the encrypted digital data is stored in a storage medium such as an RFID chip and the storage medium is non-removably mounted on an authentic object to be certified such as a commodity.

In order to confirm whether the object to be certified is authentic or not, the encrypted digital data is read from the storage medium non-removably mounted on the object to be certified, the encrypted digital data thus read is decrypted by using a crypt key, the information on the authentication verifying chip mounted on the certificate is read as digital data, and by comparing the digital data decrypted from the storage medium of the object to be certified with the digital data read from the certificate, what the certificate corresponds to the object to be certified is confirmed.

Otherwise, it may be so arranged that, without decrypting the encrypted digital data, the digital data read from the certificate is encrypted by using a crypt key of the authorities, and the encrypted digital data is compared with the encrypted digital data stored in the storage medium mounted on the object to be certified.

Also, a storage medium is mounted on the certificate, the information of the authentication verifying chip is encrypted by a crypt key of the authorities and is stored in the storage medium of the certificate. As a result, it is possible to verify the authenticity of the certificate itself.

In case of the above, the crypt key used for encrypting the data to be stored in the storage medium of the certificate and the crypt key used for encrypting the data to be stored in the storage medium of the object to be certified may be the same or different from each other.

Also, an authentication verifying chip is mounted on the object to be certified and a storage medium where the encrypted digital data is stored is mounted on the certificate, and the authentication verifying information of the object to be certified is confirmed by using the encrypted digital data stored in the storage medium mounted on the certificate. The information of the authentication verifying chip mounted on the certificate is confirmed by using the encrypted digital data stored in the storage medium mounted on the object to be certified. As a result, it is possible to verify the mutual authenticity of the certificate and the object to be certified.

In case of the above, the crypt key used for encrypting the digital data to be stored in the storage medium, which is mounted on the certificate and the crypt key used for encrypting the digital data to be stored in the storage medium, which is mounted on the object to be certified, may be the same or different from each other.

Data such as a certificate number or the like may be added to the digital data before encrypting or after encrypting.

In a case where the storage medium has not a large capacity, the hashed value of the digital data is encrypted and stored.

The hash value is encrypted by a key of the authorities, and this can be used for the digital signature.

For the authentication verifying information, the following can be used: metal granules scattered in a transparent medium; fibers scattered in a transparent medium; embossed hologram of pits regularly arranged and formed by mere chance; embossed hologram of pits regularly arranged and arranged by random numbers; embossed hologram formed by scattering or by etching; multi-color embossed hologram of pits regularly arranged and formed by mere chance; multi-color embossed hologram of pits regularly arranged and arranged by random numbers; multi-color embossed hologram formed by scattering or by etching; fluorescent granules scattered in a transparent medium; radioactive granules scattered in a medium, iridescent substances regularly arranged and forming iridescence by mere chance; iridescent substances formed by scattering or iridescence formed by etching; or iridescent substance formed by coating.

In order to accurately read the authentication verifying information from the authentication verifying chip, the reading is controlled by using a mark for positioning, a line to start/finish the reading in moving direction, a line to indicate the end portion and a mark for synchronization.

The authentication verifying chip may be mounted partially on the certificate, or may be on the entire surface of the certificate.

In the latter case, the items described on the surface of the certificate may be used for controlling the reading.

When the storage medium is mounted on the certificate, it can be mounted inside the certificate in addition to the surface of the certificate.

To read the authentication verifying chip, there is means to use a camera or without using a camera.

When the camera is used, the combination of the lighting source and the camera is: a means to use a white lighting source and a color camera; a means to use a lighting source emitting the RGB lights simultaneously and a color camera; or a means to use a lighting source emitting the RGB lights alternately and a monochrome camera.

When not to use a camera, there are means to read under stopped condition by using a light emitting/detecting elements matrix with the same area as that of the authentication verifying chip; a means to read under moving condition by using a light emitting/detecting elements matrix with the same width as the authentication verifying chip and a means to read while scanning by a single light emitting/detecting element.

In addition to the mechanical scanning, there is a means using a cylindrical paraboloidal mirror and a polygonal pillar mirror.

The authentication verifying information of the authentication verifying chip is generally read as analog information, while it is necessary to convert it to digital data for the subsequent processing. In addition to the general analog/digital conversion process, the authentication verifying chip is divided to a plurality of overlapping regions, and the reading is carried out by determining the amount of information included in each region.

To produce a certificate, where the authentication verifying chip is mounted, authentication verifying information is formed over the entire surface of the original plate of the certificate corresponding to an area of a plurality of certificates. Then, these are divided to the size of each certificate.

The authentication verifying information may be formed all over the surface of the certificate or may be formed on a part of the certificate.

This method can be applied for producing the authentication verifying chip to be mounted on the certificate.

Advantages of the Invention

The encrypted digital data stored in the storage medium mounted on the object to be certified is decrypted. The decrypted digital data is compared with the digital data read from the authentication verifying chip mounted on the certificate. If the corresponding relation between the certificate and the object to be certified is confirmed, it is judged that the object to be certified is authentic. If the corresponding relation cannot be confirmed, it is judged that the object to be certified is not authentic.

When the encrypted digital data stored in the storage medium mounted on the object to be certified is read, if there is no crypt key used for encrypting, it cannot be decrypted to compare with the authentication verifying information of the authentication verifying chip. For this reason, only the one which is authorized and knows the crypt key can confirm the authenticity of the object to be certified. In other words, a person who cannot confirm the authenticity of the object to be certified is not an authorized person.

When the key used for the encryption of the encrypted digital data stored in the storage medium is not a correct one, even when the authorized person tries to decrypt by using a correct key, the encrypted digital data cannot be decrypted correctly. Those who know the correct key can specify that the object for which an illegitimate key has been used is a falsified object.

In a case where the encrypted digital data is mounted on the certificate, authenticity of the certificate can be confirmed.

Further, when copy-unable information is given on the object to be certified and its encrypted digital data is mounted on the certificate, the confirmation of the authenticity is further secured because the authenticity of the certificate and the object to be certified is confirmed with each other.

When configured by integrating the certificate and the object to be certified, it is possible to verify the authenticity of a card, which is often falsified, such as a bank card, a credit card, etc.

BRIEF DESCRIPTIONS OF THE DRAWINGS

FIG. 17 is a drawing to explain a method for preparing an authentication verifying chip of the unicolor embossed hologram based on the regular arrangement and random numbers;

BRIEF DESCRIPTIONS OF THE REFERENCE NUMERALS

Figure 1:
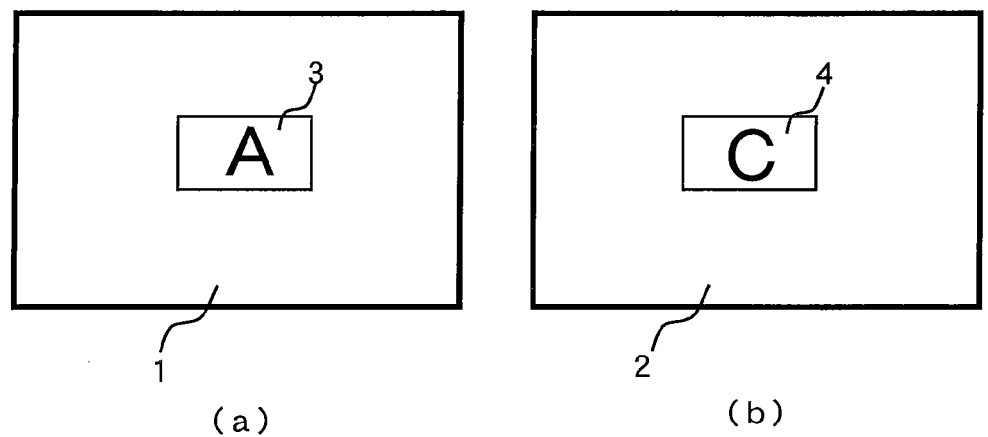
FIG. 1 shows Embodiment 1 of a certificate and an object to be certified using a crypt key.

1, 5, 11, 21, 31, 38: a certificate
2, 6, 12, 22, 32, 37: an object to be certified
3, 7, 13, 14, 23, 33, 38, 101, 103, 105, 107, 109, 111, 120, 130, 140, 145, 150, 180, 185, 190, 195, 200, 210, 222, 227, 231, 236, 241, 252, 253, 254: an authentication verifying chip
4, 8, 9, 15, 16, 24, 26, 34, 39, 102, 104, 106, 108, 110, 112: a confirmation chip
    25: a certificate number
121, 131, 143, 155, 161, 181: transparent resin
122: metal granules
132: fiber pieces
141, 147, 152, 153, 154, 187: a pit
142, 171, 186, 188, 196, 201: resin
144, 148, 156, 157, 158: a protruding
146, 151: a base plate
162: fluorescent granules
172: radioactive granules
182, 191, 192, 193: an iridescent piece
197, 202: a resin material
211: a mark for positioning
212: a line to start the reading in moving direction
213: a line to finish the reading in moving direction
214, 215: a line to indicate the end portion
216: a mark for synchronization
217: an authentication verifying carrier
220, 225, 230, 235, 240, 245, 250: a certificate
221, 251, 226: a base plate
223, 247, 252: a surface plate
224: letter information
238, 243: a frame
246: a resin material
253, 254: a confirmation chip
260: a card body
261: a base plate
263: a surface plate
262: an authentication verifying chip
264, 265, 273: a lighting source
266, 270, 271, 272: a camera
267: a red LED
268: a green LED
269: a blue LED
275: light emitting/detecting elements matrix
276: a light emitting/detecting element
278: a red light emitting/detecting elements array
279: a green light emitting/detecting elements array
280: a blue light emitting/detecting elements array
281: a light emitting/detecting element
285: a reflecting mirror having a parabolic cylinder
286: a hole
287: a light emitting/detecting element
288: a polygonal pillar mirror
289, 290: a reflecting mirror having a half-cylindrical paraboloid
300, 305, 310, 315: an original plate
302, 306, 321, 327: a certificate base plate with authentication verifying information
303: an information carrier
306, 311, 316, 326: a certificate base plate
307: an authentication verifying chip

DESCRIPTIONS OF THE INVENTION

Description will be given below on embodiments of the invention relating to the present patent application.

In the embodiments described below, cryptography technology is used. First, brief description will be given on the cryptography technology. The cryptosystem used in practical application is roughly classified in a secret-key cryptosystem and a public-key cryptosystem. In the invention of the present patent application, both of these cryptosystems can be used.

According to "Modern Cryptography" published by the Institute of Electronics, Information and Communication Engineers (Japan), a process to obtain enCrypted data [C] by Encrypting a plain text Message [M] by using a crypt Key K is expressed as $C=E(K, M)$ and a process to obtain a plain text message by Decrypting the enCrypted digital data [C] by using a crypt Key K is expressed as $M=D(K, C)$.

Here, according to this practice, a process to encrypt the plain text digital data [M] by using a Secret-Key (a common key) Ks of the secret-key cryptosystem to obtain the encrypted digital data [Cs] is expressed as $Cs=E(Ks, M)$ and a process to Decrypt the encrypted digital data [Cs] by using the Secret-Key Ks to obtain the plain text digital data [M] is expressed as $M=D(Ks, Cs)$.

Also, a process to encrypt the plain text digital data [M] by using a Public-Key Kp of the public-key cryptosystem to obtain the encrypted digital data [Cp] is expressed as $Cp=E(Kp, M)$, and a process to decrypt the encrypted digital data [Cp] by using a priVate-Key Kv to obtain the plain text digital data [M] is expressed as $M=D(Kv, Cp)$.

A process to encrypt the plain text digital data [M] by using a private-key Kv of the public-key cryptosystem to obtain the encrypted digital data [Cv] is expressed as $Cv=E(Kv, M)$, and a process to decrypt the encrypted digital data [Cv] by using a public-key Kp to obtain the digital data [A] is expressed as $A=D(Kp, Cv)$. Digital signature is carried out in this manner.

Now, referring to FIG. 1 to FIG. 14, description will be given below on a member to be used for authentication for an object to be certified, and on a process to judge the authentication.

<Embodiment 1 of the Authentication Member and the Authentication Process>

Figure 2:
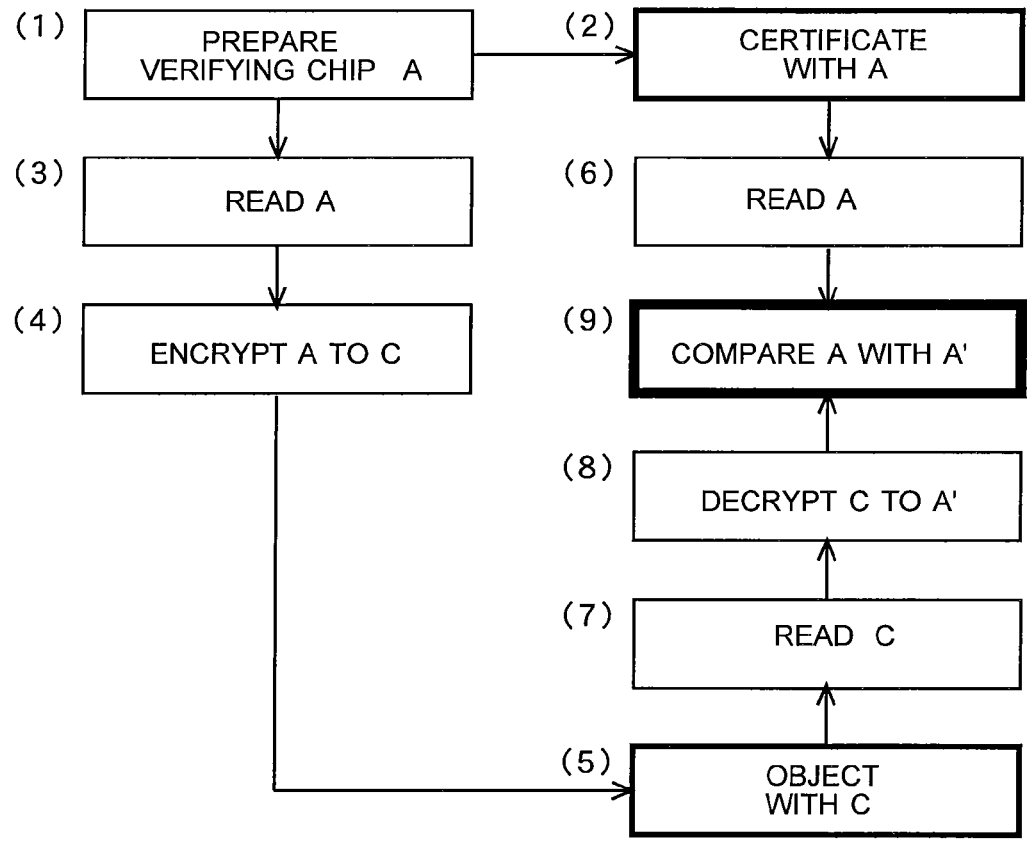
FIG. 2 is a flowchart to explain a process for verifying authenticity according to the certificate and the object to be certified of Embodiment 1.

Referring to FIG. 1 and FIG. 2, Embodiment 1 is described, which is a basic example of the authentication for the object to be certified. FIG. 1 shows a member to be used for the authentication, and FIG. 2 shows a process to verify the authentication by using these members.

The reference numeral 1 as shown in FIG. 1(*a*) represents a certificate to be used for the authentication, and the reference numeral 2 shown in FIG. 1(*b*) is an object to be certified such as a commodity.

On the certificate 1, an authentication verifying chip 3, which is prepared by the authorities, being authorized to certify, for example, a seller, is non-removably mounted on a certificate body. In the authentication verifying chip 3, copy-unable authentication verifying information [A] such as arti-fact-metrics is stored. This certificate 1 is issued by the authorities.

On the object 2 to be certified, an authentication confirmation chip 4 is non-removably mounted. The digital data of the authentication verifying information [A] of the authentication verifying chip 3 is encrypted to the encrypted data [C] by using a crypt key [K] of the authorities and is stored in the confirmation chip 4.

Referring to FIG. 2, a process of authentication verifying is described below.

(1) The authentication verifying chip 3 is prepared, in which the copy-unable authentication verifying information [A] is stored. Examples on the structure of the authentication verifying chip 3 will be explained below by referring to FIG. 14 to FIG. 26.

(2) The authentication verifying chip 3 is mounted in a non-removable structure to the certificate body, and a certificate 1 with the authentication verifying chip is obtained.

(3) The authentication verifying information [A] is read.

In case the authentication verifying information [A] is analog information, it is digitized, and the authentication verifying data is obtained.

In order to accurately read the authentication verifying information [A], it is desirable to read after the authentication verifying chip 3 is mounted on the certificate 1.

(4) The authentication verifying data [A] is encrypted by using the crypt key [K] of the authorities, and the encrypted authentication verifying data [C] is obtained.

(5) The encrypted authentication verifying data [C] is stored in the confirmation chip 4, and the confirmation chip 4 is non-removably mounted on a body of the object to be certified 2.

(6) When the authenticity of the object to be certified 2 is to be identified, the authentication verifying information [A] of the authentication verifying chip 3 mounted on the certificate 1 is read first. In case the authentication verifying information [A] is analog information, it is digitized.

(7) On the other hand, the encrypted authentication verifying data [C] is read, which is stored in the confirmation chip 4 mounted on the object to be certified 2.

(8) The encrypted authentication verifying data [C] is decrypted by using the crypt key of the authorities, and plain text authentication verifying data [A'] is obtained.

(9) The authentication verifying data [A'] as obtained and decrypted from the confirmation chip 4 is compared with the data obtained from the authentication verifying information [A] of the certificate 1.

As a result, if these are equal with each other, it is judged that the combination of the authentication verifying chip 3 of the certificate 1 and the confirmation chip 4 of the object to be certified 2 is valid, and it is verified that the object to be certified is authentic.

If these are different from each other, it is judged that the combination of the authentication verifying chip 3 of the certificate 1 and the confirmation chip 4 of the object to be certified 2 is invalid, and it is identified that the object to be certified is not authentic.

When the certificate where the authentication verifying chip is mounted is integrated with the object to be certified where the confirmation chip is mounted, the authenticity of the certificate (and the object to be certified) can be certified.

In the aforementioned embodiment, the data [A] as read from the authentication verifying chip 3 is compared with the data [A'] as decrypted from the confirmation chip 4. On the contrary, it may be so arranged that the encrypted authentication verifying data [C"] obtained by encrypting the authentication verifying data [A] read from the authentication verifying chip 3 is compared with the encrypted data [C] as read from the confirmation chip 4.

To set up the non-removable mounting structure of the authentication verifying chip and the confirmation chip, there are methods such as a method to adopt an integrated structure or a method to use welding. Instead of mounting the authentication verifying chip and the confirmation chip for the object to be certified, the information may be recorded on the certificate itself or on the object to be certified itself.

As the storage medium for the encrypted data [C], which is the confirmation chip, adequate means such as barcode, two-dimensional barcode of the optical reading and recording means, magnetic recording means, RFID tag, etc. may be adopted.

When an IC chip is used for the confirmation chip, a specific ID is added to this IC chip during the producing and when this specific ID is incorporated in the data for the authentication certifying, it is impossible to copy the confirmation chip 4.

If it is so designed that the crypt key is stored in a DRAM in an apparatus carring out the authentication verification, and the crypt key stored in the DRAM will be lost when the power to the apparatus is cut off because the apparatus is destroyed or stolen, the stealing of the crypt key can be prevented.

These points are common to the other embodiments. It is troublesome and useless to explain this in the other embodiments and detailed description will not be given in the other embodiments.

<Embodiment 2 of the Authentication Member and the Authentication Process>

If the certificate is not authentic, it is not possible to assert that the object to be certified is authentic. Description will be given now on the Embodiment 2 where it is possible to also confirm the authenticity of the certificate.

Figure 3:
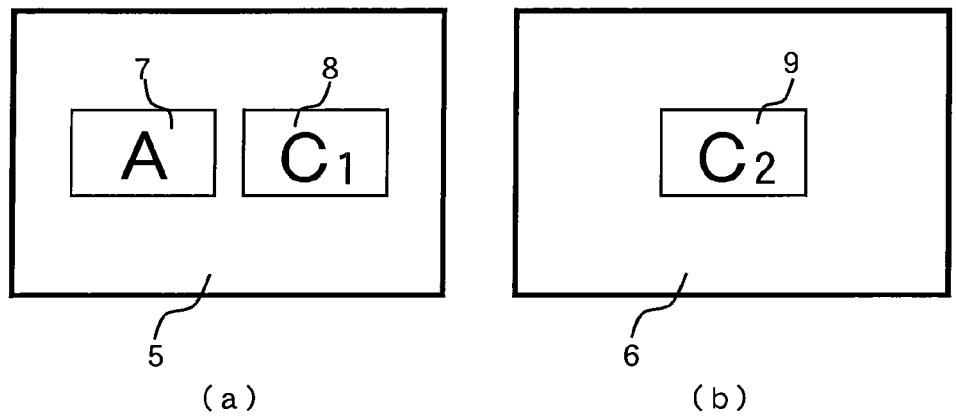
FIG. 3 shows Embodiment 2 of a certificate and an object to be certified using two crypt keys.
Figure 4:
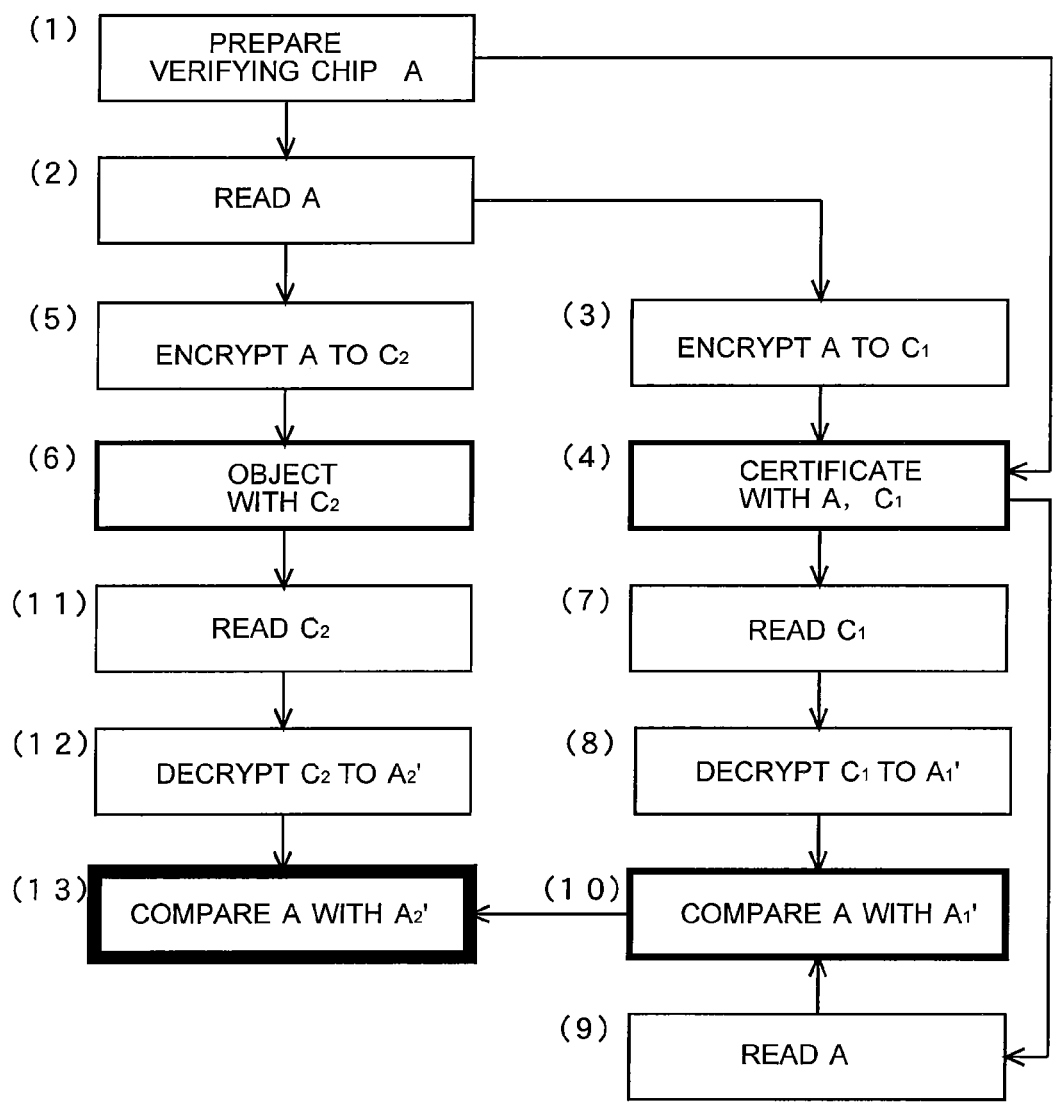
FIG. 4 is a flowchart to explain a process for verifying authenticity according to the certificate and the object to be certified of Embodiment 2.

FIG. 3 shows members to be used for the authentication, and FIG. 4 shows a process to verify the authentication by using these members.

FIG. 3(A) shows a certificate 5, which is referred for the authentication verification and FIG. 3(b) shows an object to be certified 6, such as a commodity which is the subject to the authentication verification.

On the certificate 5, an authentication verifying chip 7 and a confirmation chip 8 which are prepared by the authorities are mounted non-removably.

In the authentication verifying chip 7, copy-unable authentication verifying information [A] such as artifact-metrics is stored.

In the confirmation chip 8, encrypted data [C1], which is obtained by encrypting digital data of the authentication verifying information [A] by using a first crypt key [K1] of the authorities, is stored.

On the object to be certified 6, the confirmation chip 9 is non-removably mounted.

In the confirmation chip 9, encrypted data [C2], which is obtained by encrypting the digital data of the authentication verifying information [A] by using a second crypt key [K2] of the authorities, is stored.

It is desirable that the first crypt key [K1] is different from the second crypt key [K2], while the same key may be used to have simpler arrangement.

Now, description will be given on a process as shown in FIG. 4.

(1) An authentication verifying chip 7 is prepared, in which copy-unable authentication verifying information [A] is stored.

(2) The authentication verifying information [A] is read.

In case the authentication verifying information [A] is analog information, it is digitized and the verifying data is obtained.

In order to accurately read the authentication verifying information [A], it is desirable to read after the authentication verifying chip 7 is mounted on the certificate 5.

(3) The authentication verifying information [A] is encrypted by using a first crypt key [K1] of the authorities and the encrypted data [C1] is obtained, and it is stored in the confirmation chip 8.

(4) The authentication verifying chip 7 where the authentication verifying information [A] is stored and the confirmation chip 8 where the encrypted data [C1] is stored are mounted non-removably on a body of the certificate 5.

(5) On the other hand, the authentication verifying data [A] is encrypted by using s second crypt key [K2] of the authorities and the encrypted data [C2] is obtained, and this is stored in the confirmation chip 9.

In this case, different keys may be used as the first crypt key [K1] and the second crypt key [K2], or the same key may be used.

(6) The confirmation chip 9 where the encrypted data [C2] is stored is mounted non-removably on a body of the object to be certified 6.

(7) For the authentication verification for the object to be certified 6, the authenticity of the certificate 5 is identified at first. From the confirmation chip 8 on the certificate 5, the encrypted data [C1] is read.

(8) The encrypted data [C1] is decrypted by using the first crypt key [K1] of the authorities and the decrypted data [A1'] is obtained.

(9) The authentication verifying data [A] is read from the verifying chip 7 on the certificate 5.

(10) The decrypted data [A1'] thus decrypted is compared with the authentication verifying data [A].

As a result, if these are equal with each other, it is judged that the combination of the verifying chip 7 and the confirmation chip 8 is valid, and it is verified that the certificate 5 is authentic.

If these are different from each other, it is judged that the combination of the verifying chip 7 and the confirmation chip 8 is invalid, and it is identified that the certificate 5 is not authentic.

Next, the authenticity of the object to be certified is identified.

(11) For the authentication verification for the object to be certified 6, the encrypted data [C2] stored in the confirmation chip 9 is read.

(12) The encrypted data [C2] is decrypted by using the second crypt key [K2] of the authorities and decrypted data [A2'] is obtained.

(13) The decrypted data [A2'] of the confirmation chip 9 is compared with the authentication verifying data [A] of the verifying chip 7.

As a result, if these are equal with each other, it is judged that the combination of the authentication verifying chip 7 of the certificate 5 and the confirmation chip 9 of the object to be certified 6 is valid, and it is verified that the object to be certified 6 is authentic.

If these are different from each other, it is judged that the combination of the authentication verifying chip 7 of the certificate 5 and the confirmation chip 9 of the object to be certified 6 is invalid, and it is identified that the object to be certified 6 is not authentic.

The authentication verifying chip, the confirmation chip and the details relating to the confirmation chip are common to those described in the Embodiment 1, and further explanation is not given here.

The procedures of encryption and decryption, and the matters relating to controlling the crypt keys are the same as those described in the Embodiment 1, and detailed description is not given here.

<Embodiment 3 of the Authentication Member and the Authentication Process>

Figure 5:
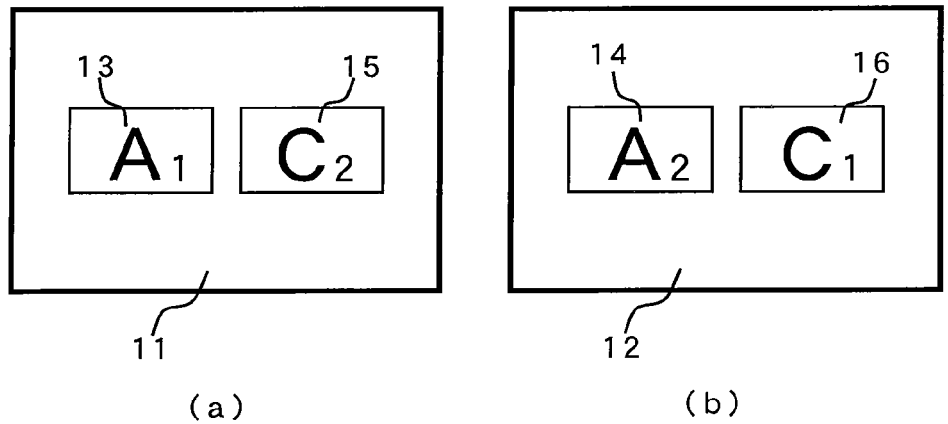
FIG. 5 shows Embodiment 3 of a certificate and an object to be certified using two crypt keys.
Figure 6:
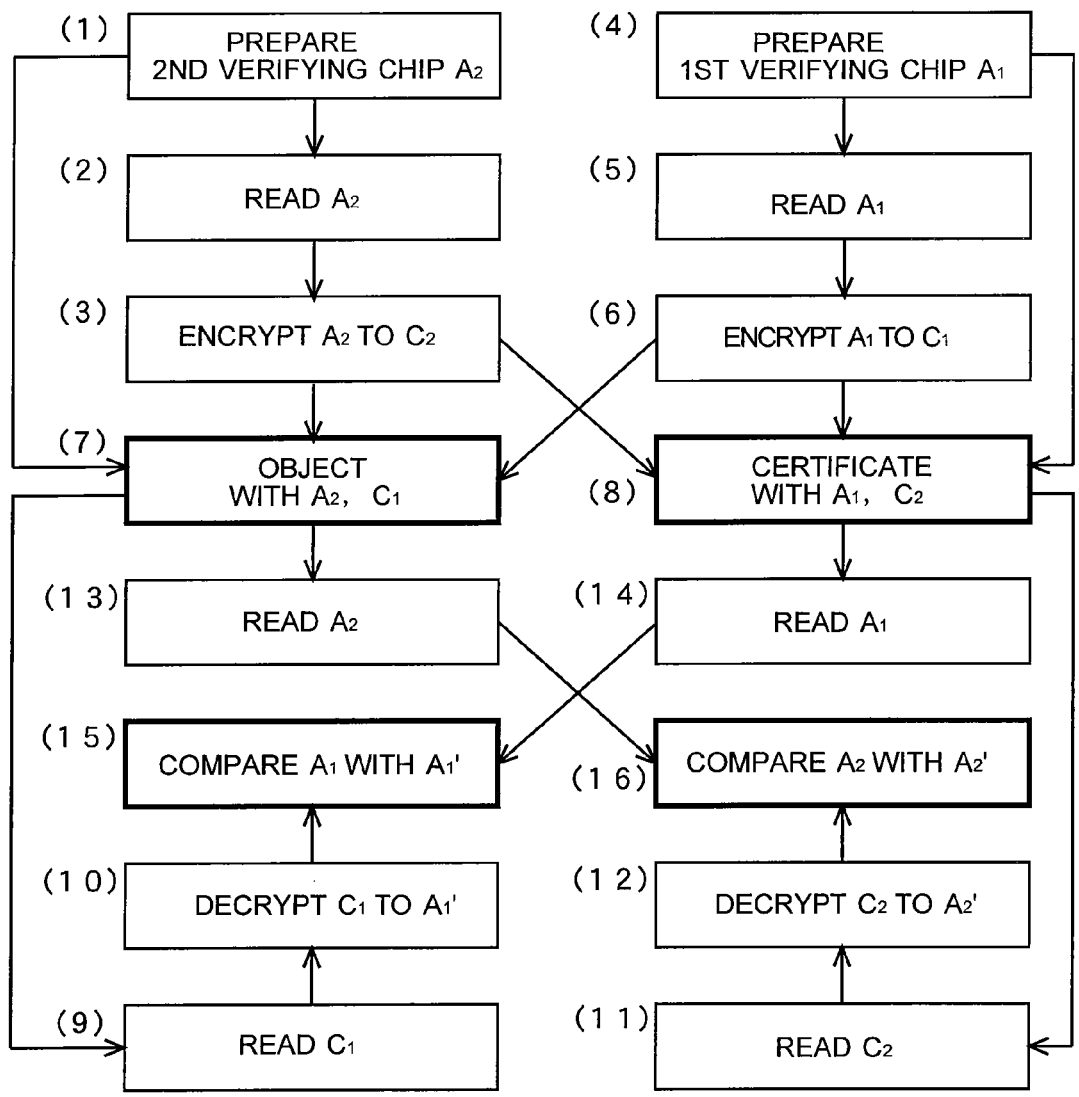
FIG. 6 is a flowchart to explain a process for verifying authenticity according to the certificate and the object to be certified of Embodiment 3.

In order to further secure the authentication verification, description will be given now on the Embodiment 3 to verify the authenticity of the certificate and the object to be certified by each other, referring to FIG. 5 and FIG. 6. FIG. 5 shows members to be used for the authentication verification. FIG. 6 shows a process to verify the authentication using these members.

FIG. 5(*a*) shows a certificate 11, which is referred for the authentication verification. FIG. 5(*b*) shows an object to be certified 12, such as a commodity which is the subject to the authentication verification.

On the certificate 11, a first authentication verifying chip 13 is non-removably mounted. In the first verifying chip 13, copy-unable first authentication verifying information [A1] such as artifact-metrics is stored.

On the object to be certified 12, a second authentication verifying chip 14 is non-removably mounted. In the second verifying chip 14, copy-unable second authentication verifying information [A2] such as artifact-metrics is stored.

On the certificate 11, a second confirmation chip 15 is further non-removably mounted. Digitized data [M2] of the second authentication verifying information [A2] of the object to be certified 12 is encrypted by using the crypt key [K2] of the authorities to the encrypted-by-second-crypt-key data [C2], and this is stored in the second confirmation chip 15.

On the object to be certified 12, a first confirmation chip 16 is further non-removably mounted. Digitized data [M1] of the first authentication verifying information [A1] of the certificate 11 is encrypted by using the crypt key [K1] of the authorities to the encrypted-by-first-crypt-key data [C1], and this is stored in the first confirmation chip 16.

It is desirable that the first crypt key [K1] is different from the second crypt key [K2], while the same key may be used to have simpler arrangement.

Description will be given now on a process for the authentication verification as shown in FIG. 6.

(1) The second authentication verifying chip 14 is prepared where the copy-unable second authentication verifying information [A2] is stored.

(2) The second authentication verifying information [A2] is read. In case the second authentication verifying information [A2] is analog image information, it is digitized to the second authentication verifying data [M2].

(3) The second authentication verifying data [M2] is encrypted by using the second crypt key [K2] of the authorities. The encrypted second data [C2] is obtained, and this is stored in the second confirmation chip 15.

(4) The first authentication verifying chip 13 is prepared where the copy-unable first authentication verifying information [A1] is stored.

(5) The first authentication verifying information [A1] is read. In case the first authentication verifying information [A1] is analog image information, it is digitized.

(6) The first authentication verifying data [A1] is encrypted by using the first crypt key [K1] of the authorities. The encrypted first data [C1] is obtained, and this is stored in the first confirmation chip 16.

In this case, different keys may be used as the first crypt key [K1] and the second crypt key [K2], or the same key may be used.

(7) The second verifying chip 14 and the first confirmation chip 16 are mounted in a non-removable structure on the object to be certified 12.

(8) The first authentication verifying chip 13 and the second confirmation chip 15 are mounted in a non-removable structure on the certificate 11.

(9) For the authentication verification for the object to be certified 12, the encrypted first data [C1], which is stored in the first confirmation chip 16 mounted on the object to be certified 12, is read first.

(10) Next, the encrypted first data [C1] is decrypted by using the first crypt key [K1] of the authorities and first plain text data [A1'] is obtained.

(11) On the other hand, the encrypted second data [C2], which is stored in the second confirmation chip 15 mounted on the certificate 11, is read.

(12) Next, the encrypted second data [C2] is decrypted by using the second crypt key [K2] of the authorities and second plain text data [A2'] is obtained.

(13) The first authentication verifying information [A1] of the first verifying chip 13 on the certificate 11 is read.

(14) The second authentication verifying information [A2] on the second verifying chip 14 on the object to be certified 12 is read.

(15) The first authentication verifying information [A1] of the certificate 11 is compared with the decrypted first data [A1'] of the object to be certified, and the second authentication verifying information [A2] of the object to be certified 12 is compared with the decrypted second data [A2'] of the certificate.

As a result, if these are equal with each other, it is judged that the combination of the first authentication verifying chip 13 of the certificate 11 and the first confirmation chip 16 of the object to be certified 12 and the combination of the second authentication verifying chip 14 of the object to be certified 12 and the second confirmation chip 15 of the certificate 11 are valid, and it is verified that the object to be certified is authentic.

If these are different from each other, it is judged that the combination of the first authentication verifying chip 13 of the certificate 11 and the first confirmation chip 16 of the object to be certified 12 and the combination of the second authentication verifying chip 14 of the object to be certified 12 and the second confirmation chip 15 of the certificate 11 are invalid, and it is identified that the object to be certified is not authentic.

The authentication verifying chip, the confirmation chip and matters relating to the confirmation chip are the same as those described in the Embodiment 1, and detailed description is not given here.

Also, the procedure of encryption and decryption and the matters relating to controlling the crypt keys are the same as those described in the Embodiment 1, and detailed description is not given here.

<Embodiment 4 of the Authentication Member and the Authentication Process>

Generally, the number added by the authorities is put on the certificate.

By adding the number of the certificate to the object to be certified, the relation between the object to be certified and the certificate can be identified. However, if the certificate number is shown on the object to be certified, the object to be certified can be easily forged. To cope with this problem, a chip where the encrypted certificate number is stored is mounted on the object to be certified in the embodiment as described below.

Figure 7:
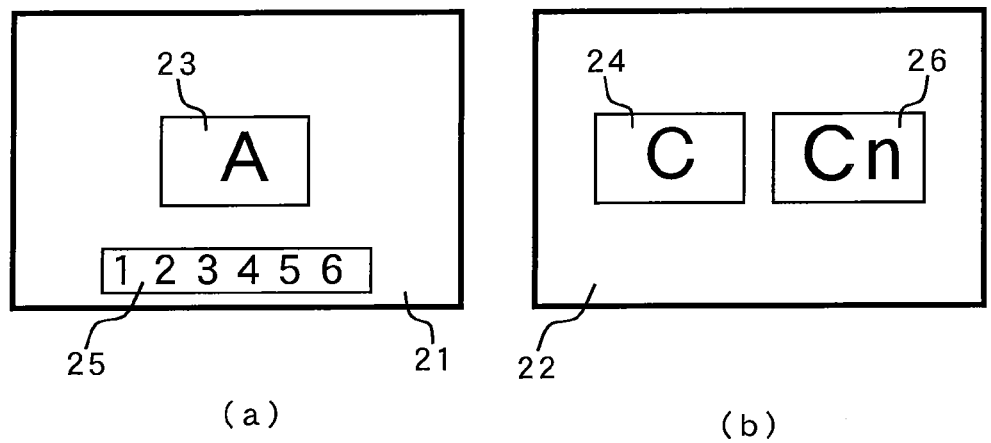
FIG. 7 shows Embodiment 4 of a certificate and an object to be certified using certificate data.
Figure 8:
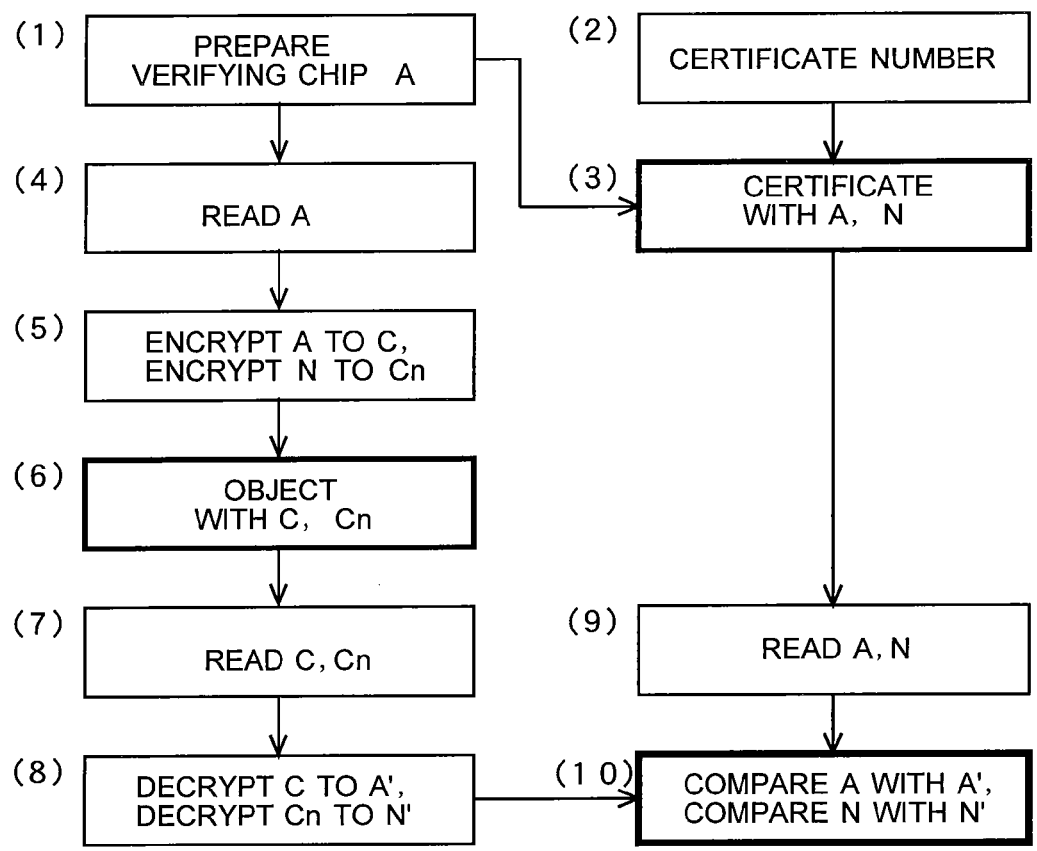
FIG. 8 is a flowchart to explain a process for verifying authenticity according to the certificate and the object to be certified of Embodiment 4.

FIG. 7 and FIG. 8 show the embodiment, in which the certificate number given to the certificate is used.

FIG. 7 shows members to be used for the authentication and FIG. 8 shows a process to verify the authentication by using these members.

FIG. 7(a) shows a certificate 21, which is referred for the authentication verification and FIG. 7(b) shows an object to be certified 22, such as a commodity which is the subject to the authentication verification.

On the certificate 21, an authentication verifying chip 23 is non-removably mounted and a specific certificate number 25 assigned by the authorities is non-removably further mounted.

In the authentication verifying chip 23, copy-unable authentication verifying information [A] such as artifact-metrics is stored.

On the object to be certified 22, a confirmation chip 24 is non-removably mounted. The authentication verifying information [A] stored in the verifying chip 23 is encrypted by using a second crypt key [K2] of the authorities to encrypted data [C] and this is stored in the confirmation chip 24.

On the object to be certified 22, further a chip 26 where the certificate number 25 is encrypted by using a first crypt key [K1] of the authorities to encrypted certificate number [Cn] and this is stored therein non-removably mounted.

It is desirable that the first crypt key [K1] is different from the second crypt key [K2], while it is also possible to simplify the arrangement by using the same key.

It is also possible to arrange that a single chip is used for the confirmation chip 24 and the chip 26 having the encrypted certificate number, and further, that the authentication verifying information [A] and the certificate number are integrated together and this is encrypted.

Description will be given now on a process for the authentication verification as shown in FIG. 8.

(1) The authentication verifying chip 23 is prepared where the copy-unable authentication verifying information [A] is stored.

(2) A certificate 21 is prepared where an altering-unable certificate number 25 is attached.

(3) The authentication verifying chip 23 is mounted non-removably on the body of the certificate 21 where the certificate number 25 is attached.

(4) The authentication verifying information [A] is read. In case the authentication verifying information [A] is analog information, it is digitized. In order to accurately read the authentication verifying information [A], it is desirable to read it after the verifying chip 23 is mounted on the certificate 21.

(5) The authentication verifying data [A] is encrypted by using the second crypt key [K2] of the authorities to the encrypted data [C]. The confirmation chip 24 is prepared where the encrypted data [C] is stored. The certificate number 25 is encrypted by using the first crypt key [K1] of the authorities to the encrypted certificate number [Cn]. The chip is prepared where the encrypted certificate number [Cn] is stored.

(6) The confirmation chip 24 and the chip 26 are mounted non-removably on the body of the object to be certified 22.

As the storage medium for the encrypted data [C], an optical reading and recording method such as barcode, two-dimensional barcode or the like, a magnetic recording means, or an IC chip or the like can be adopted.

(7) For the authentication verification for the object to be certified 22, first the encrypted data [C], which is stored in the confirmation chip 24 on the object to be certified 22, and the encrypted certificate number [Cn], which is stored in the chip 26, are read.

(8) The encrypted data [C] is decrypted by using the second crypt key [K2] of the authorities and decrypted plain text data [A'] is obtained. Then the encrypted certificate number [Cn] is decrypted by using the first crypt key [K1] of the authorities and the decrypted certificate number [n'] is obtained.

(9) On the other hand, the authentication verifying information [A] of the authentication verifying chip 23 and the certificate number 25 as mounted on the certificate 21 are read.

In case the authentication verifying information [A] is analog information, it is digitized.

(10) The data [A'] of the object to be certified 22 is compared with the authentication verifying data [A] of the certificate 21 and the certificate number [N] decrypted from the chip 26 having the encrypted certificate number is compared with the certificate number [N] of the certificate 21.

As a result, if these are equal with each other in all, it is judged that the combination of the certificate and the object to be certified is valid and it is verified that the object to be certified is authentic.

If there is any difference, it is judged that the combination of the certificate and the object to be certified is invalid, and it is identified that the object to be certified is not authentic.

The authentication verifying chip, the confirmation chip and matters relating to the confirmation chip are the same as those described in the Embodiment 1, and detailed description is not given here.

Also, the procedures of encryption and decryption and the matters relating to controlling the crypt keys are the same as those described in the Embodiment 1, and detailed description is not given here.

<Embodiment 5 of the Authentication Member and the Authentication Process>

When, for the confirmation chip mounted on the object to be certified, an IC chip is used, a large amount of data can be used, but if the other barcode, two-dimensional barcode, magnetic stripe, or the like is used, it is difficult to store a large amount of data.

In the Embodiment 5, typical hash algorithm, i.e., MD5 (Message Digest 5), SAH-1 (Secure Hash Algorithm-1), SAH-2, etc. are used and data can be converted to the 16-byte hash value regardless of how big the data amount is, and the falsification of original data is always reflected in the hash value. If this is utilized, stored data amount of the server and communication data amount will not be so big. In order to alleviate the burden of encryption/decryption, the amount of the data to be stored can be reduced by using the hash algorithm.

Figure 9:
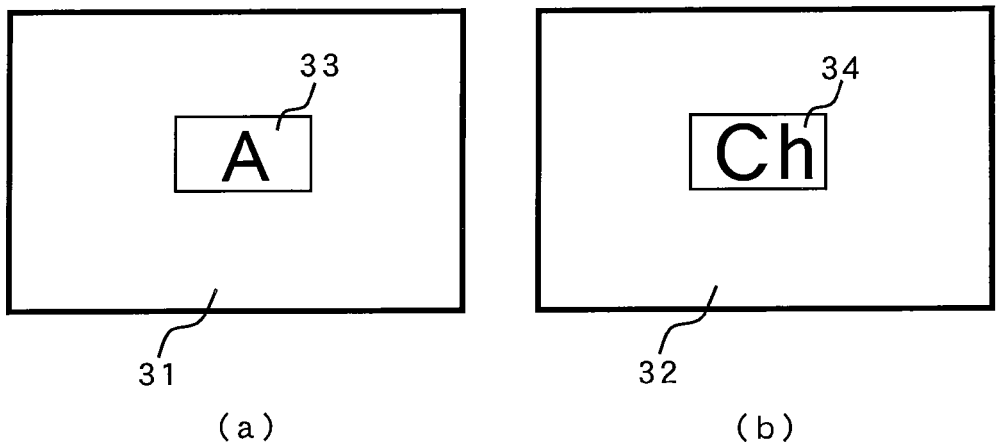
FIG. 9 shows Embodiment 5 of a certificate and an object to be certified using hash value.
Figure 10:
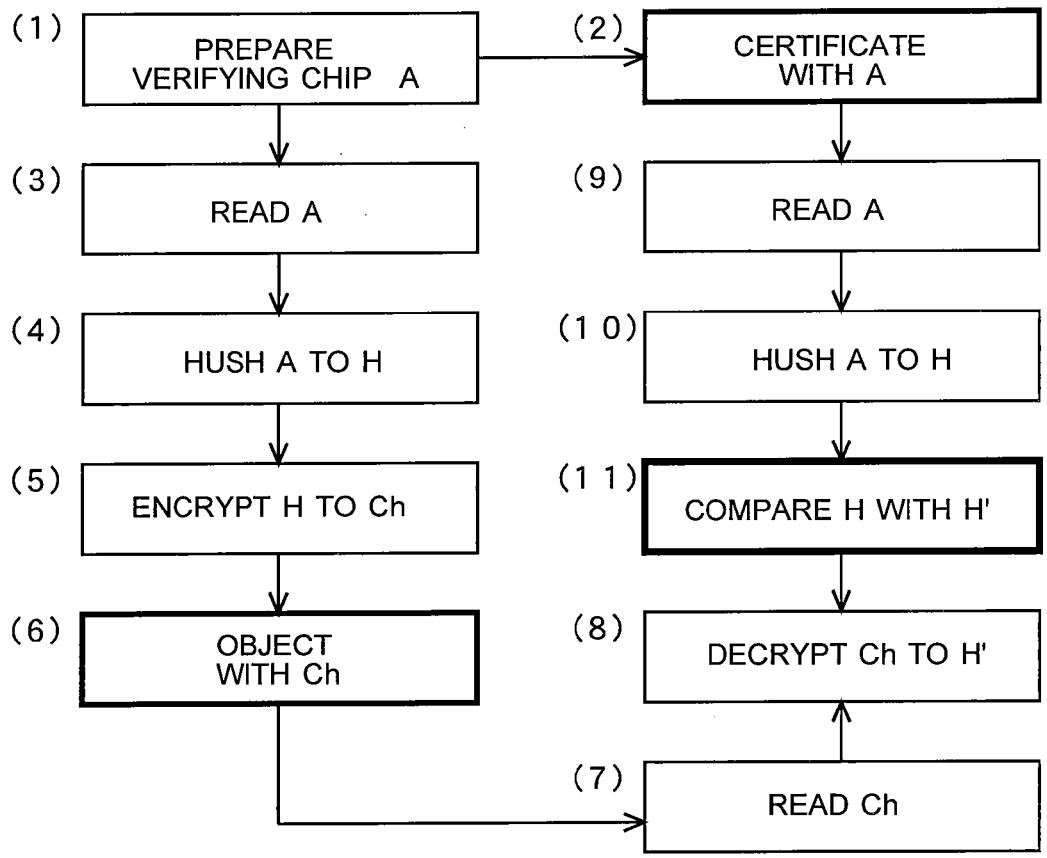
FIG. 10 is a flowchart to explain a process for verifying authenticity according to the certificate and the object to be certified of Embodiment 5.

FIG. 9 and FIG. 10 illustrate an embodiment where the data to be mounted on the certificate is reduced.

FIG. 9 shows the members to be used for the authentication and FIG. 10 shows a process to verify the authentication by using these members.

FIG. 9(a) shows a certificate 31, which is referred for the authentication verification and FIG. 9(b) shows an object to be certified 32, such as a commodity which is the subject to authenticity identification.

On the certificate 31, the authentication verifying chip 33 prepared by the authorities is mounted non-removably.

In the authentication verifying chip 33, copy-unable authentication verifying information [A] such as artifact-metrics or the like is stored.

On the object to be certified 32, a confirmation chip 34 is non-removably mounted. The authentication verifying information [A] stored in the authentication verifying chip 33 is hashed and the hash value is encrypted by using the crypt key [K] of the authorities to encrypted hash value [Ch], and this is stored in the certifying chip having the hash-value 34.

Now, description will be given on the process for verifying the authentication shown in FIG. 10.

(1) The authentication verifying chip 33 is prepared where the copy-unable authentication verifying information [A] is stored.

(2) The authentication verifying chip 33 is mounted non-removably to the body of the certificate 31.

(3) The authentication verifying information [A] is read.

In case the authentication verifying information [A] is analog information, it is digitized.

In order to accurately read the authentication verifying information [A], it is desirable to read after the verifying chip 33 is mounted on the certificate 31.

In order to accurately read the authentication verifying information [A], it is desirable to read after the verifying chip 33 is mounted on the certificate 32.

(4) The authentication verifying information [A] is hashed in one way and the hash value [H] is obtained.

(5) The hash value [H] is encrypted by using the crypt key [K] of the authorities and the encrypted hash value [Ch] is obtained.

(6) The encrypted hash value for certification [Ch] is stored in the certifying chip having the hash-value 34 and this is mounted non-removably on the body of the object to be certified 32.

(7) For the authentication verification for the object to be certified 32, the encrypted hash value for certification [Ch] is read from the certifying chip having the hash-value 34 of the object to be certified 32.

(8) The encrypted hash value [Ch] is decrypted by using the crypt key [K] of the authorities and the hash value [H'] is obtained.

(9) From the verifying chip 33 of the certificate 31, the authentication verifying information [A] is read.

(10) The authentication verifying information [A] is hashed in one way to obtain the hash value [H].

(11) The hash value [H'] thus decrypted and obtained from the certifying chip 34 is compared with the hash value [H] thus hashed and obtained from the authentication verifying information of the verifying chip 33 on the certificate.

As a result, if these are equal with each other, it is judged that the combination of the authentication verifying chip 33 of the certificate 31 and certifying chip having the hash-value 34 of the object to be certified 32 is valid, and it is verified that the object to be certified is authentic.

If these are different from each other, it is judged that the combination of the authentication verifying chip 33 of the certificate 31 and the certifying chip having the hash-value 34 of the object to be certified 32 is invalid, and it is identified that the object to be certified is not authentic.

<Embodiment 6 of the Authentication Member and the Authentication Process>

As the technique to apply the hash value as used in the Embodiment 5, the digital signature is known.

In the digital signature, one-way hash value of the data to be executed is encrypted by using a private-key, which is known only to the signer, and it is provided together with the signed data.

To confirm the authenticity of the data, the encrypted hash value is decrypted by using a public-key of the signer. Then, the data is turned to the hash value. If the decrypted hash value is equal to the hash value to which the data is hashed, it is confirmed that the data is authentic, which is not falsified. If it is not equal, it is confirmed that it is illegitimate falsified data.

Further, the signer cannot assert that the data confirmed as authentic is illegitimate.

By replacing the hash value of the Embodiment 5 with the digital signature, the authentication verification is assured.

Figure 11:
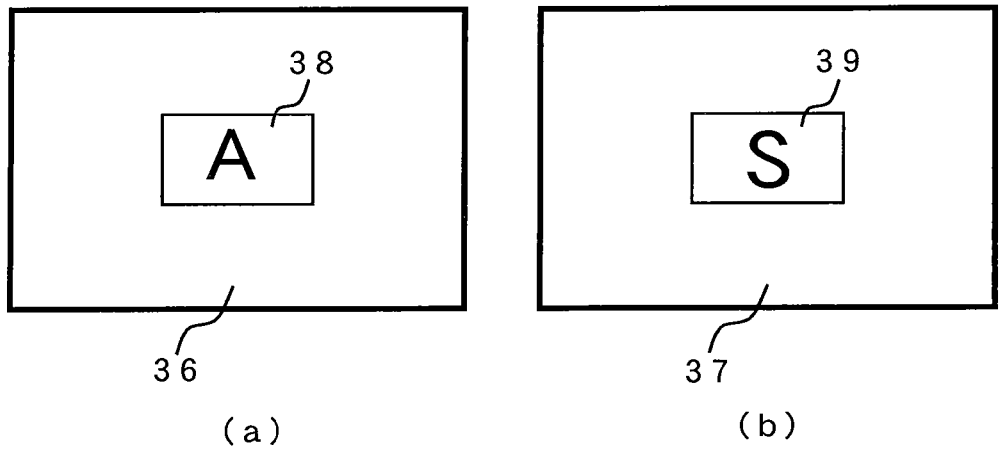
FIG. 11 shows Embodiment 6 of a certificate and an object to be certified using the digital signature.
Figure 12:
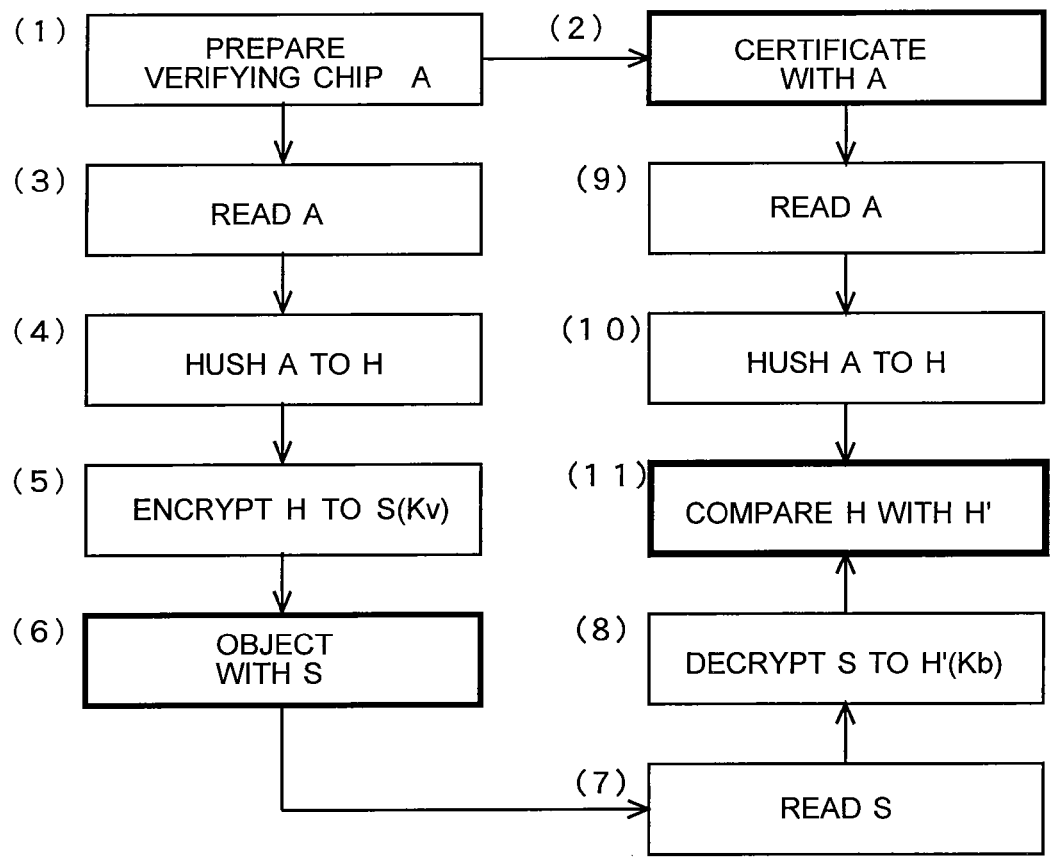
FIG. 12 is a flowchart to explain a process for verifying authenticity according to the certificate and the object to be certified of Embodiment 6.

FIG. 11 and FIG. 12 show an embodiment, which uses the digital signature.

FIG. 11 shows members to be used for the authentication. FIG. 12 shows a process to verify the authentication by using these members.

FIG. 11(a) shows a certificate 36, which is referred for the authentication and FIG. 11(b) shows an object to be certified 37, such as a commodity which is the subject to authentication verification.

On the certificate 36, an authentication verifying chip 38 prepared by the authorities is non-removably mounted.

In the authentication verifying chip 38, copy-unable authentication verifying information [A] such as artifact-metrics is stored.

On the object to be certified 37, a confirmation chip 39 is non-removably mounted. The authentication verifying information [A] stored in the verifying chip 38 is hashed to the hash value, is encrypted by using a private-key [Kv] of the authorities and the digital signature [S] is obtained. This is stored in the confirmation chip 39

Now, description will be given on the process for verifying the authentication as shown in FIG. 12.

(1) The authentication verifying chip 38 is prepared where the copy-unable authentication verifying information [A] is stored.

(2) The verifying chip 38 is mounted non-removably on the body of the certificate 36.

(3) The authentication verifying information [A] is read.

In case the authentication verifying information [A] is analog information, it is digitized.

In order to accurately read the authentication verifying information [A], it is desirable to read after the verifying chip 38 is mounted on the certificate 36.

(4) The authentication verifying information [A] is hashed in one-way and the hash value [H] is obtained.

(5) The hash value [H] is encrypted by using a private-key [Kv] of the authorities and the digital signature [S] is obtained.

(6) The digital signature [S] is stored in the confirmation chip 39, which is mounted non-removably on the body of the object to be certified 37.

(7) For the authentication verification for the object to be certified 37, the digital signature [S] is read from the confirmation chip 39 of the object to be certified 37.

(8) The digital signature [S] is decrypted by using a public-key [Kb] of the authorities and the hash value [H'] is obtained.

(9) The authentication verifying information [A] is read from the verifying chip 38 of the certificate 36.

(10) The authentication verifying information [A] is hashed to the hash value [H].

(11) The hash value [H'] thus obtained from the digital signature of the confirmation chip 39 of the object to be certified 37 is compared with the hash value [H] thus obtained from the authentication verifying information in the verifying chip 38 of the certificate 36.

As a result, if these are equal with each other, it is judged that the combination of the authentication verifying chip 38 of the certificate 36 and the confirmation chip 39 of the object to be certified 37 is valid and it is verified that the object to be certified is authentic.

Because the authorities cannot assert that the object to be certified is not authentic, even when it may be of poor quality, the authorities cannot deny own responsibility.

If these are different from each other, it is judged that the combination of the authentication verifying chip 38 of the certificate 36 and the confirmation chip 39 of the object to be certified 37 is invalid, and it is identified that the object to be certified is not authentic.

<Embodiment of the Arrangement of the Authentication Verifying Chip and the Confirmation Chip>

An authentication verifying chip and a confirmation chip are arranged on each of the certificate 5 shown in FIG. 3, on the certificate 11 and the object to be certified 12 shown in FIG. 5, and on the object to be certified 22 shown in FIG. 7.

Figure 13:
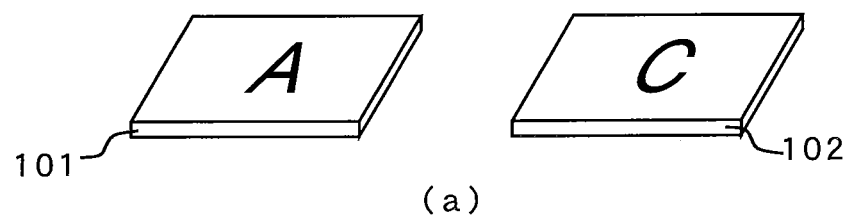
FIG. 13 shows drawings, each showing an arrangement of an authentication verifying chip and a confirmation chip.
Figure 13:
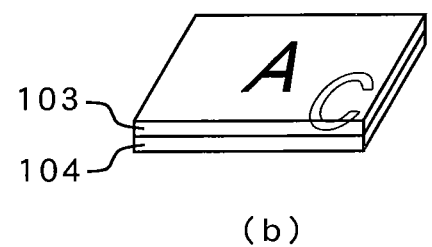
Figure 13:
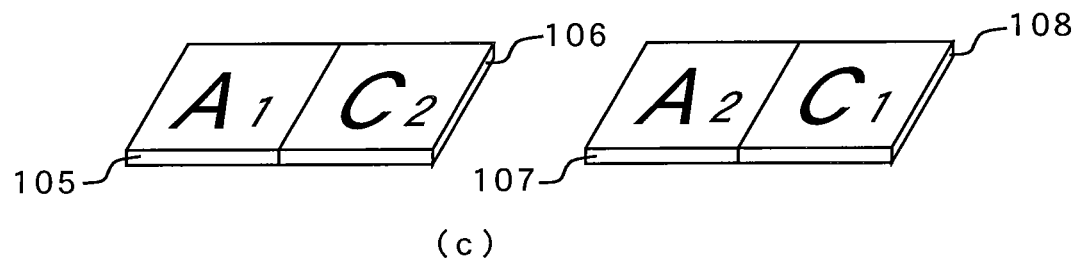
Figure 13:
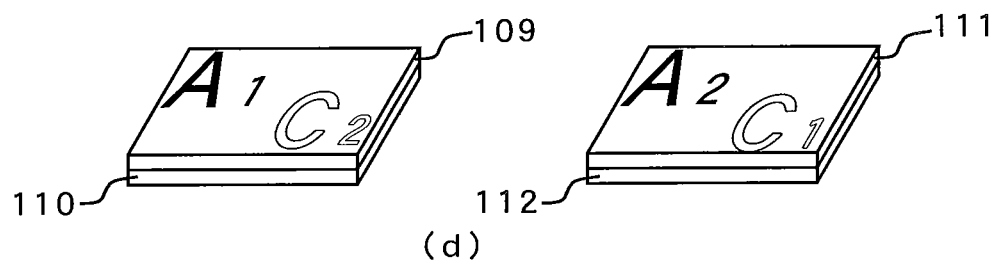
Figure 14:
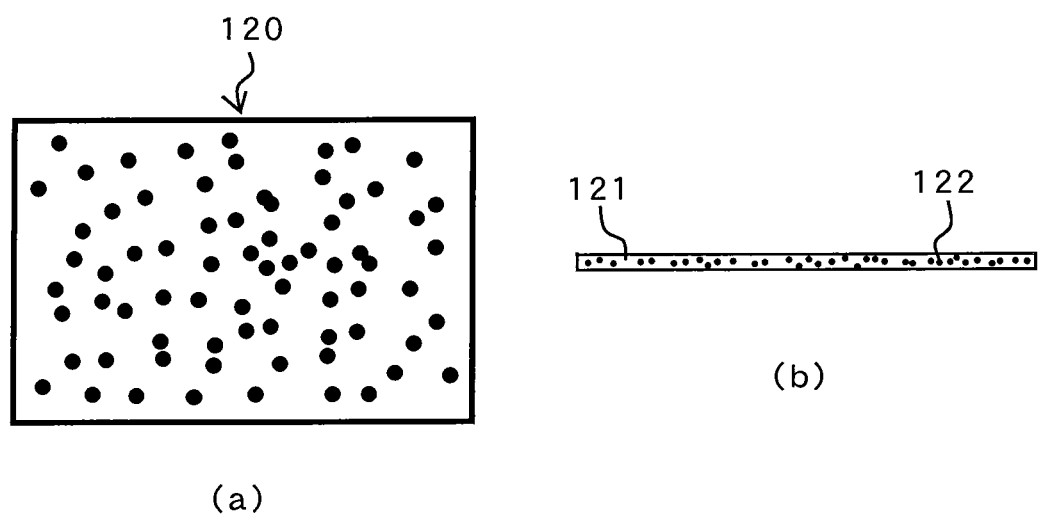
FIG. 14 shows Embodiment 1 of an authentication verifying chip by using metal particles dispersed in a transparent medium.
Figure 15:
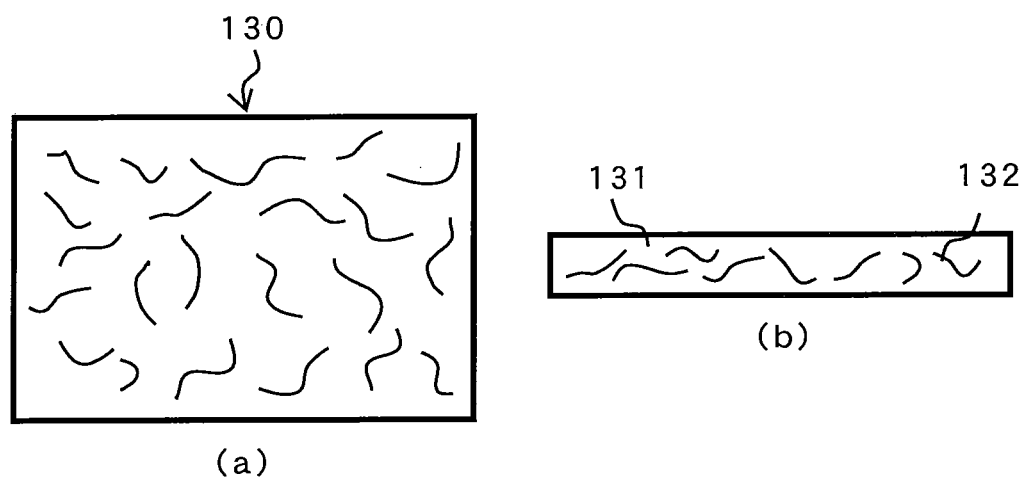
FIG. 15 shows Embodiment 2 of an authentication verifying chip by using fibers dispersed in a transparent medium.

FIG. 13 shows an embodiment where the verifying chip and the confirmation chip are arranged on the certificate and/or the object to be certified.

In FIG. 13, letters of solid type print represent the data which is stored in the chip on the upper portion, and letters of outline type print represent the data which is stored in the chip on the lower portion.

FIG. 13(a) illustrates the most basic arrangement. The verifying chip 101 where the authentication verifying data [A] is stored and the confirmation chip 102 where the encrypted data [C] are arranged side by side as separated.

FIG. 13(b) illustrates the arrangement in which a verifying chip 103 where the authentication verifying data [A] is stored is placed on an IC chip 104, which is a confirmation chip where the encrypted data [C] is stored.

It may be so arranged that the authentication verifying data of the verifying chip 103 is stored in a package of the IC chip 104 by means such as printing.

FIG. 13 (c) illustrates the arrangement in which a verifying chip 105 where the first authentication verifying data [A1] is stored and a confirmation chip 106 where the second encrypted data [C2] is stored are disposed as separated side by side on the certificate, and a verifying chip 107 where the second authentication verifying data [A2] is stored and a confirmation chip 108 where the first encrypted data [C1] is stored are disposed as separated side by side on the object to be certified.

In the arrangement of FIG. 13(d), on the certificate, a verifying chip 109 where the first authentication verifying data [A1] is stored is placed on an IC chip 110, which is a confirmation chip where the second encrypted data [C2] is stored.

On the object to be certified, a verifying chip 111 where the second authentication verifying data [A2] is stored is placed on an IC chip 112, which is a confirmation chip where the first encrypted data [C1] is stored.

It may be so arranged that the authentication verifying data of the verifying chip is stored in a package of the IC chip by means such as printing.

Referring to FIG. 14 to FIG. 30, description will be given below on embodiments of the authentication verifying chip to be used for storing a carrier containing copy-unable authentication verifying information.

In these figures, (a) represents a general view, and (b) and (c) each represents a cross-sectional view.

Referring to FIG. 14 to FIG. 26, description will be given on the verifying chip, which is used for authentication verification and which cannot be copied or falsified.

<Embodiment 1 of the Authentication Verifying Chip>

The authentication verifying chip 12 as shown in FIG. 14(a) and FIG. 14(b) illustrates an example of a carrier containing authentication verifying information using metal particles. As shown in the cross-sectional view of FIG. 14(b), metal particles 122 are dispersed by means such as scattering in a transparent resin 121.

The metal particles 122 arrangement in the transparent resin 121, which is the authentication verifying information carrier, is three-dimensional and is formed by mere chance, and it is impossible to copy the authentication verifying information.

<Embodiment 2 of the Authentication Verifying Chip>

The authentication verifying chip 130 as shown in FIG. 15(a) and FIG. 15(b) illustrates an example of a carrier containing the authentication verifying information using fiber pieces. As shown in the cross-sectional view of FIG. 15(b), fiber pieces 132 are dispersed by means such as scattering in a transparent resin 131.

The fiber pieces 132 arrangement in the transparent resin 131, which is the authentication verifying information carrier, is three-dimensional and is formed by mere chance, and it is impossible to copy the authentication verifying information.

Each of the authentication verifying chip shown in FIG. 16 to FIG. 19 represents an example where an embossed hologram is used as the authentication verifying information carrier.

In the embossed hologram, only the incident light entering to the edge of a pit having the depth corresponding to ¼ wavelength formed by embossing is selectively not reflected.

<Embodiment 3 of the Authentication Verifying Chip>

In the authentication verifying chip 140 shown in FIG. 16(a) and FIG. 16(b), resin 142 or the like is filled in pits 141, which are arranged regularly by means of spraying as shown in the cross-sectional view of FIG. 16(b), and the upper edge and the bottom of the pits where the resin is not filled, function as the embossed hologram. The reference numeral 143 represents transparent resin which covers the total surface.

The position of the edge of the pits 141, which serves as the authentication verifying information carrier, is produced by chance. If the quantity of the sprayed resin 142 is not sufficient or excessive, the edge of the pits does not function as the embossed hologram for incident lights, and accordingly, even when it is copied, it does not fulfill the function as the authentication verifying information.

Figure 17:
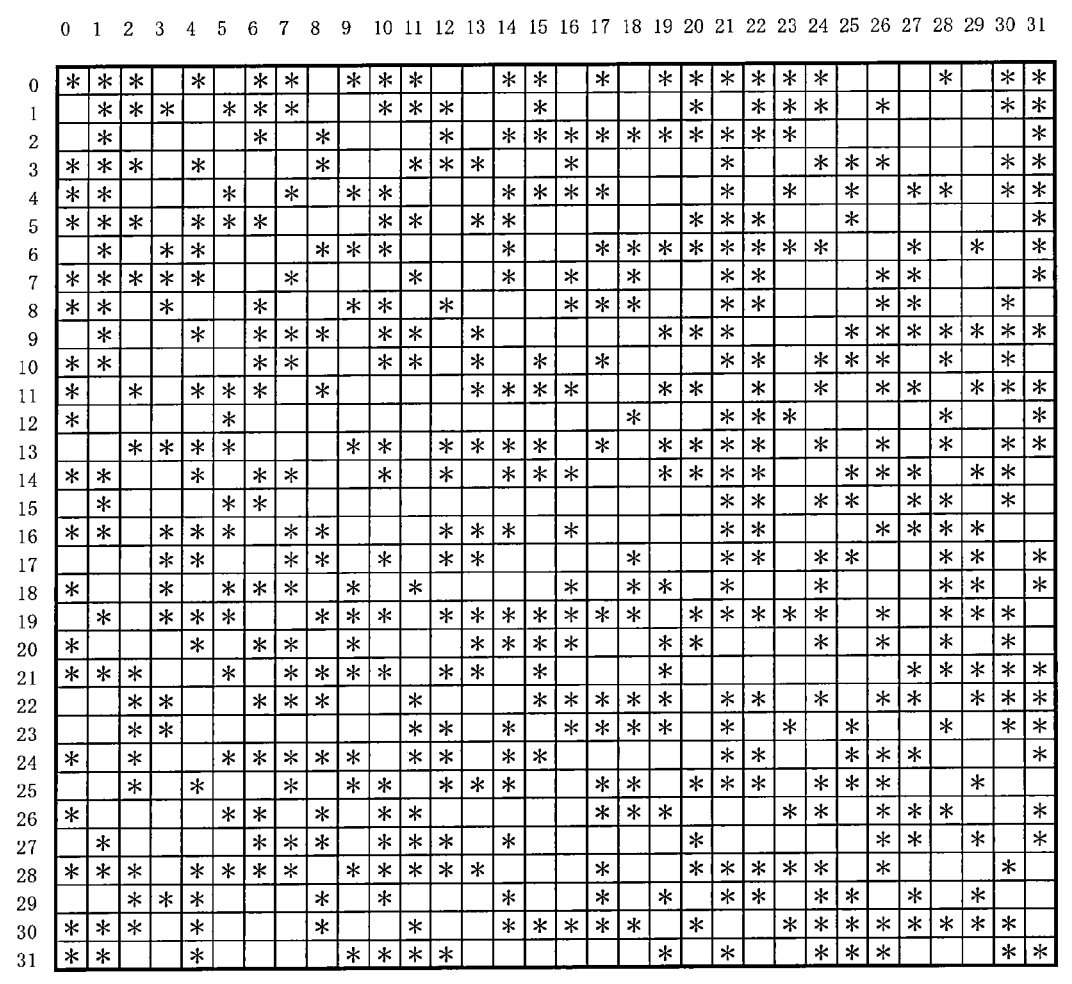

Referring to FIG. 17, description will be given on a method to obtain the embossed hologram of authentication verifying information by using a computer.

In the embossed hologram chip for authentication verification, the embossed hologram comprising 1024 binary data disposed in 32×32 matrix arrangement. In FIG. 17, a position where "0" of binary data is written is indicated in blank and a position where "1" of binary data is written is indicated by the mark "*".

The binary data, which is obtained by detecting a radiation ray irradiated as a result of nuclear fission of radioactive material, is usually provided in the form of hexadecimal number. Binary data of 1024 bits is the hexadecimal number of 256-digit.

When the 256-digit hexadecimal number is substituted by 4-digit binary and this is arranged in 32×32 matrix form, the pattern of the embossed hologram as shown in FIG. 17 can be obtained.

When these are substituted by the quaternary number by similar means, 4-color embossed hologram of black-red-green-blue can be obtained.

<Embodiment 4 of the Authentication Verifying Chip>

Figure 18:
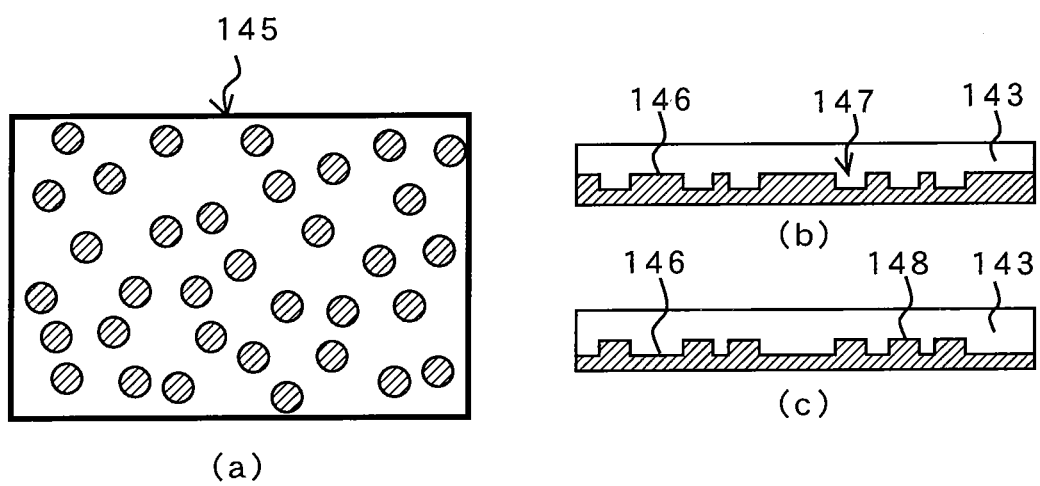
FIG. 18 shows Embodiment 4 of an authentication verifying chip of the unicolor embossed hologram arranged and prepared by chance.

In the authentication verifying chip 145 shown in FIG. 18, the upper edge and the bottom of pits or of protrudings irregularly arranged function as the embossed hologram.

In the cross-sectional view of the authentication verifying chip as shown in FIG. 18 (b), pits 147 are disposed in irregular arrangement by etching the upper surface of a base plate 146, and edges for the embossed hologram are formed. In the cross-sectional view shown in FIG. 18(c), protrudings 148 are formed by scattering on the base plate 146, and upper edges for the embossed hologram are formed.

The reference numeral 143 represents transparent resin to cover the entire surface.

The position of the pits 147 or the position of the edge of the protrudings 148, which serves as the authentication verifying information carrier, is produced merely by chance. Further, the embossed hologram has three-dimensional structure, and even when it is copied by photographing, it does not fulfill the function of the authentication verifying information.

<Embodiment 5 of the Authentication Verifying Chip>

Figure 19:
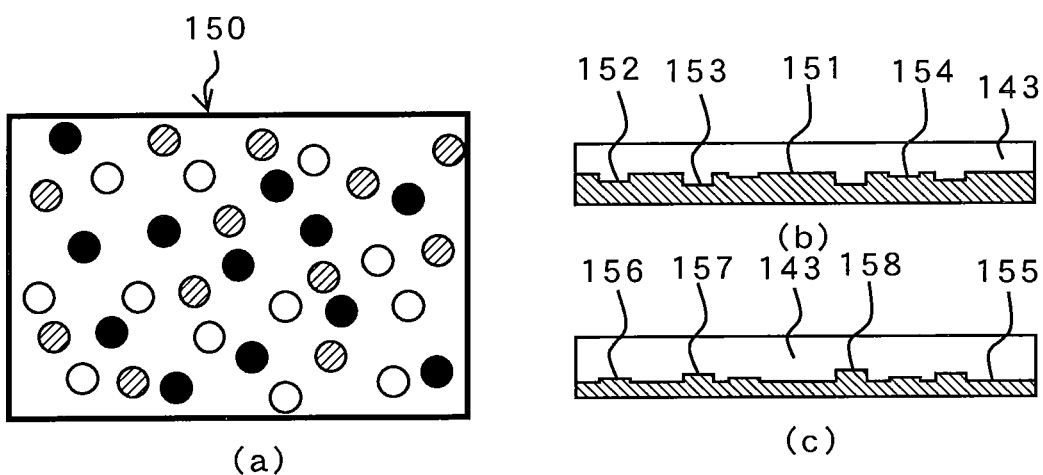
FIG. 19 shows Embodiment 5 of an authentication verifying chip of the multi-colored embossed hologram arranged and prepared by chance.

In the authentication verifying chip 150 as shown in FIG. 19, the depth of pits or the height of protrudings are not the same. As a result, the function of the embossed hologram is fulfilled by the light components of a plurality of wavelengths.

In the cross-sectional view shown in FIG. 19 (b), pits 152, 153 and 154 with different depths are formed on a base plate 151, and upper edges of the embossed hologram are prepared. In the cross-sectional view shown in FIG. 19 (c), protrudings 156, 157 and 158 different in height are formed on the base plate 155, and upper edges of the embossed hologram are prepared. The reference numeral 143 represents transparent resin to cover the entire surface.

The position and the depth of the pits 152, 153 and 154 or the position and the height of the edge of the protrudings 156, 157 and 158, which serve as the authentication verifying information carrier, are produced merely by chance. Further, the embossed hologram has three-dimensional structure, and even when it is copied by photographing, it does not fulfill the function of the authentication verifying information.

<Embodiment 6 of the Authentication Verifying Chip>

Figure 20:
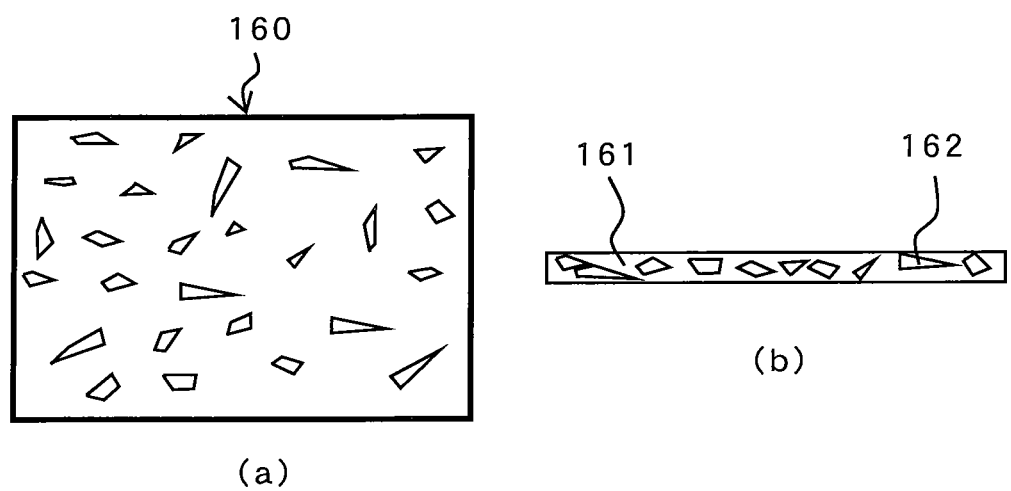
FIG. 20 shows Embodiment 6 of an authentication verifying chip by using fluorescent granules dispersed in a transparent medium.

FIG. 20 illustrates an example of the authentication verifying chip of an authentication verifying information carrier using fluorescent granules.

In the authentication verifying chip 160 shown in FIG. 20(a), fluorescent granules 162 are disperced in the transparent resin 161 as shown in the cross-sectional view FIG. 20(b). By selecting the fluorescent substance material, it is possible to have a plurality of fluorescent colors.

The arrangement of the fluorescent granules 162 in the transparent resin 161 and fluorescent color obtained, which serve as the authentication verifying information carrier, are produced merely by chance and are three-dimensional, and the authentication verifying information cannot be copied.

<Embodiment 7 of the Authentication Verifying Chip>

Figure 21:
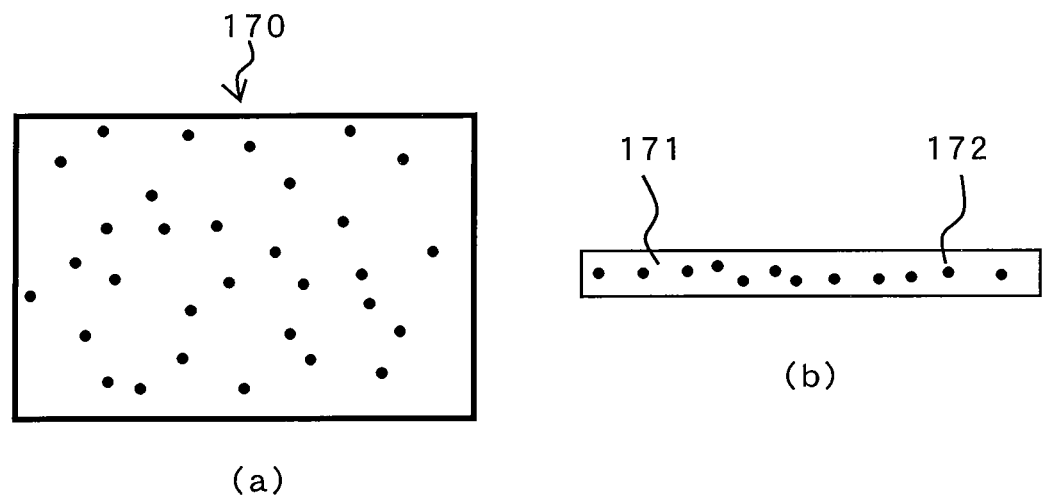
FIG. 21 shows Embodiment 7 of an authentication verifying chip by using radioactive granules dispersed in a medium.
Figure 22:
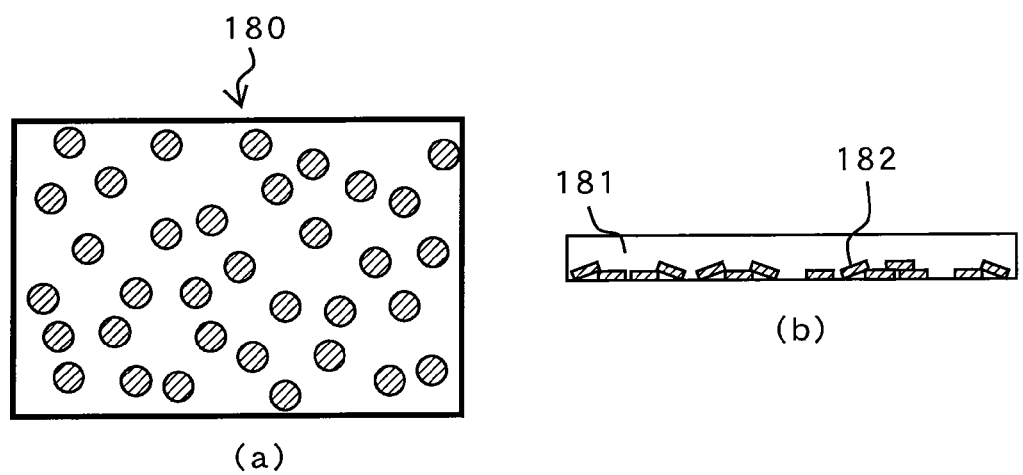
FIG. 22 shows Embodiment 8 of a unicolor authentication verifying chip by using iridescent pieces arranged by chance.

FIG. 21 illustrates an example of the authentication verifying chip of an authentication verifying information carrier using radioactive granules.

In the authentication verifying chip 170 shown in FIG. 21(a), radioactive granules 172 are dispersed in the resin 171 as shown in the cross-sectional view FIG. 21(b).

The arrangement of the radioactive granules 172 in the transparent resin 171, which serves as the authentication verifying information carrier, is produced merely by chance and is three-dimensional, and the authentication verifying information cannot be copied.

FIG. 22 to FIG. 26 illustrate examples of the authentication verifying chip of the authentication verifying carrier using an iridescent substance.

The iridescence and the hologram indicate phenomena, which appear due to the light interference in a transparent medium. The phenomenon by the embossed hologram appear where the light is not reflected when interfered at the edges. The phenomenon by the iridescence appear where specific light components are reflected strongly due to the interference on plane. In this way, the types of the phenomena observed are different.

In case of the iridescence, when the incident light angle varies, the path length is different even when used the same iridescent piece, and the iridescence appeared varies. Therefore, it is impossible to falsify the same.

<Embodiment 8 of the Authentication Verifying Chip>

In the authentication verifying chip 180 as shown in FIG. 22(a), iridescence pieces 182 having the structure of the resin piece coated a thin film thereto are dispersed in the transparent resin 181 as shown in the cross-sectional view FIG. 22(b).

<Embodiment 9 of the Authentication Verifying Chip>

In the authentication verifying chip 185 shown in FIG. 23(a), pits 187, each having the depth of about ¼ wavelength of the light used, are arranged regularly and resin 188 or the like is filled therein as shown in the cross-sectional view FIG. 23(b). Iridescence appears by the resin 188 filled in and/or the resin 186 to cover the entire surface.

<Embodiment 10 of the Authentication Verifying Chip>

In the authentication verifying chip 190 shown in FIG. 24(a), iridescence pieces 191, 192 and 193 having a plurality of thicknesses are dispersed in a transparent resin medium as shown in the cross-sectional view FIG. 24(b). Iridescence appears in different manner, depending on the thickness of the iridescence pieces.

<Embodiment 11 of the Authentication Verifying Chip>

In the authentication verifying chip 195 shown in FIG. 25(a), a material 197 such as resin having fluidity is spread, and is solidified thereafter in irregular forming, and the entire surface is covered by the resin 196.

Iridescence appears by this arrangement by chance.

<Embodiment 12 of the Authentication Verifying Chip>

In the authentication verifying chip 200 shown in FIG. 26(a), a material 202 instead of the iridescence pieces, which has fluidity, is sprayed and is solidified thereafter as shown in FIG. 26(b), in form of liquid drops, and the entire surface is covered by the resin 201.

Iridescence appears by this arrangement also by chance.

<Embodiment of Control of the Reading>

Figure 27:
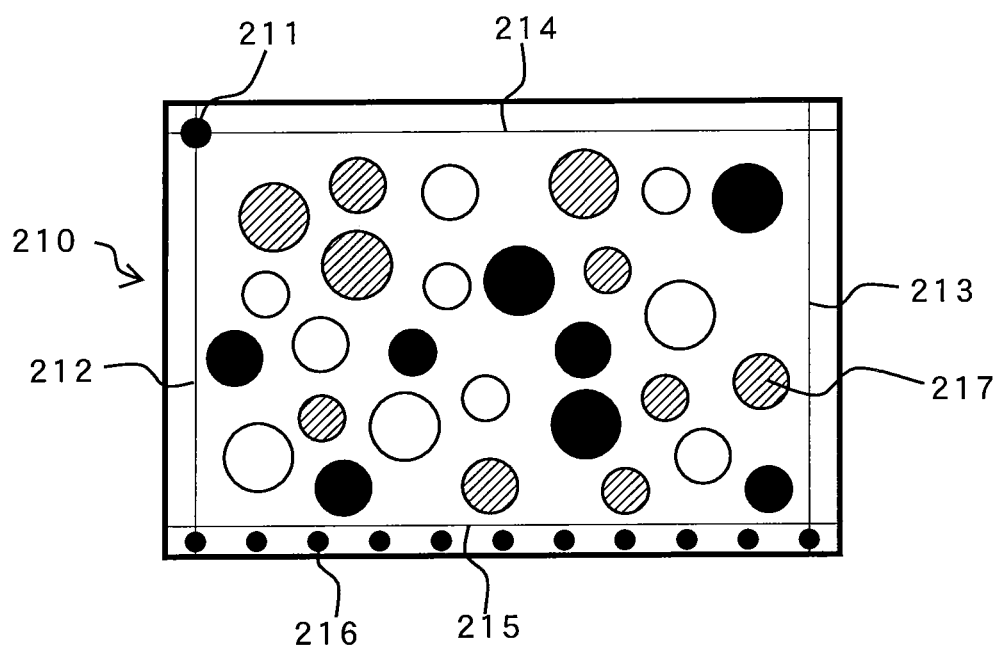
FIG. 27 shows an embodiment of marks for positioning.

FIG. 27 shows an arrangement embodiment to accurately read the authentication verifying chip.

To accurately read the verifying chip, it is desirable to have a mark 211 for positioning on the authentication verifying chip 210. Only one mark 211 for positioning may be used in the simplest case, while a plurality of marks may be provided to ensure more accurate positioning. The positioning mark is useful not only in linear reading but also in planar reading using an image pickup device.

In order to ensure the accurate reading, in addition to the mark 211 for positioning, some types of marks, for example, a line to start the reading in moving direction 212 and a line to finish the reading in moving direction 213 are given at the initiating position and the finishing position for reading the chip, and further lines 214 and 215 indicating the end portion are provided.

To ensure the accurate reading of the information on the verifying chip, it is necessary to synchronize the moving of the verifying chip and the reading device. For this purpose, if marks 216 for synchronization signal are placed on the verifying chip, it is possible to synchronize the movement of the reading device when reading the marks.

The reading start and finish lines and/or the mark for synchronization signal can be also used for signal normalization in the signal processing. These marks for positioning, the reading start/finish lines and/or the marks for synchronization signal can be prepared by adequate printing means such as an ink jet printer.

In this figure, the reference numeral 217 represents an authentication verifying information carrier comprising fiber pieces, embossed hologram, fluorescent granules, radioactive granules, iridescent substance, etc.

<Embodiments of the Certificate (a Guarantee Card) Arrangement>

Referring to FIG. 28 to FIG. 33, description will be given below on embodiments of arrangements of the authentication verifying chip where only the verifying chip is mounted on the certificate in the drawing shown in FIG. 13.

The verifying chips shown in these figures use iridescence pieces as an authentication verifying information carrier, while the other verifying chips as shown in FIG. 14 to FIG. 21 can be used.

<Embodiment 1 of the Certificate Arrangement>

FIG. 28(a) is a general view of the certificate (guarantee card) where the authentication verifying chip is mounted and FIG. 28(b) is its cross-sectional view. At the center of the surface plate 223 mounted on a base plate 221 of a guarantee card 220, the verifying chip 222 is non-removably mounted. If it is necessary to protect the verifying chip 222, a protective plate to cover the entire surface may be provided. On the surface of the guarantee card, information 224 such as letters indicating that it is the certificate is provided.

In the arrangement as given here, a small type verifying chip 222 is placed in the central part of the surface plate 223, while the position and the size of the verifying chip are not limited to this example, and it can be placed at any position as desired.

Figure 28:
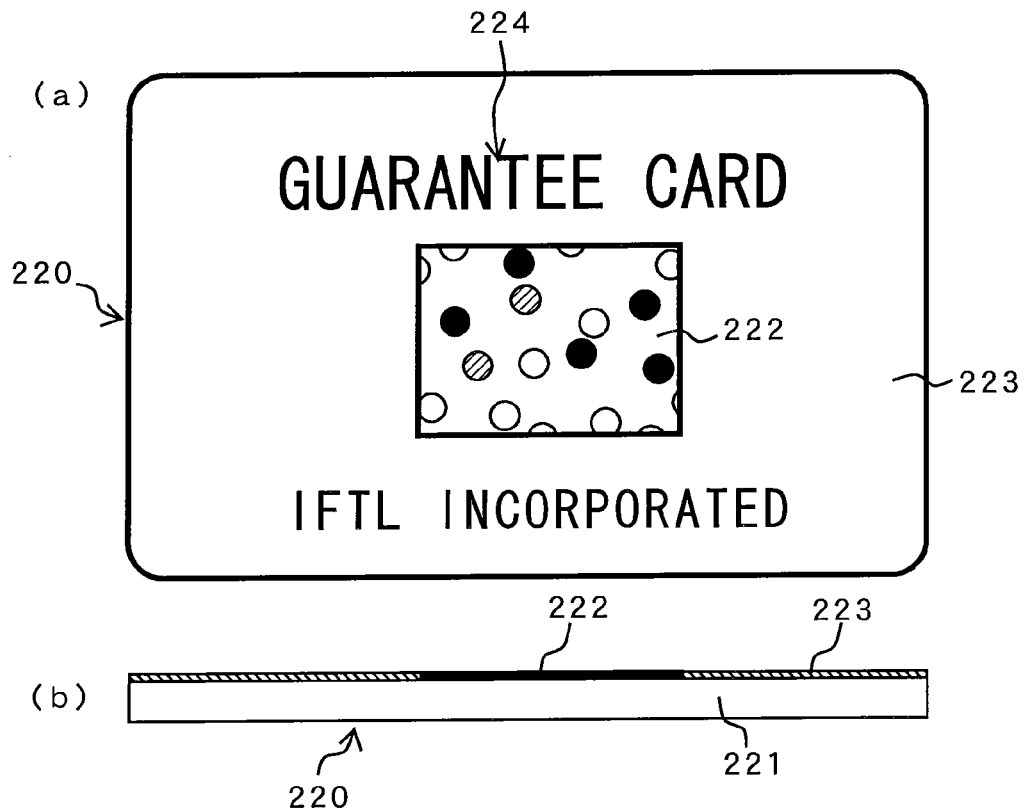
FIG. 28 shows Embodiment 1 of a certificate, a part of which is an authentication verifying chip.

The certificate shown in FIG. 28 has a small type verifying chip 222, which is placed at the center of the surface plate 223, while in case of the certificate shown in each of FIG. 29 to FIG. 33, the authentication verifying information carrier is arranged over the entire surface of the certificate. Thus, total surface of the certificate, i.e., the certificate itself, serves as the verifying chip. For this reason, the certificate cannot be falsified nor modified.

<Embodiment 2 of the Certificate Arrangement>

FIG. 29(a) is a general view of a certificate and FIG. 29(b) is its cross-sectional view.

On the guarantee card 225, the verifying chip 227 is non-removably mounted on the entire surface of the base plate 226. If it is necessary to protect the verifying chip 227, a protective plate to cover the entire surface may be provided. On the surface of the guarantee card, information 224 such as letters indicating that it is the certificate is provided.

To read the authentication verifying information, the entire surface of the verifying chip 227 including the letter information 224 should be read.

In FIG. 30 to FIG. 33, the cross-sectional view is not given.

<Embodiment 3 of the Certificate Arrangement>

Figure 29:
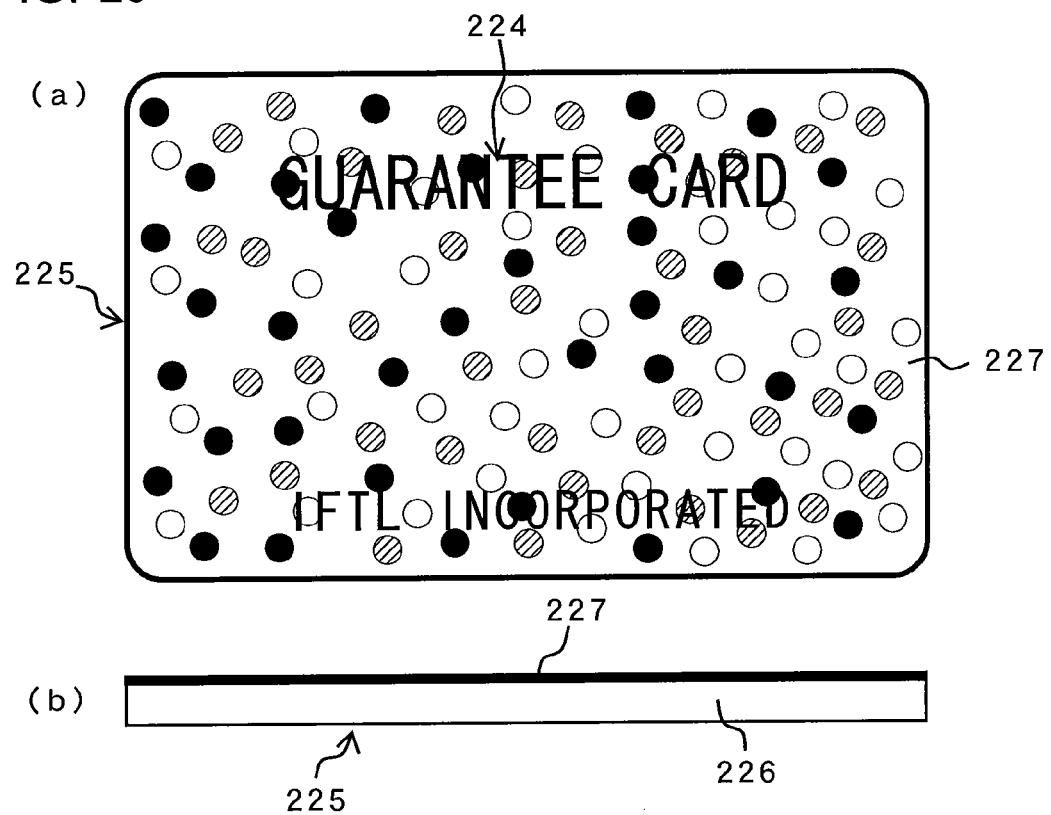
FIG. 29 shows Embodiment 2 of a certificate, the entire surface of which is the authentication verifying chip.
Figure 30:
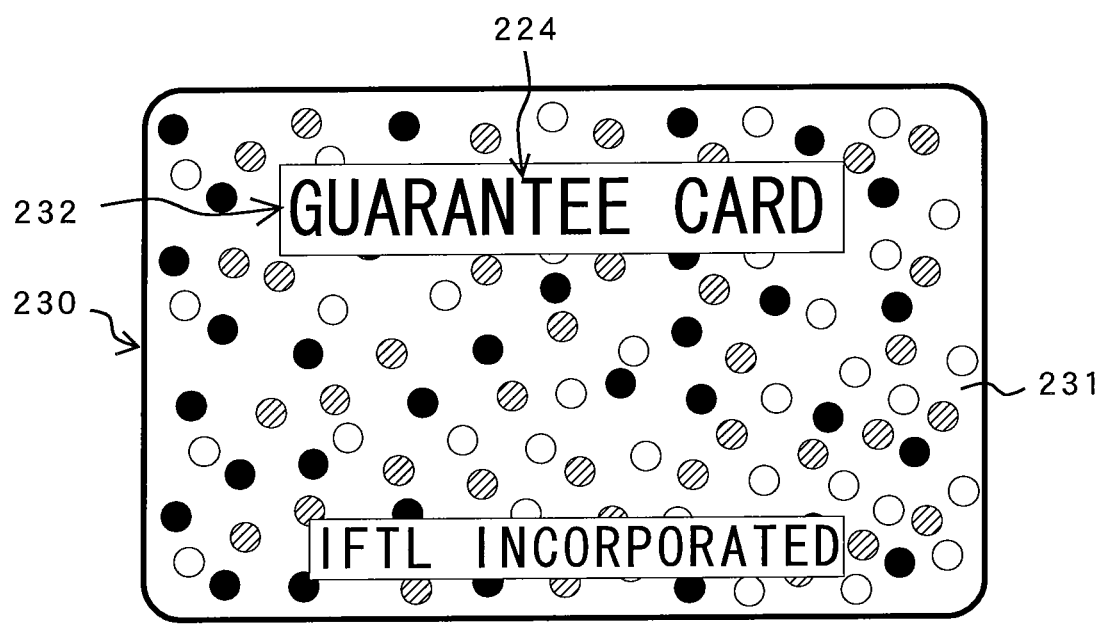
FIG. 30 shows Embodiment 3 of a certificate, the entire surface of which is the authentication verifying chip.

On the guarantee card 230 as shown in FIG. 30, the verifying chip 231 is non-removably mounted on the entire surface of the base plate similarly to the certificate shown in FIG. 29. If it is necessary to protect the verifying chip 231, a protective plate to cover the entire surface may be further provided. On the surface of the guarantee card 230, the information 224 such as letters indicating that it is the certificate is provided. Unlike the case of FIG. 28, the letter information 224 is given within a frame 232 so that it can be distinguished from the information of the verifying chip. For this purpose, the boundary lines can serve the function of lines 214 and 215 indicating the end portion as shown in FIG. 27.

In this case, when the authentication verifying information is to be read, the entire surface not including the letter information 224 or an inside portion where the letter information 224 is given on the surface is to be read.

<Embodiment 4 of the Certificate Arrangement>

Figure 31:
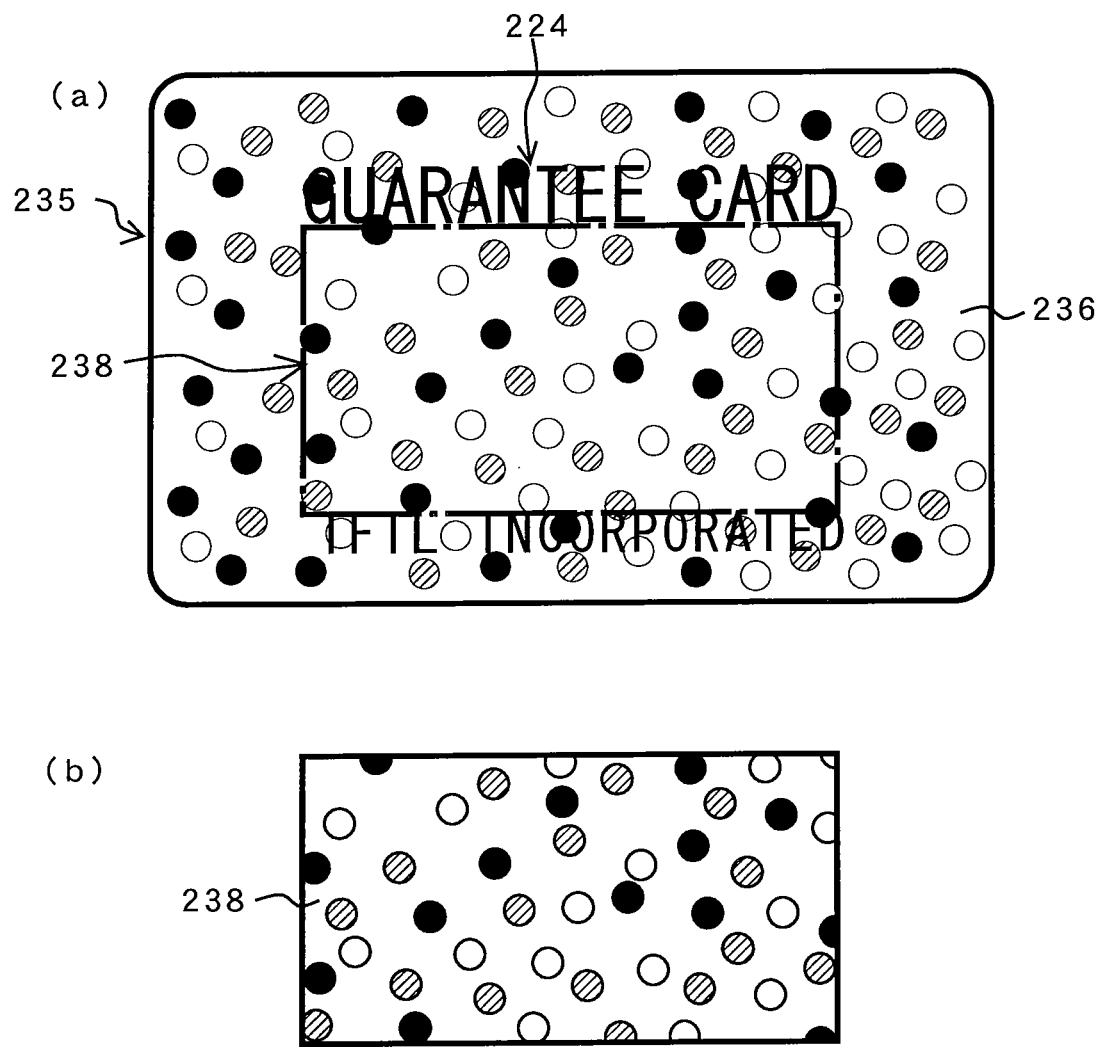
FIG. 31 shows Embodiment 4 of a certificate, the entire surface of which is the authentication verifying chip.

On the guarantee card 235 as shown in FIG. 31(*a*), the verifying chip 236 is non-removably mounted on the entire surface of the base plate similarly to the case of the certificate shown in FIG. 29. If it is necessary to protect the verifying chip 236, a protective plate to cover the entire surface may be provided further.

On the surface of the guarantee card 235, the information 224 such as letters indicating that it is the certificate is provided. A lower end of letters given on the upper portion and an upper end of the letters given on the lower portion function as the lines 214 and 215 indicating the end portion shown in FIG. 27, and a forward end and a backward end of the letters function as the reading start/finish lines 212 and 213 as shown in FIG. 27.

In FIG. 31(*a*), a frame 238 to correspond to the lines 214 and 215 indicating the end portion and the reading start/finish lines 212 and 213 is shown, while it is not actually displayed.

The letter information 224 can be given to be distinguished from the information of the verifying chip as in the case shown in FIG. 30.

When the authentication verifying information is to be read, the portion inside the frame 238 not including the letter information 224 is to be read. FIG. 31(*b*) shows the authentication verifying information to be read in FIG. 31(*a*).

Figure 32:
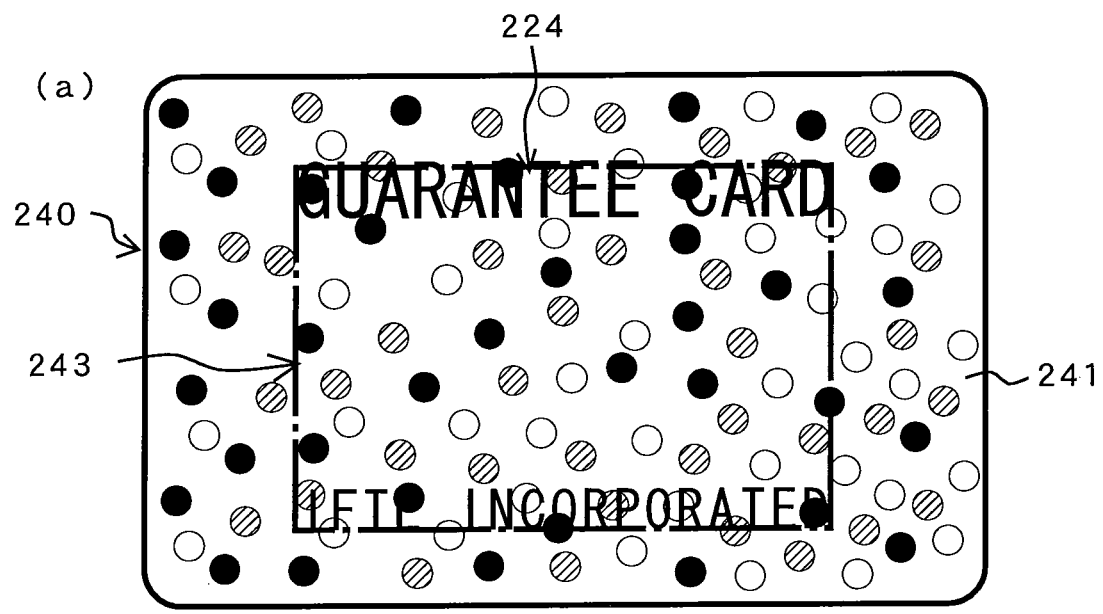
FIG. 32 shows Embodiment 5 of a certificate, the entire surface of which is the authentication verifying chip.
Figure 32:
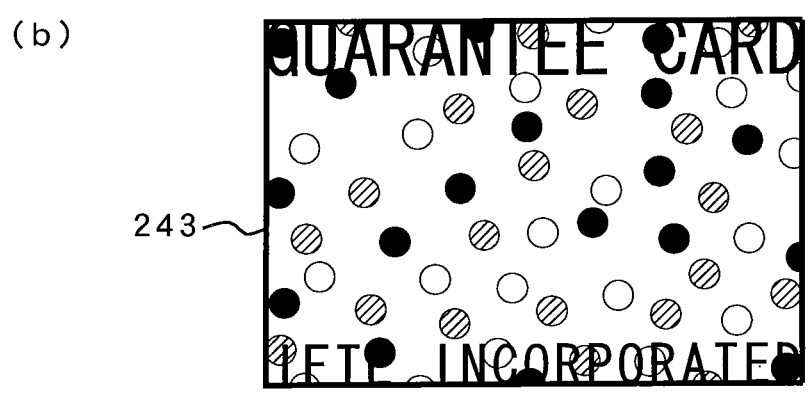

<Embodiment 5 of the Certificate Arrangement>On the guarantee card 240 shown in FIG. 32 (*a*), the verifying chip 241 is non-removably mounted on the entire surface of the base plate similarly to the case of the certificate shown in FIG. 29. If it is necessary to protect the verifying chip 241, a protective plate to cover the entire surface may be provided further. On the surface of the guarantee card 240, the information 224 such as letters indicating that it is the certificate is provided. The upper end of the letters given on the upper portion and the lower end of the letters given on the lower portion function as the lines 214 and 215 indicating the end portion shown in FIG. 27, and the forward end and the backward end of the letters function as the reading start/finish lines 212 and 213 as shown in FIG. 27.

In FIG. 32(*a*), the frame 243 to correspond to the lines 214 and 215 indicating the end portion and the reading start/finish lines 212 and 213 is shown, while it is not actually displayed.

The letter information 224 can be given to be distinguished from the information of the verifying chip as in the case shown in FIG. 30.

When the authentication verifying information is to be read, the portion inside the frame 243 including the letter information 224 is to be read. FIG. 32(*b*) shows the authentication verifying information to be read in FIG. 32(*a*).

<Embodiment 6 of the Certificate Arrangement>

Figure 33:
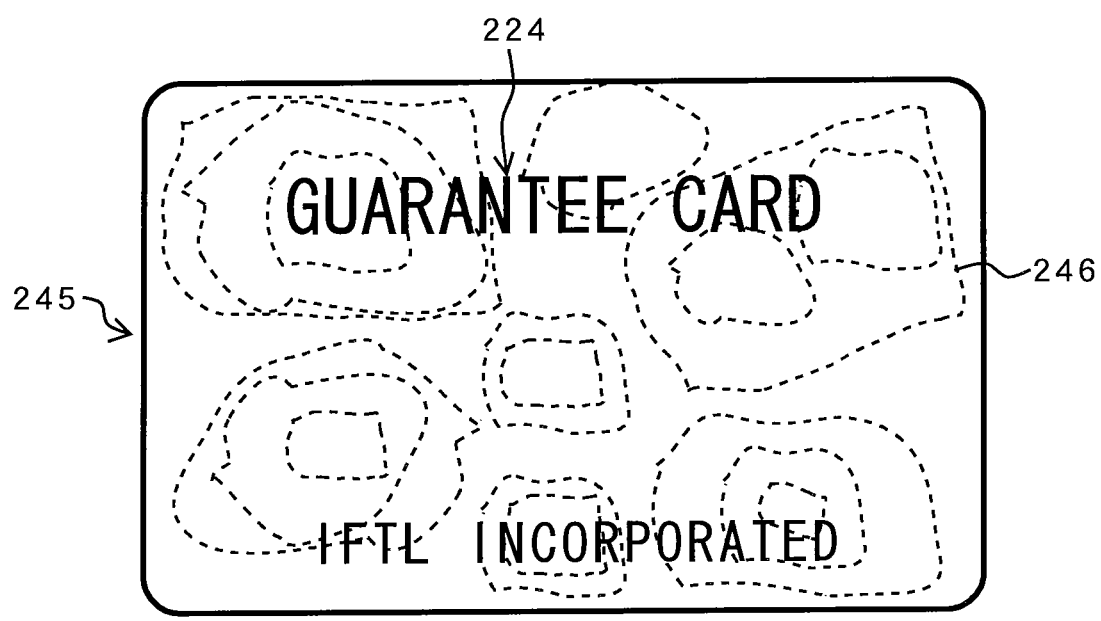
FIG. 33 shows Embodiment 6 of a certificate, the entire surface of which is the authentication verifying chip.

In the guarantee card 245 shown in FIG. 33, a material 246 such as resin having fluidity is spread and is then solidified in irregular forming, and the entire surface is covered by the resin.

If it is necessary to protect the resin covering the entire surface, a protective plate to cover the entire surface may be provided further. On the surface of the guarantee card, information 224 such as letters indicating that it is the certificate is provided.

Iridescence appears by this arrangement by chance.

Figure 34:
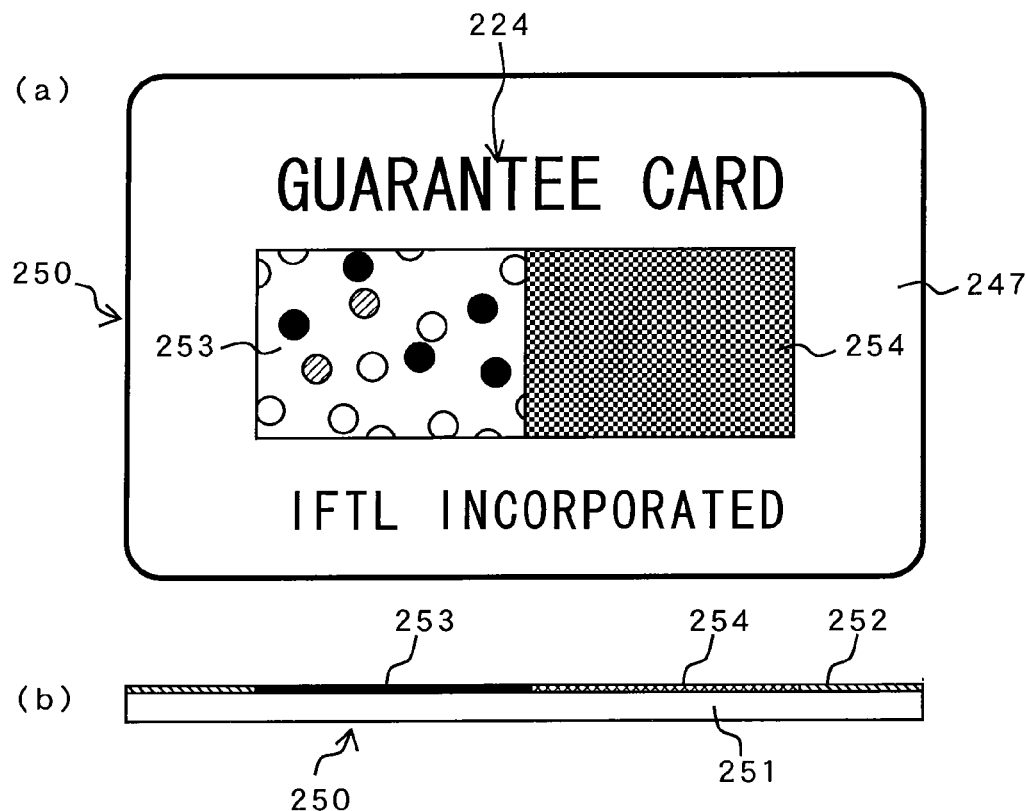
FIG. 34 shows an embodiment of a certificate having a storage medium.
Figure 35:
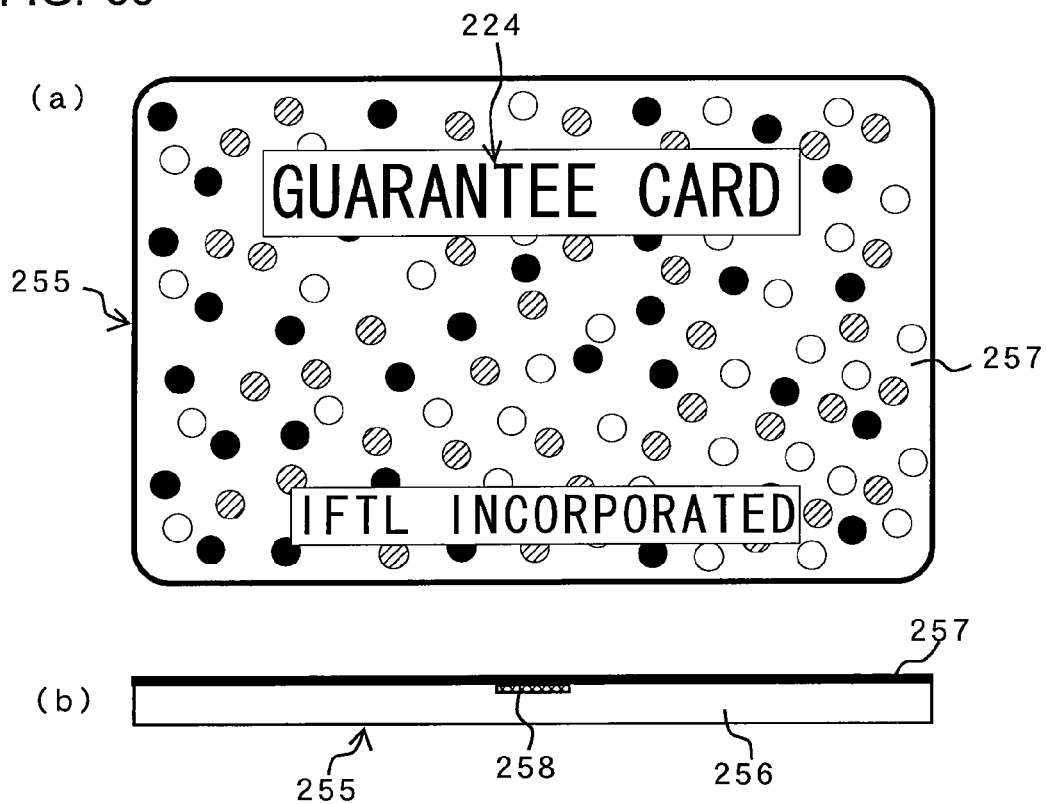
FIG. 35 shows a next embodiment of a certificate having a storage medium.

Referring to FIG. 34 and FIG. 35, description will be given below on embodiments of arrangements where in addition to the authentication verifying chip, the confirmation chip is mounted on the certificate as shown in FIG. 3 and FIG. 5.

Concerning the authentication verifying information to be read is the same as in the cases of the certificates shown in FIG. 28 to FIG. 33, and detailed description is not given here.

When the encrypted data for confirmation is correctly decrypted, it means that authentication verifying information of the authentication verifying chip corresponds to it. Therefore, the legitimacy of the certificate itself can be certified by using the confirmation data.

<Embodiment 7 of the Certificate Arrangement>

FIG. 34(*a*) is a general view of the certificate and FIG. 34(*b*) is its cross-sectional view.

On the guarantee card 250, the authentication verifying chip 253 and the confirmation chip 254 comprising colored two-dimensional barcode or the like where the authentication verifying information of the verifying chip 253 is digitized and encrypted and is stored are non-removably mounted at the center of the surface plate 252 mounted on the base plate 251. If it is necessary to protect the verifying chip 253 and the confirmation chip 254, a protective plate to cover the entire surface may be provided further.

On the surface of the guarantee card, information 224 such as letters indicating that it is the certificate is provided.

In the arrangement as given here, the verifying chip 253 and the confirmation chip 254 are mounted at the center of the surface plate 247, while the position and the size of the verifying chip are not limited to this example, and it can be placed at any position as desired.

<Embodiment 8 of the Certificate Arrangement>

FIG. 35 (*a*) is a general view of the certificate and FIG. 35 (*b*) is a cross-sectional view.

On the guarantee card 255, the authentication verifying chip 257 is non-removably mounted on the entire surface of the base plate 256. In case it is necessary to protect the authentication verifying chip 257, a protective plate to cover the entire surface is further provided. On the surface of the certificate, the letter information 224 or the like to indicate that it is a certificate is described.

At an adequate position on the base plate 256, a confirmation chip 258 such as an IC chip is mounted.

<Reading Device>

Referring to FIG. 36 to FIG. 43, description will be given on a reading device. Authentication verifying information carriers to be used on the authentication verifying chip can be all optically detected. With regard to the lighting source and the light detected, description will be given on the one using the iridescent substance as the authentication verifying information carrier, as a case using the iridescent substance is the simplest to explain. On the other cases of the authentication verifying information carrier, only the features different from the features when the iridescent substance is used will be described.

In these figures, the reference numeral 260 shows a base body; 261 a base plate; 263 an upper plate; and 262 an authentication verifying chip.

<Embodiment 1 of the Reading Device>

Figure 36:
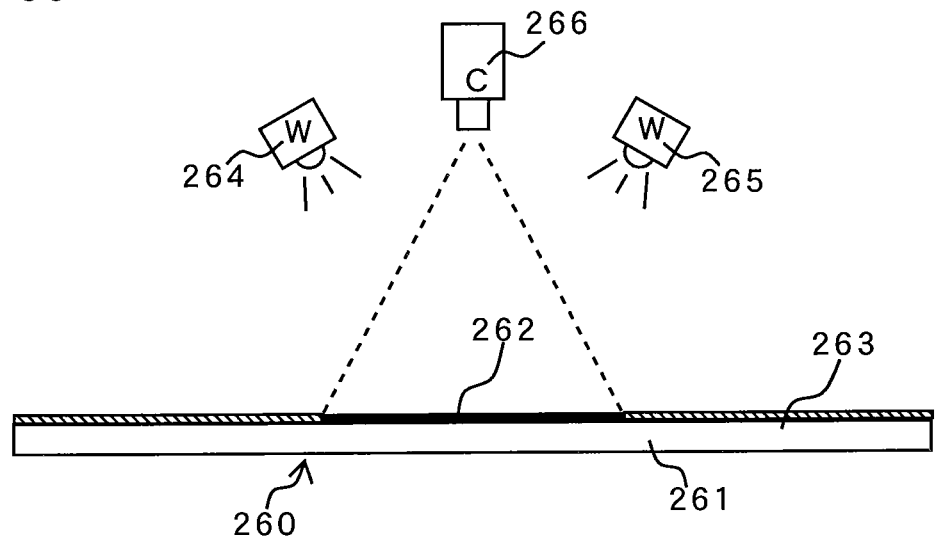
FIG. 36 shows Embodiment 1 of a reading device using a camera.

FIG. 36 shows a reading device to use an image pickup device, which is the most basic arrangement to read the authentication verifying chip as a plane.

Reference numerals 264 and 265 each represents a white lighting source to light the verifying chip 262, and 266 represents a camera to photograph it.

As the camera for photographing, a color camera such as the CCD camera is used, for instance. In this case, a white LED is used as the lighting source.

The type of the lighting source is not limited to the white LED, but other adequate lighting source may be used. Also, the number of the lighting source is not limited to one, but two or more lighting sources may be used.

The white LED gives quasi-white color through the combination of ultra-violet LED with fluorescence of R (red), G (green) and B (blue), through the combination of LEDs of R, G and B, or through the combination of blue LED with the yellow fluorescence. On the other hand, in the color camera, colors are separated by using a color filter.

Accordingly, the detection of a light according to the combination of the white LED and the color camera is limited to the color, which can be detected through the combination in use of the emitting color and the color filter.

When the embossed hologram is used as the authentication verifying information carrier, it is desirable to use a laser element for the lighting source.

When the fluorescent substance is used as the authentication verifying information carrier, UVLED can be used for the lighting source.

When the radioactive material is used as the authentication verifying information carrier, the lighting source is not used. A fluorescent plate is tightly mounted on the verifying chip, and the light emitted by scintillation is detected.

When the base body 260 is taken into a reading apparatus and is stopped, the verifying chip 262 is lighted by the lighting sources 264 and 265, and it is photographed by the camera 266, and the authentication verifying information on the verifying chip 262 is read.

<Embodiment 2 of the Reading Device>

Figure 37:
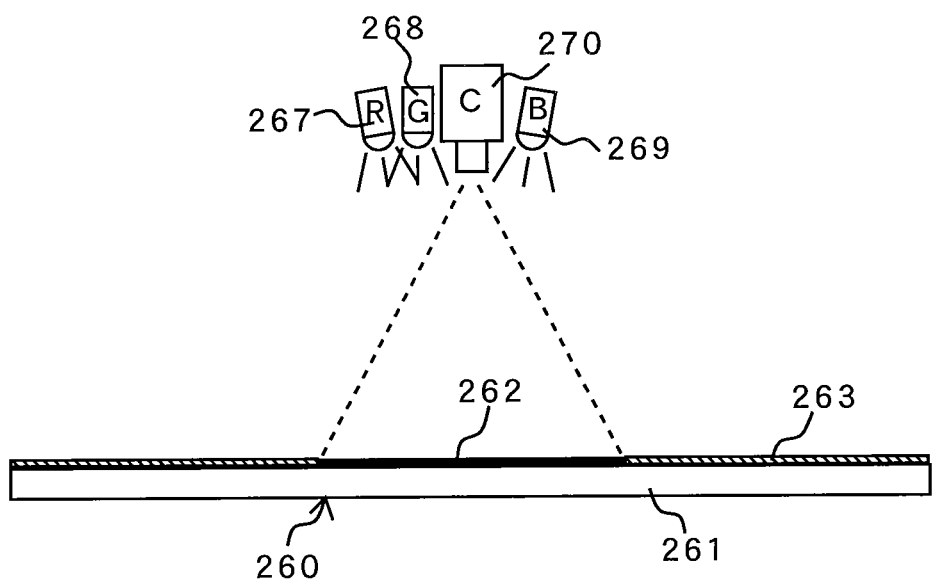
FIG. 37 shows Embodiment 2 of a reading device using a camera.

FIG. 37 shows Embodiment 2 of the reading device, which is a variation of the reading device shown in FIG. 36.

In this Embodiment 2, the white color is obtained by using a red LED 267, a green LED 268 and a blue LED 269 instead of the white LED, and a camera 270 of color camera or a monochrome camera is used.

The types of lighting sources are not limited to three types of read LED, green LED and blue LED. Also, the position of the arrangement and number of LEDs are determined as appropriate.

In the Embodiment 1 and in the Embodiment 2, an area to be lighted is not limited, and a detection area is limited. In addition, it is also possible to arrange to limit the lighting area and not to limit the detecting area.

<Embodiment 3 of the Reading Device>

Figure 38:
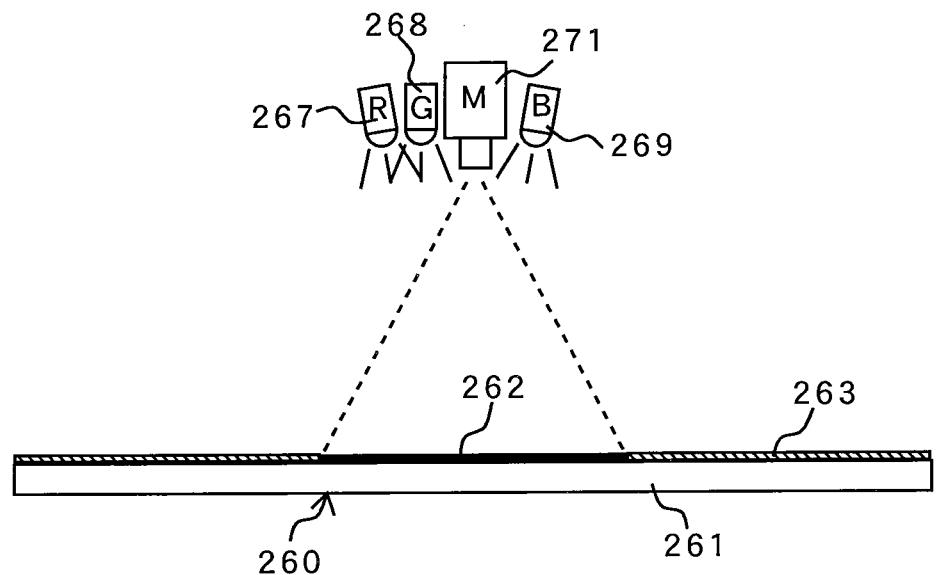
FIG. 38 shows Embodiment 3 of a reading device using a camera.

FIG. 38 shows Embodiment 3 of the reading device, which is a variation of the reading device shown in FIG. 37.

For the reading device, a monochrome camera 271 is used instead of a color camera 270.

The types of lighting sources are not limited to three types of red LED, green LED and blue LED. The position of the arrangement and number of LEDs are determined as appropriate.

A field-sequential-color system in which each of LEDs does not light at the same time but emits per color in sequence may be adopted.

In the Embodiment 1 and in the Embodiment 2, an area to be lighted is not limited, and the detection area is limited. In addition, it is also possible to arrange to limit the lighting area and not to limit the detecting area.

Figure 39:
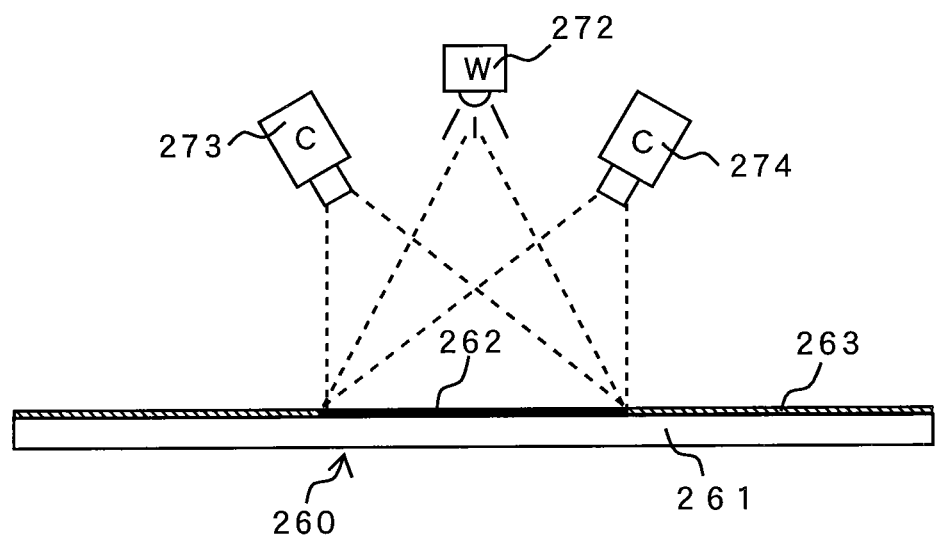
FIG. 39 shows Embodiment 4 of a reading device using cameras.

<Embodiment 4 of the Reading Device>FIG. 39 shows a reading device which is based on a concept different from that of the reading devices shown in FIG. 36 to Fig. 38.

The authentication verifying information of the verifying chip has three-dimensional structure in many cases. Therefore, it is possible to obtain different types of information by photographing from different directions.

In this reading device, the lighting source 272 and two cameras 273 and 274 are used for photographing. The lighting source 272 is a white diode as used in FIG. 36 or LEDs such as red LED, green LED, blue LED, etc. as used in FIG. 37 and FIG. 38. The position of the arrangement, the type and the number are determined as appropriate.

<Embodiment 5 of the Reading Device>

Figure 40:
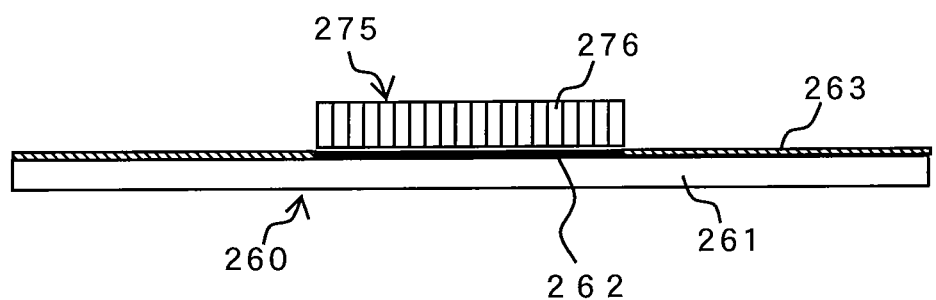
FIG. 40 shows an embodiment of a reading device not using a camera.
Figure 40:
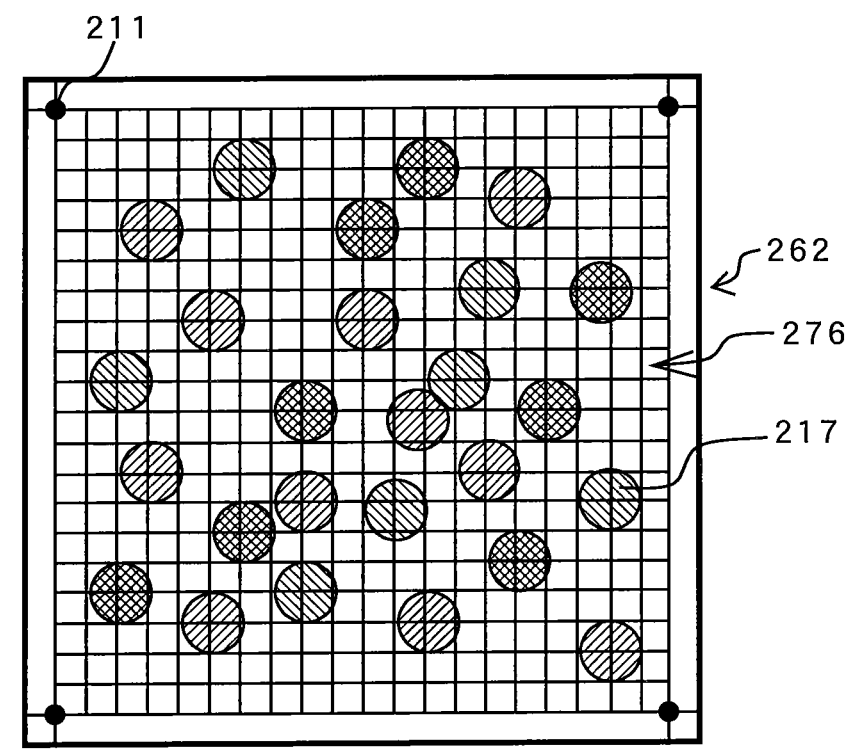

FIG. 40 shows a reading device to read the authentication verifying chip as a plane. FIG. 40(a) shows a general arrangement of a detecting unit of a reading device for the card authentication verifying and FIG. 40(b) is an enlarged view to show the corresponding relation between the card and the reading device in planar reading.

The reference numeral 275 represents a light emitting/detecting element matrix where a light emitting/detecting elements 276, based on the combination of small type light detecting elements such as the photodiode, photo-transistor, CCD, light detecting elements, etc., with the lighting sources including red LED, green LED, blue LED, etc. are configured in a planar shape and in such a size to cover up the verifying chip 262.

The type and the number of the lighting sources are not limited to the three red, green, and blue LEDs.

When the embossed hologram is used as the authentication verifying information carrier, it is desirable to use a laser element for the lighting source.

When the fluorescent substance is used as the authentication verifying information carrier, UVLED can be used for the lighting source.

When the radioactive material is used as the authentication verifying information carrier, the lighting source is not used. A fluorescent plate is tightly mounted on the verifying chip, and the light emitted is detected by scintillation.

When the card 260 is taken into the reading apparatus and is stopped, the verifying chip 262 is positioned under the light emitting/detecting element matrix 275 in planar shape. Under this condition, the light emitting/detecting elements comprised in the light emitting/detecting element matrix 275 and arranged in planar shape detect the light reflected from the iridescent substance disposed in the verifying chip 262, and the authentication verifying information is read.

The pattern of the electric signals obtained depends on the arrangement of the iridescent substance. By comparing the information thus obtained, it is possible to verify the individual verifying chip 262, i.e., each of the cards 260.

The accuracy of the reading of the arrangement pattern of the iridescent substance on the verifying chip 262 depends on the resolving capability of the light emitting/detecting elements matrix 275 disposed in planar shape.

By adopting a field-sequential-color system where elements emit the light per color in sequence, the number of the light detecting elements can be reduced extensively.

<Embodiment 6 of the Reading Device>

Figure 41:
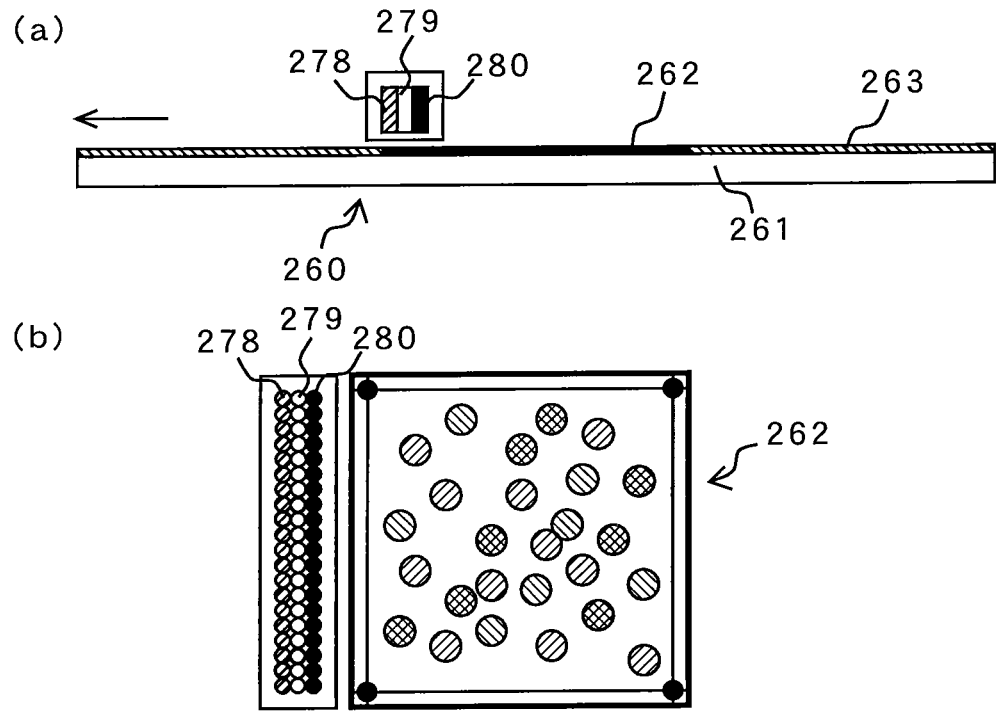
FIG. 41 shows a 2nd embodiment of a reading device not using a camera.

FIG. 41 shows a reading device for reading a plane of the authentication verifying chip as an assembly of lines.

FIG. 41(a) shows general arrangement of a detecting unit of the reading device for the verifying chip and FIG. 41(b) is a drawing to show the corresponding relation between a card and a light detecting unit for linear detecting.

In a container having a width slightly longer than the width in moving direction of the verifying chip 262, a red light emitting/detecting elements array 278, a green light emitting/detecting elements array 279, and a blue light emitting/detecting elements array 280 are placed.

These red light emitting/detecting elements array 278, the green light emitting/detecting elements array 279 and the blue light emitting/detecting elements array 280 are given here as examples, and any combination of colors can be used.

When the embossed hologram is used as the authentication verifying information carrier, it is desirable to use a laser element for the lighting source.

When the fluorescent substance is used as the authentication verifying information carrier, UVLED of one row can be used for the lighting source.

When the radioactive material is used as the authentication verifying information carrier, the lighting source is not used. A fluorescent plate is tightly mounted on the verifying chip and the light emitted is detected by scintillation.

Unlike the reading devices shown in FIG. 36 to FIG. 40, in the reading device of this embodiment, the authentication verifying information on the verifying chip 262 is read—not after the verifying chip is taken into the reading apparatus and is stopped—but during the time when it is taken into the reading apparatus.

When the card 260 is taken into the reading apparatus, it passes under the light emitting/detecting elements arrays 278, 279 and 280. At this moment, the linearly arranged array of the light emitting/detecting elements detects the light reflected by the iridescent substances disposed in the verifying chip 262. Electric signals generated in association with the movement of the verifying chip 262 are detected continuously in analog manner by each light detecting element or discontinuously in digital manner, or scanned as an image like using a facsimile machine or a scanner, and then, the authentication verifying information of the verifying chip 262 is read.

The accuracy of the reading of the arrangement pattern of the iridescent substance in the verifying chip 262 depends on the resolving capability of the light emitting/detecting elements arrays 278, 279 and 280.

By adopting a field-sequential-color system where elements emit the light per color in sequence, the number of the light detecting elements can be reduced extensively.

<Embodiment 7 of the Reading Device>

Figure 42:
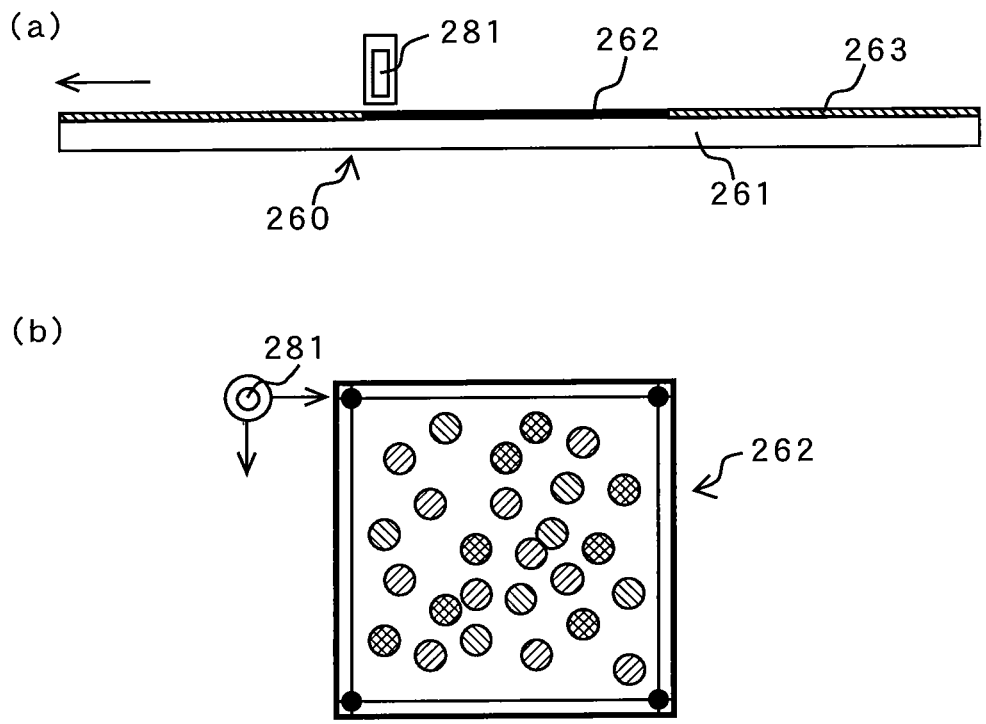
FIG. 42 shows a 3rd embodiment of a reading device not using a camera.

FIG. 42 shows a reading device, which reads a plane as an assembly of dots.

FIG. 42(*a*) shows general arrangement of the relation between a card and an authentication verifying chip reading device and FIG. 42(*b*) is a drawing to explain a reading method.

The reference numeral 281 represents a light emitting/detecting element, which moves in a direction to perpendicularly cross the the direction that the card 260 is taken into the reading apparatus.

For the movement in the direction, which perpendicularly crosses the direction that the card 260 is taken into the apparatus, either of appropriate methods, for instance, a pseudo-linear movement based on the rotation on one point as a fulcrum, a linear movement based on the conversion from rotary movement to linear movement and a linear movement by means of a linear motor can be adopted.

<Embodiment 8 of the Reading Device>

Figure 43:
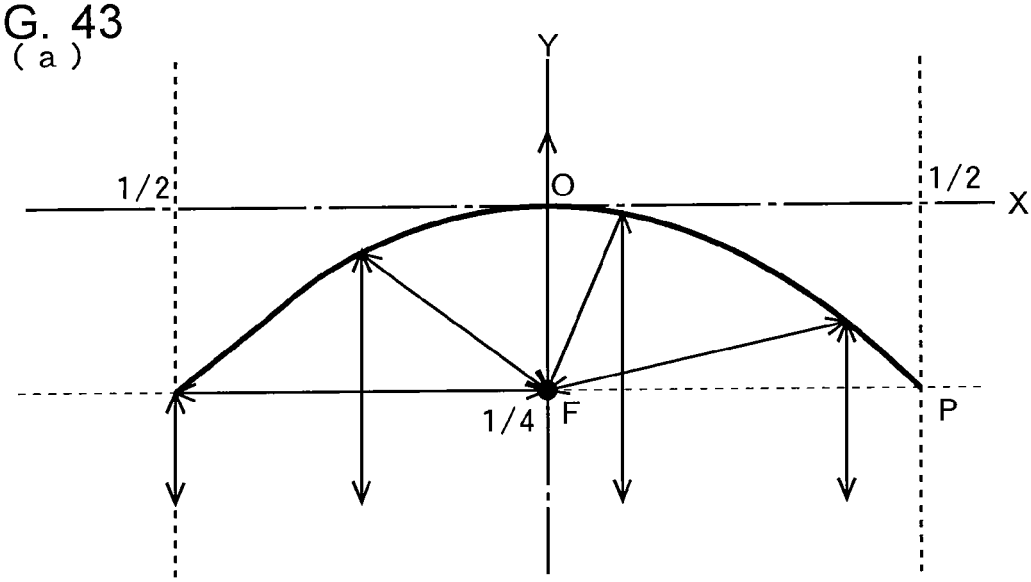
FIG. 43 shows a 4th embodiment of a reading device not using a camera.
Figure 43:
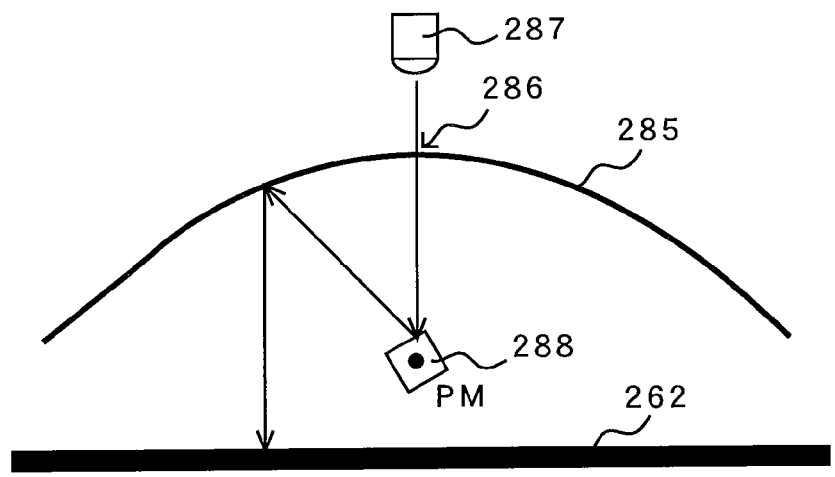
Figure 43:
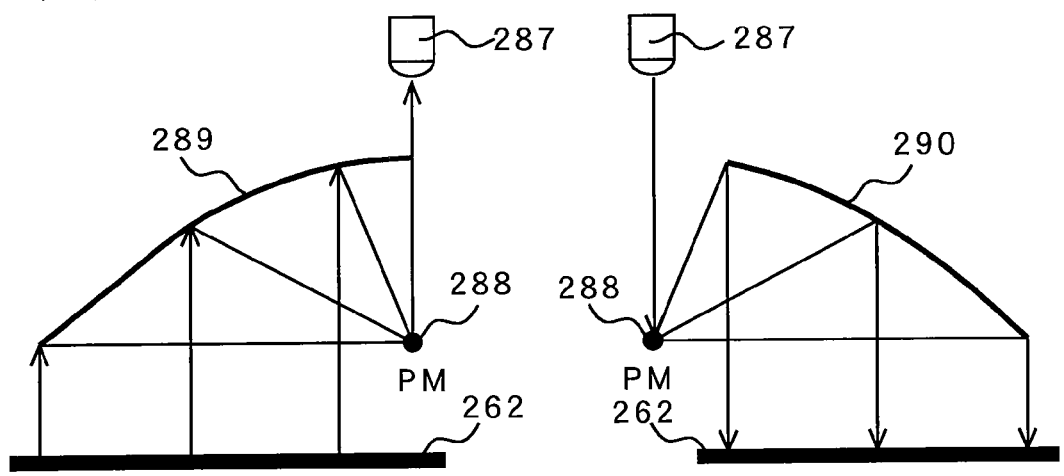

FIG. 43 shows a reading device of a new arrangement.

Optical scanning means to use the reflection of the laser beam by a rotating polygonal pillar mirror is adopted in the device such as a laser beam printer. In this scanning means, optical scanning can be performed only by the rotating movement of the polygonal pillar mirror (polygonal mirror).

As means for obtaining parallel beams, paraboloid is used in a reflecting telescope and a parabola antenna.

FIG. 43(*a*) shows the relation between the paraboloid and parallel beams. In this figure, the symbol X represents X-axis and the symbol Y is Y-axis, which is orthogonal to X-axis and the symbol O represents the origin. The symbol P represents a parabola, which is expressed as: $Y=-X^2$. This parabola has a focal point F at a position where $X=0$ and $Y=-\frac{1}{4}$. All the straight lines running in parallel to Y-axis are concentrated to the focal point F when reflected by the parabola P. On the contrary, the straight lines starting from the focal point F runs in parallel to Y-axis when reflected by the parabola P.

FIG. 43(*b*) shows a basic arrangement of the reading device based on this principle.

In FIG. 43(*b*), the reference numeral 285 is a reflecting mirror in form of a paraboloid. It is designed in a cylindrical shape with its length running in a direction perpendicularly crossing the drawing surface. Also, at a position to correspond to the origin of FIG. 43(*a*), a hole 286 is formed, which allows the light to pass at a position to match the origin of FIG. 43(*a*). Further, at the focal point of the reflecting parabolic cylinder mirror 285, a polygonal mirror 288 is disposed, which has a rotation axis in parallel to an axis in extending direction thereof and has a polygonal reflecting surface. The reference numeral 287 represents a light emitting/detecting element; and 262 an authentication verifying chip, which is an object of the reading.

The light emitted in parallel to Y-axis in FIG. 43(*a*) from the light emitting/detecting element 287 as shown by a solid line passes through the hole 286 and enters the polygonal mirror 288, which is disposed at the focal point of the reflecting parabolic cylinder mirror 285. After entering the polygonal mirror 288, the light enters the reflecting parabolic cylinder mirror 285 in association with the rotation of the polygonal mirror 288. Then, it is reflected in a direction, which is in parallel to Y-axis and incidents the verifying chip 292.

The light shown by a solid line in a direction in parallel to Y-axis in FIG. 43(*a*) from the verifying chip 262 is reflected by the reflecting parabolic cylinder mirror 285 and enters the polygonal mirror 288 disposed at the focal point. The light, thus entered the polygonal mirror 285 is reflected, passes through the hole 286, and enters the light emitting/detecting element 287. In contrast, the light reflected in a direction different from Y-axis from the verifying chip 262 does not enter the polygonal mirror even reflected at the reflecting parabolic cylinder mirror 285.

As it can be understood from the description as given above, among the light components reflected from the verifying chip 262, only the light running in parallel to Y-axis enters the polygonal mirror 285. Accordingly, by rotating the polygonal mirror 285, the light entering the light emitting/detecting element is selected, and the light reflected condition on the verifying chip 262 can be identified.

In the reading device shown in FIG. 43(*b*), the light from the verifying chip, which is on rear side of the polygonal mirror 285 as seen from the light emitting/detecting element 287, cannot be read. It can be so designed that necessary information is not written on this portion or that unnecessary information is written on this portion. According to the arrangement as shown in FIG. 43(*c*) and FIG. 43(*d*), there is no portion which corresponds to the rear side of the polygonal mirror 285 and all of the information as written can be read out.

FIG. 43(*c*) shows a basic arrangement for this purpose, and one-half of the reflecting parabolic cylinder mirror is used. In this figure, the reference numeral 289 represents a reflecting mirror in form of a paraboloid. It is formed in semi-cylindrical shape having its length in a direction, which runs perpendicularly to the drawing surface only on the portion where the value of X is negative in FIG. 43 (*a*). The hole shown in FIG. 43 (*b*) is not formed here because it is not necessary. Further, a polygonal mirror 288, which has a rotation axis running in parallel to the axis in extending direction of the reflecting half-parabolic cylinder mirror 289 and has a polygonal reflecting surface, is disposed at the focal point of the reflecting half-parabolic cylinder mirror 289. The reference numeral 287 represents a light emitting/detecting element; and 262 the verifying chip.

The light shown by a solid line as emitted in a direction in parallel to Y-axis in FIG. 43(*a*) from the light emitting/detecting element 287 enters the polygonal mirror 288, which is positioned at the focal point of the reflecting half-parabolic cylinder mirror 289. After entering the polygonal mirror 288, the light enters the reflecting half-parabolic cylinder mirror 289 in association with the rotation of the polygonal mirror. Then, it is reflected in the direction in parallel to Y-axis and incidents the verifying chip 262.

The light reflected in a direction in parallel to Y-axis in FIG. 43(*a*) at the verifying chip 262 is reflected at the reflecting half-parabolic cylinder mirror 289 and enters the polygonal mirror 288 disposed at the focal point. After entering the polygonal mirror 288, the light is reflected and enters the light emitting/detecting element 287.

On this reading device, the authentication verifying chip 262 on the portion on rear side of the polygonal mirror 288 as seen from the light emitting/detecting element 287 is only its end portion. Accordingly, the portion which cannot be read has little influence.

Further, as shown in FIG. 43(*d*), by adopting an offset arrangement to reduce the central portion of the reflecting partial paraboloid cylindrical mirror 290, the portion not readable by the polygonal mirror 288 can be totally eliminated, and all the information as written in all portions of the verifying chip 262 can be read out.

<Authentication Verification>

Figure 44:
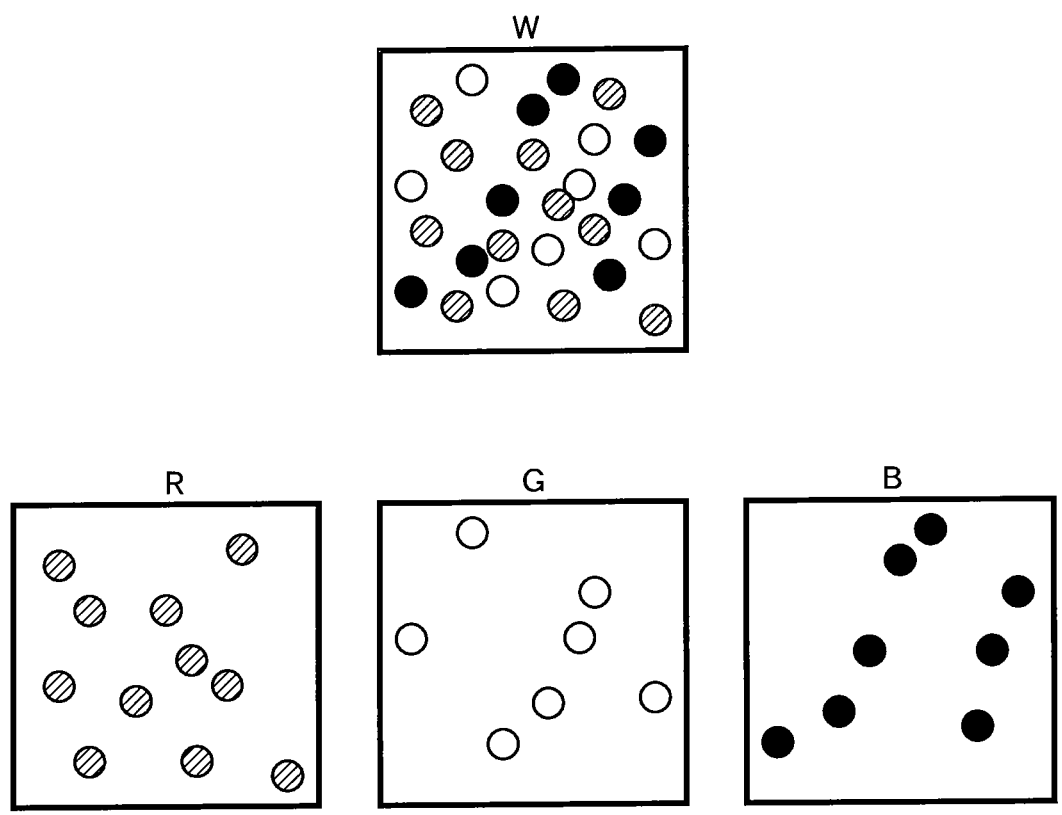
FIG. 44 shows drawings to explain the reading process.
Figure 45:
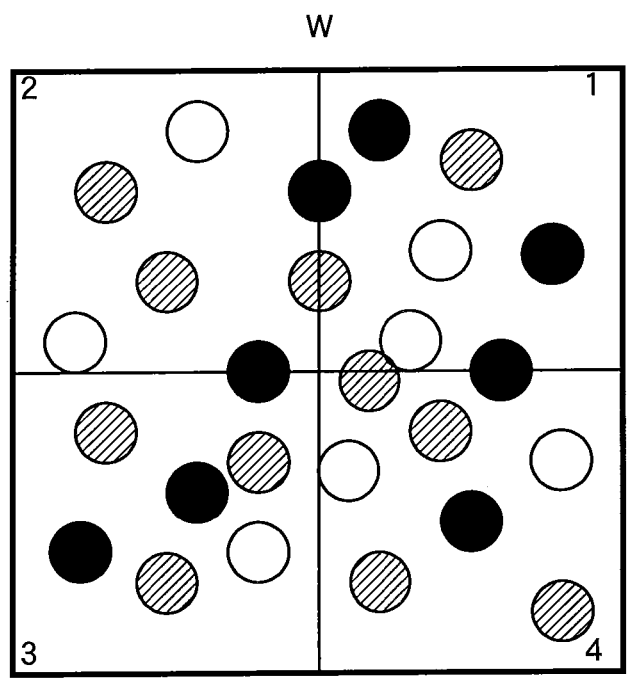
FIG. 45 shows drawings to further explain the reading process of FIG. 44.
Figure 45:
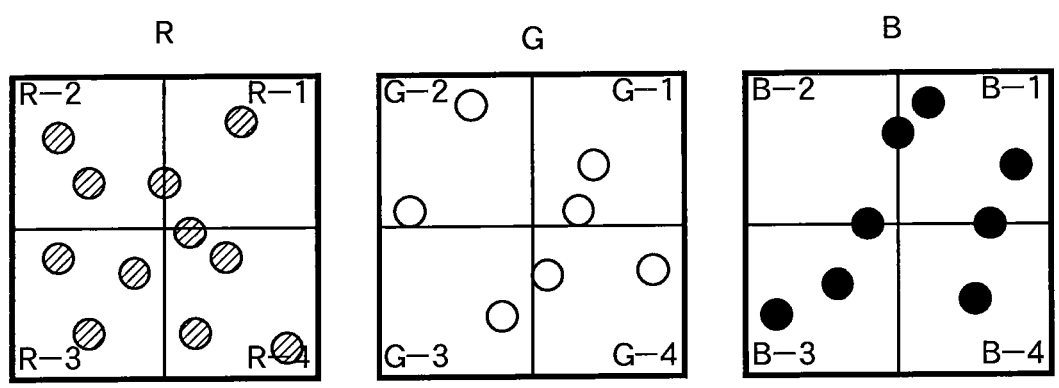
Figure 46:
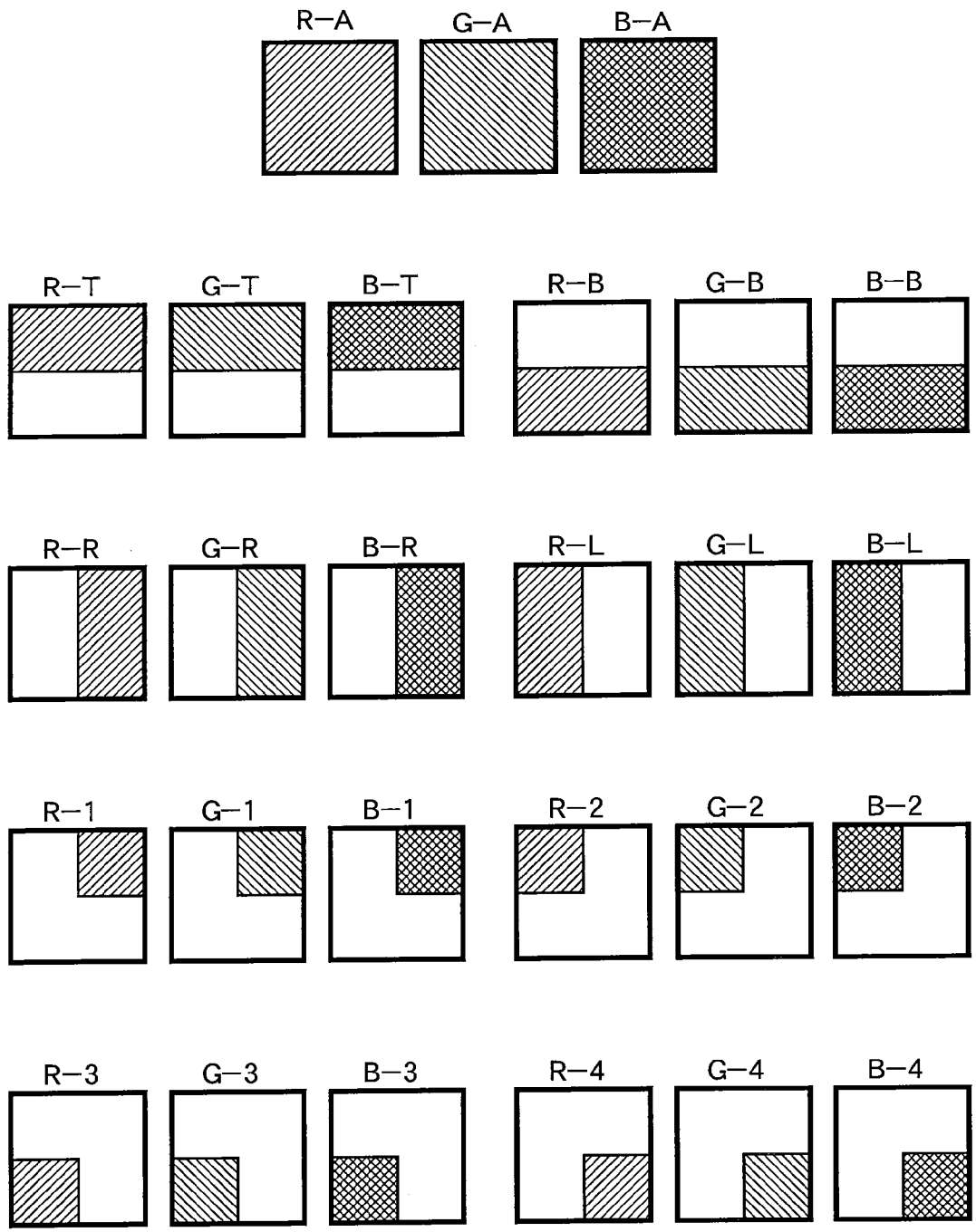
FIG. 46 shows drawings to yet further explain the reading process of FIG. 44.

Referring to FIG. 44 to FIG. 46, description will be given below on the authentication judging method by taking an example in a case where the reading device of FIG. 36 is used.

Authentication verifying information carriers to be used on the authentication verifying chip can be all optically detected. With regard to the lighting source and the light detected, description will be given on the one using the iridescent substance as the authentication verifying information carrier, as a case using the iridescent substance is the simplest to explain.

In FIG. 44, the figure indicated as W (White) shows an example where the authentication verifying chip is photographed through the combination of a white LED and a color camera and where iridescent substances of all colors including R, G and B are detected.

The drawings indicated by R, G and B underneath show conditions of iridescent substances, showing each of the colors separated by means of a color filter of the camera.

In FIG. 45 and FIG. 46, each symbol of W, R, G and B corresponds to W, R, G and B of FIG. 44 respectively. In each figure, the image is divided in four portions: the first quadrant is referred by a numeral 1; the second quadrant is referred by a numeral 2; the third quadrant by a numeral 3; and the fourth quadrant by a numeral 4.

As the other manner of dividing, divided by a diagonal line may be adopted, or further, subdivisions can be conceived when necessary.

In this method, a pattern of the images divided is not detected. Instead, an average light intensity of the iridescence, i.e., a total light intensity, is detected.

In these figures, the symbol [−A] indicates the total light intensity of the color in all portions of the authentication verifying chip. The symbol [−T] indicates the total light intensity of the color in the upper half of the authentication verifying chip, the symbol [−B] indicates a total light intensity of the color in the lower half of the authentication verifying chip, the symbol [−R] indicates a total light intensity of the color in the right half of the authentication verifying chip, the symbol [−L] indicates a total light intensity of the color in the left half of the authentication verifying chip, and the symbols [−1] to [−4] each indicates a total light intensity of the color in each of quadrants of the authentication verifying chip.

By the procedure as described above, it is possible to identify information of the total light intensity, i.e., 9 types of information for each of the colors R, G and B, and 27 types of information in total can be identified.

Through the comparison of the total light intensity information as obtained from the authentication verifying chip at the time of producing and the total light intensity information as obtained from the verifying chip when the verifying chip is read, the authenticity of the authentication verifying chip can be judged.

The white color obtained by the white LED is a pseudo-white color. Also, the white color detected by the color camera is a pseudo-white color because a color filter is used.

Accordingly, the detection of the light through the combination of the white LED and the color camera is limited only to the light, which can be detected by the combination of the light emitting color and the color filter. In this respect, care must be taken as to which type of white LED is used or which type of color camera is used.

To satisfy and define the strictness of the color used, it is desirable to use color information, not as a type of information based on visual sense, but as a physical color information, i.e., information based on the wavelength.

In addition to a visible light LED used as an LED for a lighting source, when an ultra-violet LED and an infrared LED are used in combination or selectively, illegitimate reading can be excluded.

Further, laser beams with different wavelengths or a non-linear device may be used, and the light of the frequency, which is obtained as a difference between frequencies or a sum of frequencies, can be used.

As other items to be used for the judgment, there are the value of the highest luminance in each area, number of pixels where luminance is higher than a predefined value, number of assemblies of bright pixels, length of contour of bright pixel, characteristics of bright pixel, weighted point of dispersed bright points, peak position and peak value in longitudinal and lateral histogram on an binarized image, and histogram of each pixel through weighting of luminance information.

<Method for Producing the Certificate>

Referring to FIG. 47 to FIG. 52, description will be given on a method for producing a certificate where the authentication verifying information is mounted.

<Embodiment 1 of the Method for Producing the Certificate>

Figure 47:
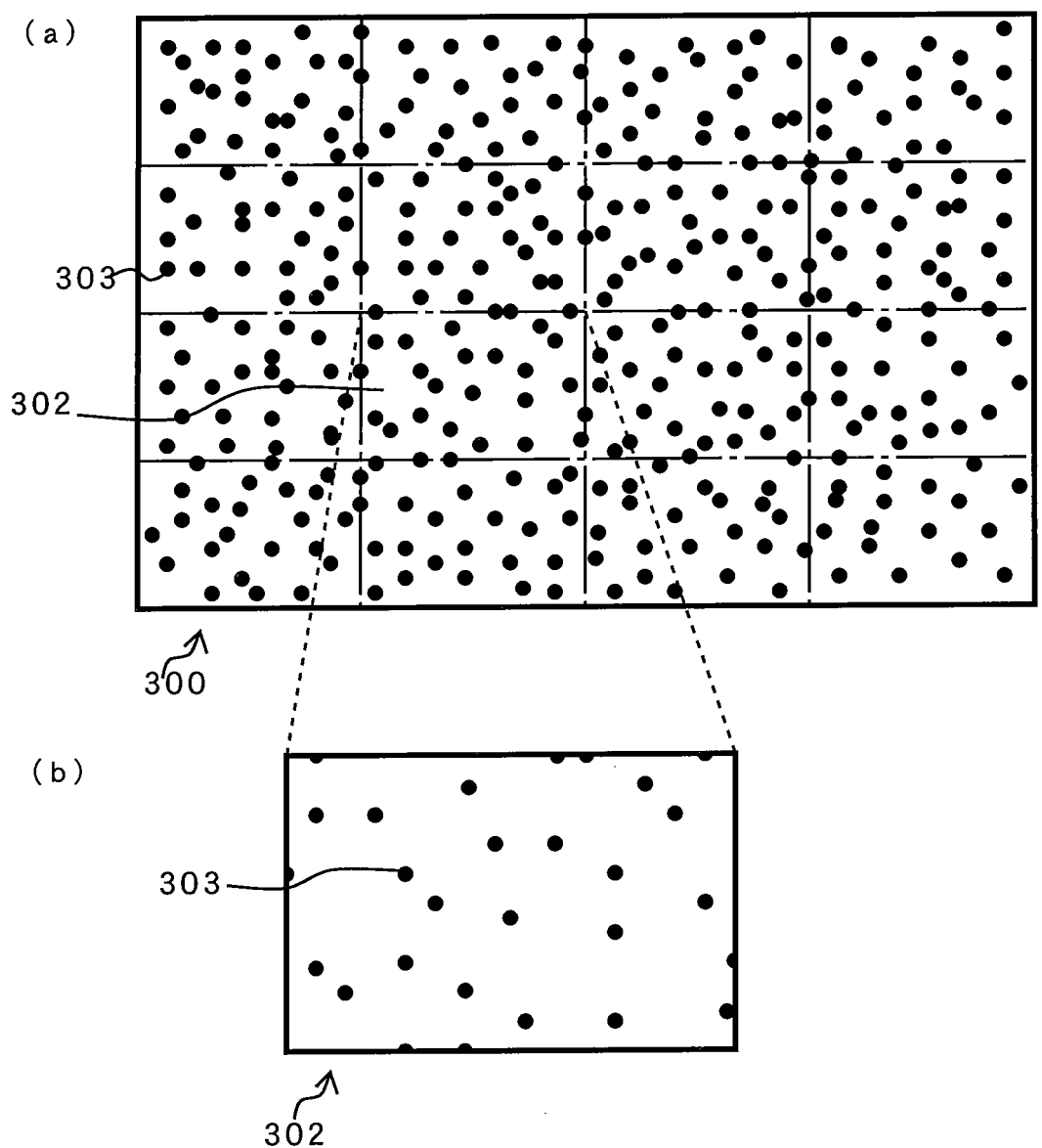
FIG. 47 shows Embodiment 1 of a method for producing a certificate.

FIG. 47 shows a method for producing a certificate where the information carrier is arranged over the entire surface as shown in FIG. 29 to FIG. 35.

This producing method can also be applied when the authentication verifying chip 222 shown in FIG. 28 is produced.

In FIG. 47(*a*), the reference numeral 300 represents an original plate, which has an area for 16 certificates.

The information carrier 303 is scattered over this original plate 300.

The original plate 300 where the information carrier 303 is scattered is cut out as shown in FIG. 47(*b*) and a base plate 302 of the certificate with authentication verifying information is prepared.

By performing printing or embossing on this certificate base plate 303, the certificate is prepared.

The information carrier 303 is scattered over the original plate 300 and the scattering is determined by chance. In the information carrier shown in FIG. 14 to FIG. 25, which has three-dimensional structure as scattered—in particular, when hologram or iridescence utilizing the interference of light as shown in FIG. 16 to FIG. 26 is used, copying cannot be made by means such as photographing. There is no other method than transcribing to obtain the same scattering, but it is not possible to transcribe the same.

The base plate, obtained by cutting, may be set smaller and it can be used as an authentication verifying chip.

<Embodiment 2 of the Method for Producing the Certificate>

Figure 48:
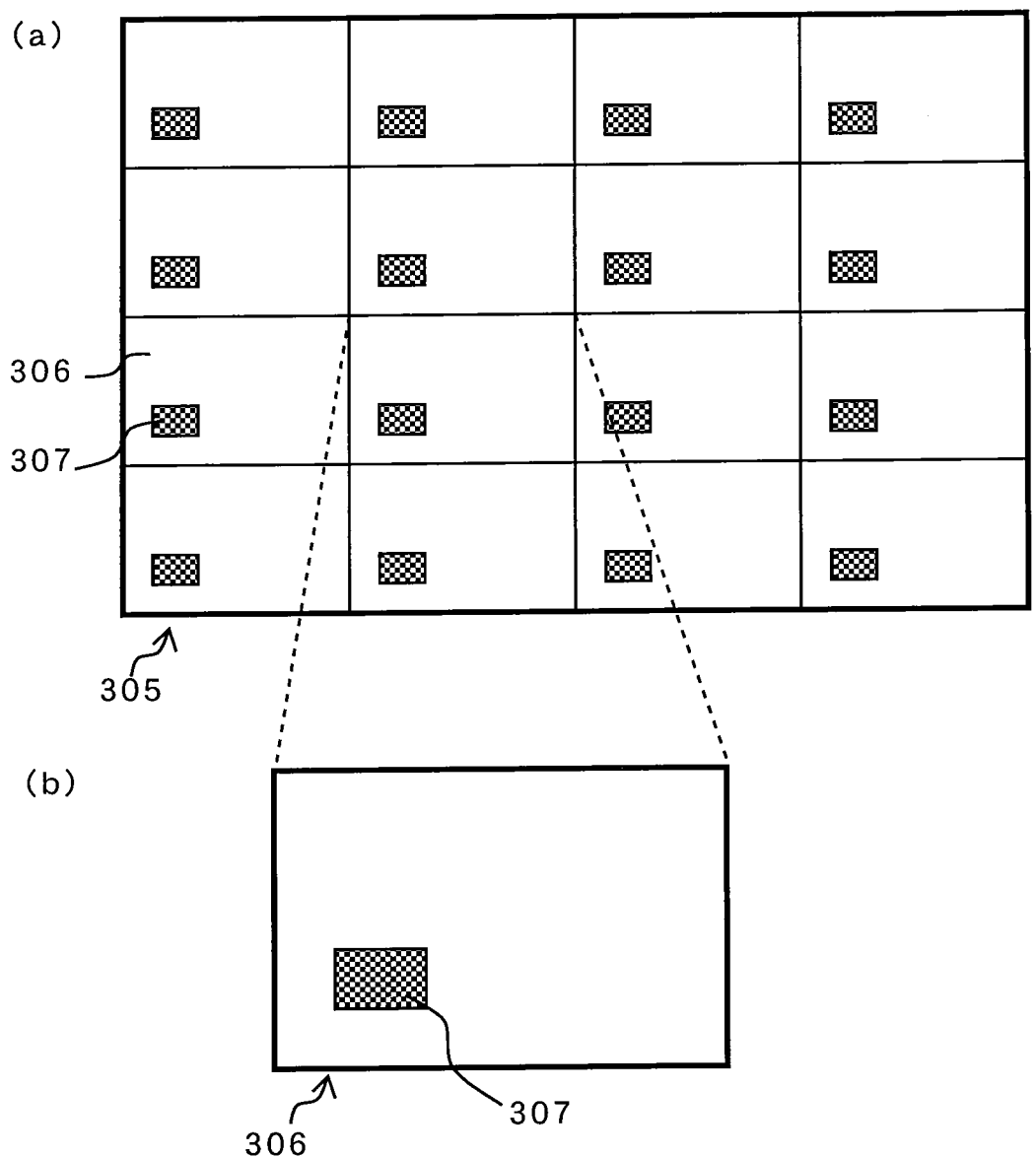
FIG. 48 shows Embodiment 2 of a method for producing a certificate.

FIG. 48 shows a method for producing the certificate where the authentication verifying chip is arranged on a part of it as shown in FIG. 28.

In FIG. 48(a), the reference numeral 305 represents an original plate having an area for 16 certificates.

By scattering the information carrier on a part of the original plate 305 using a mask or the like, the original plate of the certificate with the authentication verifying chip 307 can be obtained. By cutting this original plate as shown in FIG. 48(b), the certificate base plate 306 with the verifying chip 307 can be obtained.

By performing printing or embossing on this certificate base plate 306, the certificate is prepared.

Because the information carrier is scattered over the original plate, and the scattering is determined by chance.

In the information carrier shown in FIG. 14 to FIG. 25, which has three-dimensional structure as scattered—in particular, when hologram or iridescence utilizing the interference of light as shown in FIG. 16 to FIG. 26 is used, copying cannot be made by means such as photographing. There is no other method than transcribing to obtain the same scattering, but it is not possible to transcribe the same.

<Embodiment 3 of the Method for Producing the Certificate>

Figure 49:
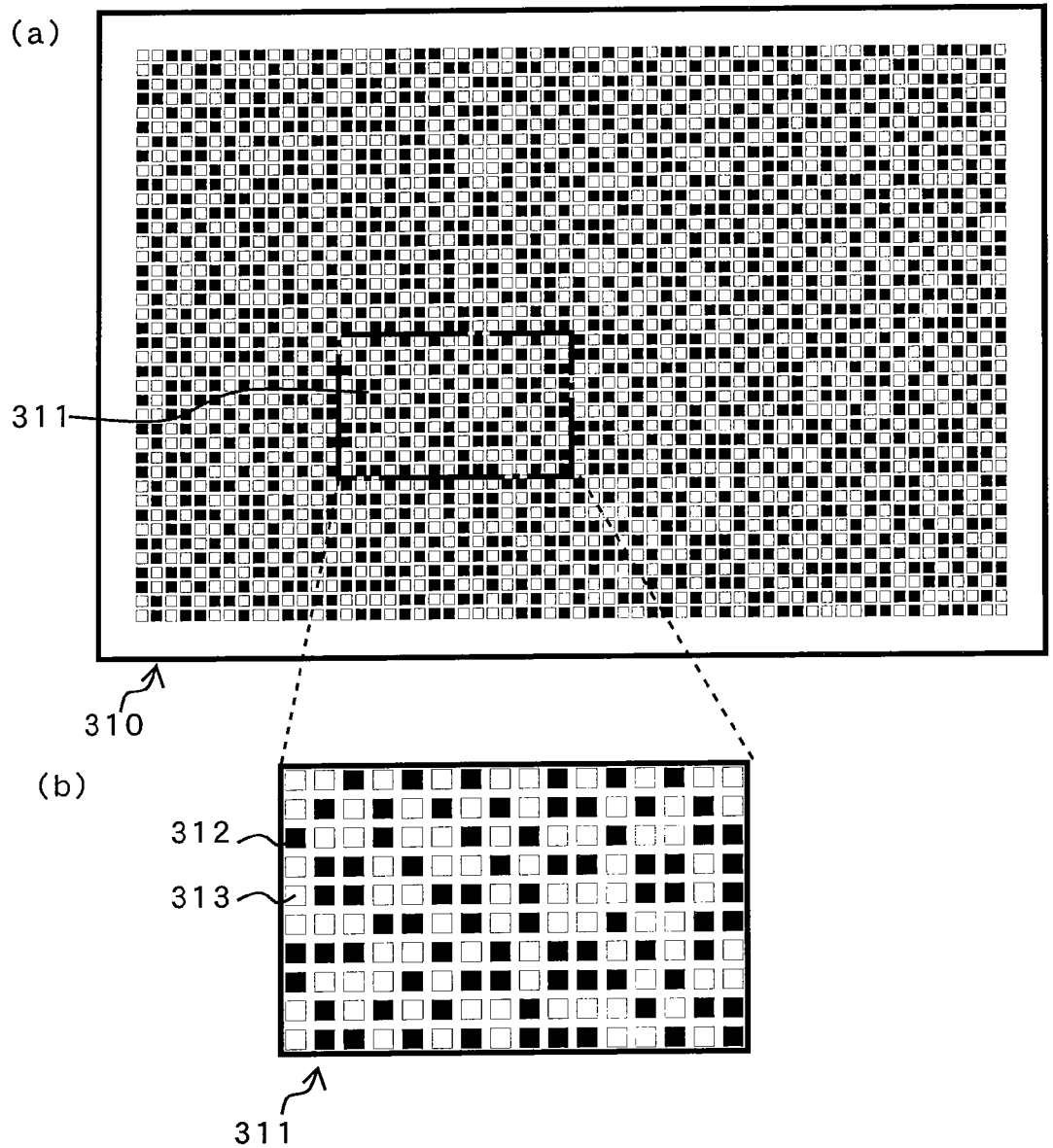
FIG. 49 shows Embodiment 3 of a method for producing a certificate.

FIG. 49 shows a method for producing a certificate, in which the arrangement of the information carrier is fixed and only the information of the information carrier is determined by chance.

Figure 16:
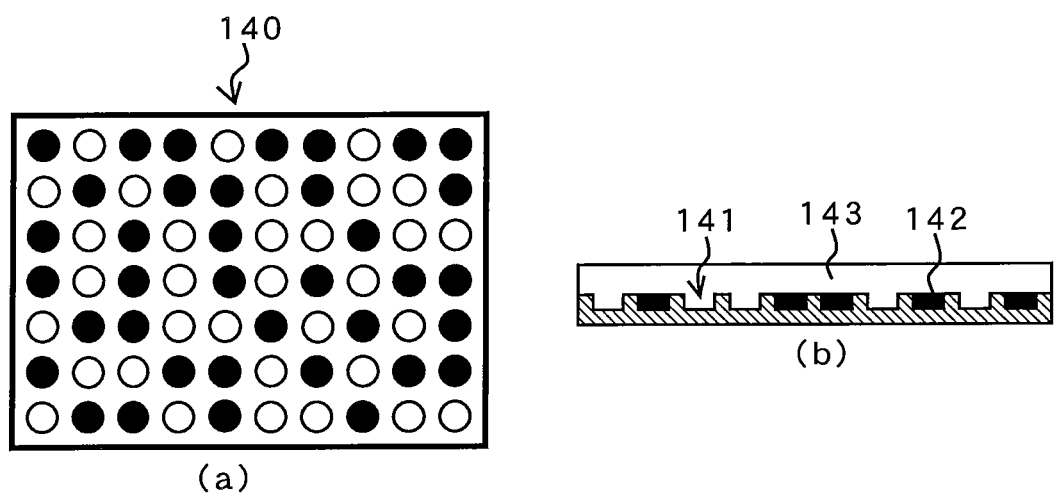
FIG. 16 shows Embodiment 3 of an authentication verifying chip of unicolor embossed hologram by the regular arrangement and formed by chance.
Figure 23:
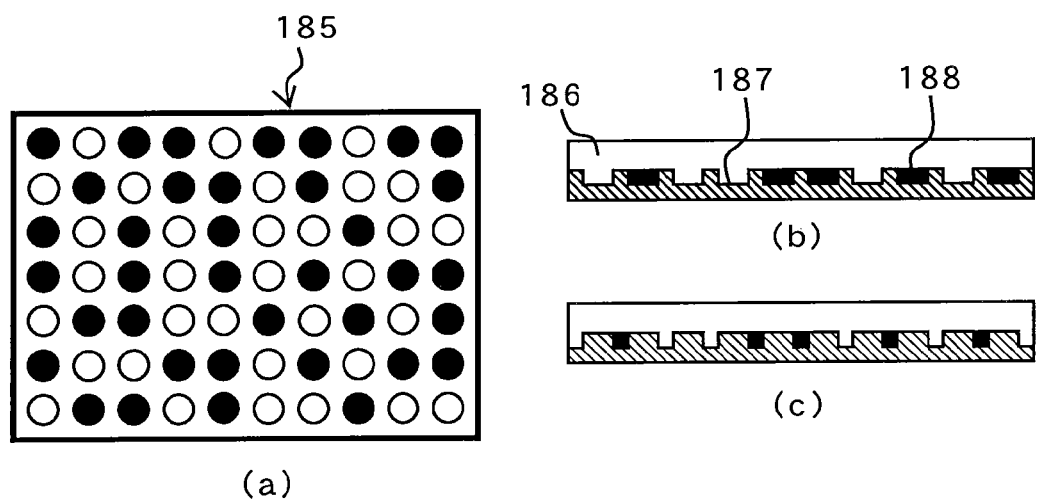
FIG. 23 shows Embodiment 9 of a unicolor authentication verifying chip by using iridescent pieces regularly arranged.
Figure 24:
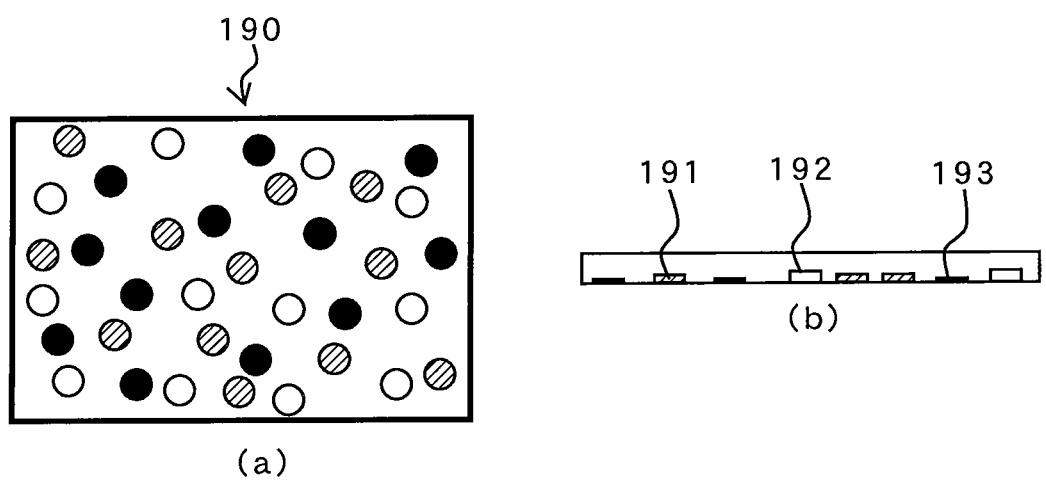
FIG. 24 shows Embodiment 10 of an authentication verifying chip multi-colored by using iridescent pieces arranged by chance.

In FIG. 49 (a), the reference numeral 310 represents an original plate, which has an area for 16 certificates. On the original plate 310, pits as shown in FIG. 16 or Fig. 23 are regularly arranged over the entire surface.

On this original plate, transparent yet-to-be-solidified resin is scattered and it is solidified to prepare the original plate of the certificate with the authentication verifying information. This original plate is cut as shown in FIG. 49 (b) and the base plate 311 of the certificate with the authentication verifying information is obtained.

Printing or embossing processing is performed on the certificate base plate 311, and a certificate is prepared.

<Embodiment 4 of the Method for Producing the Certificate>

Figure 50:
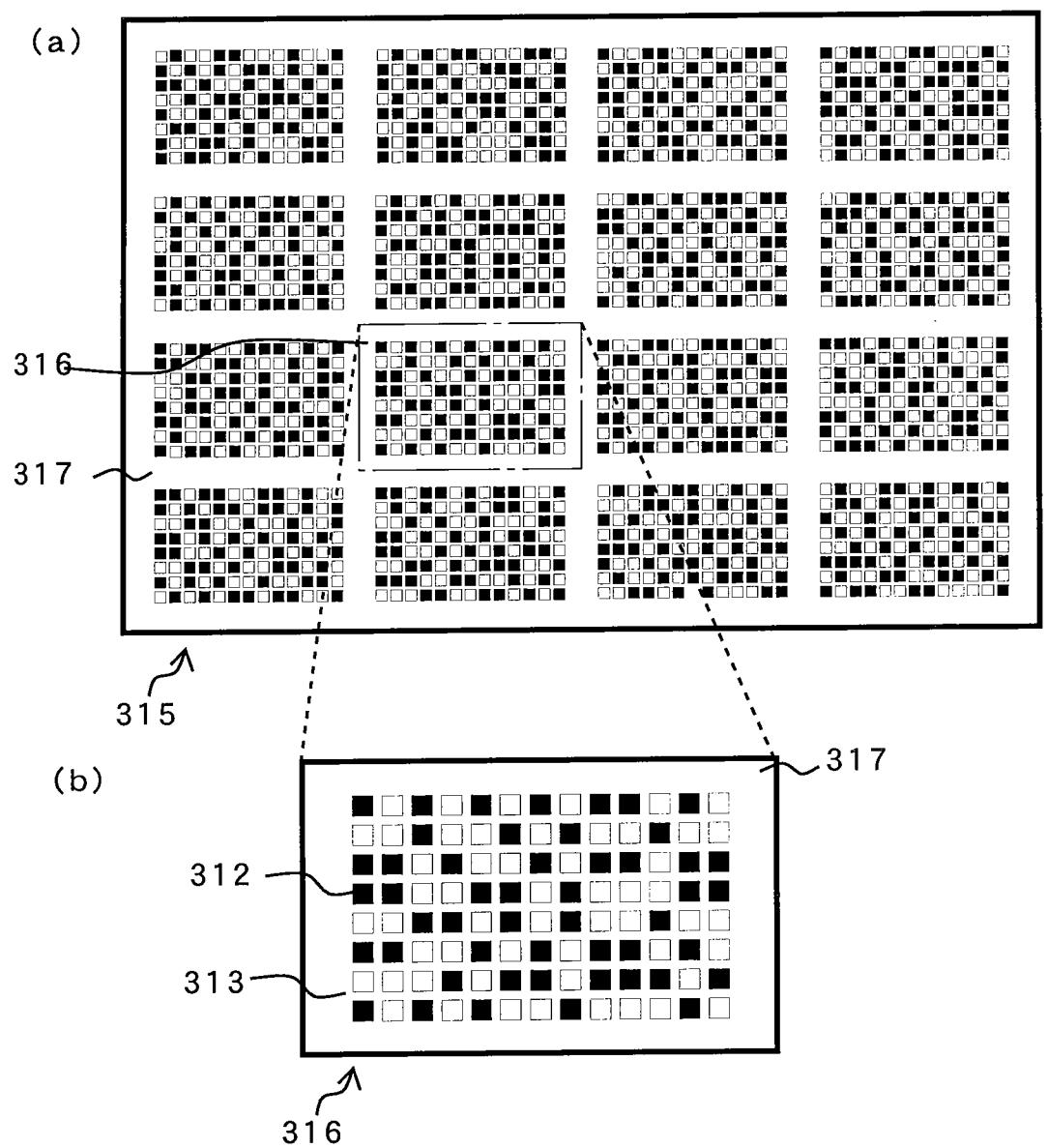
FIG. 50 shows Embodiment 4 of a method for producing a certificate.

FIG. 50 shows a producing method in another arrangement of the certificate as shown in FIG. 49.

In FIG. 50 (a), the reference numeral 315 represents an original plate having an area for 16 certificates. On the original plate 315, pits as shown in FIG. 16 or Fig. 23 are regularly arranged over the entire surface except the most outer periphery of the certificate.

On this original plate, transparent yet-to-be-solidified resin is scattered and it is solidified. In this way, the original plate of the certificate with authentication verifying information is obtained. This original plate is cut as shown in FIG. 50 (b) and the base plate 316 of the certificate with the authentication verifying information is obtained.

Printing or embossing processing is performed on the certificate base plate 316, and the certificate is obtained.

<Embodiment 5 of the Method for Producing the Certificate>

Figure 51:
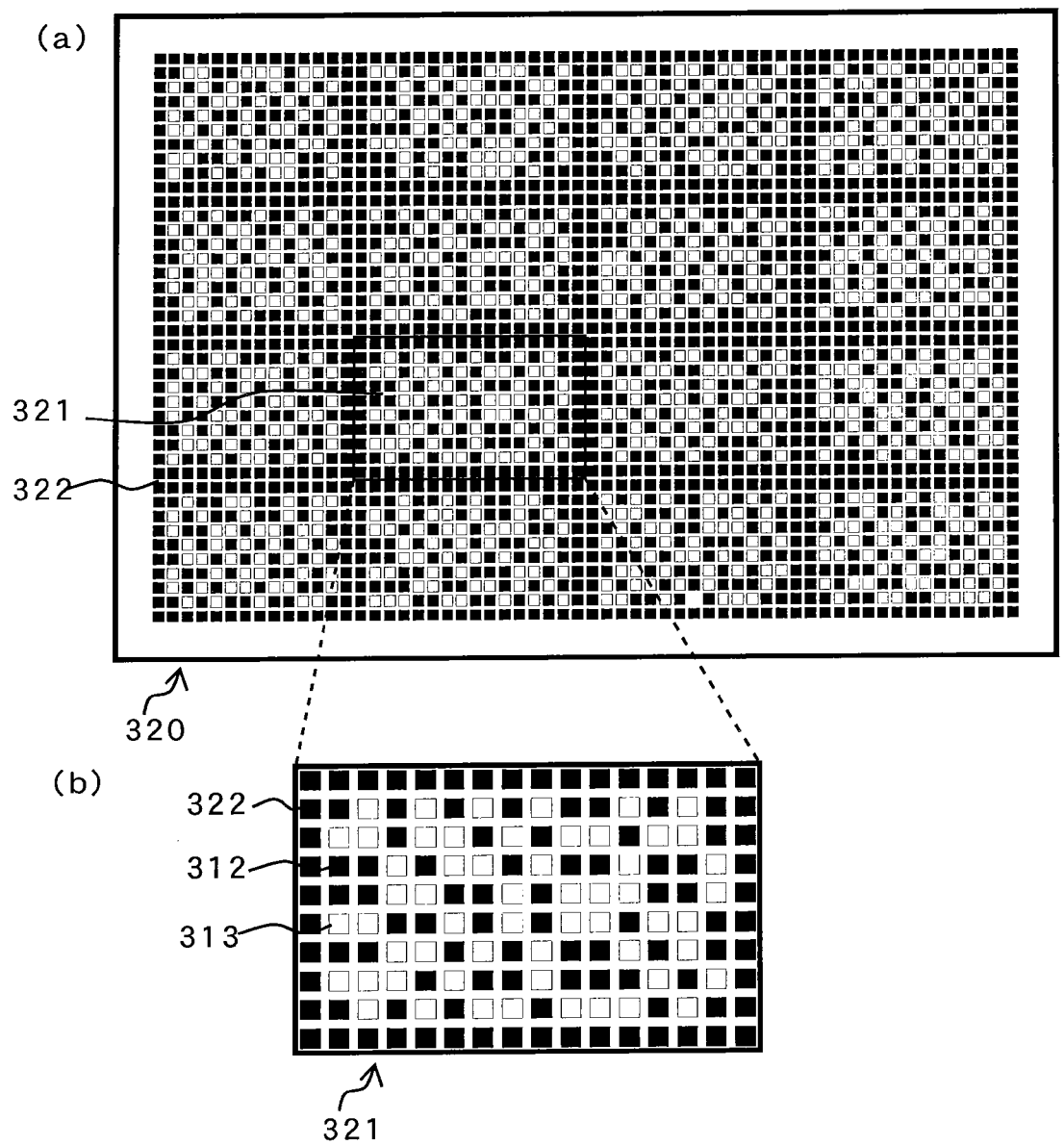
FIG. 51 shows Embodiment 5 of a method for producing a certificate.

FIG. 51 shows a producing method in yet another arrangement of the certificate as shown in FIG. 49.

In FIG. 51 (a), the reference numeral 320 represents an original plate having an area for 16 certificates. On the original plate 320, the pits as shown in FIG. 16 or FIG. 23 are regularly arranged over the entire surface of the certificate.

The pits disposed in the area corresponding to a part of the outermost peripheral portion of the certificate are filled by non-solidifying resin, or they are masked.

On this original plate, transparent yet-to-be-solidified resin is scattered and it is then solidified, and an original plate of the certificate with the authentication verifying information is obtained. This original plate is cut as shown in FIG. 51(b) and the base plate 321 of the certificate with the authentication verifying information is obtained.

Printing or embossing processing is performed on the certificate base plate 321, and the certificate is obtained.

<Embodiment 6 of the Method for Producing the Certificate>

Figure 52:
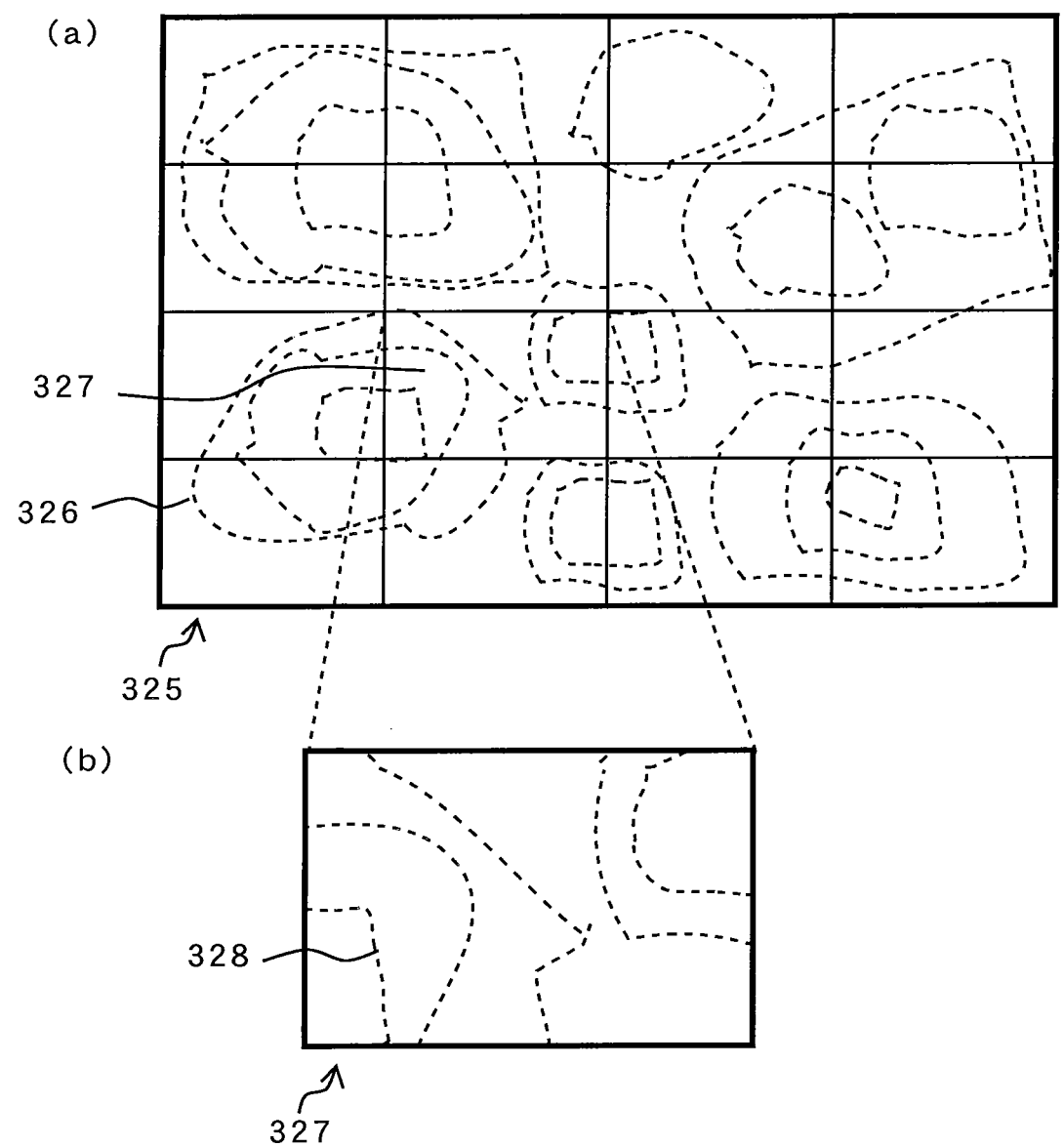
FIG. 52 shows Embodiment 6 of a method for producing a certificate.

FIG. 52 shows a method for producing the certificate where the information carrier is disposed over the entire surface as shown in FIG. 35.

Figure 25:
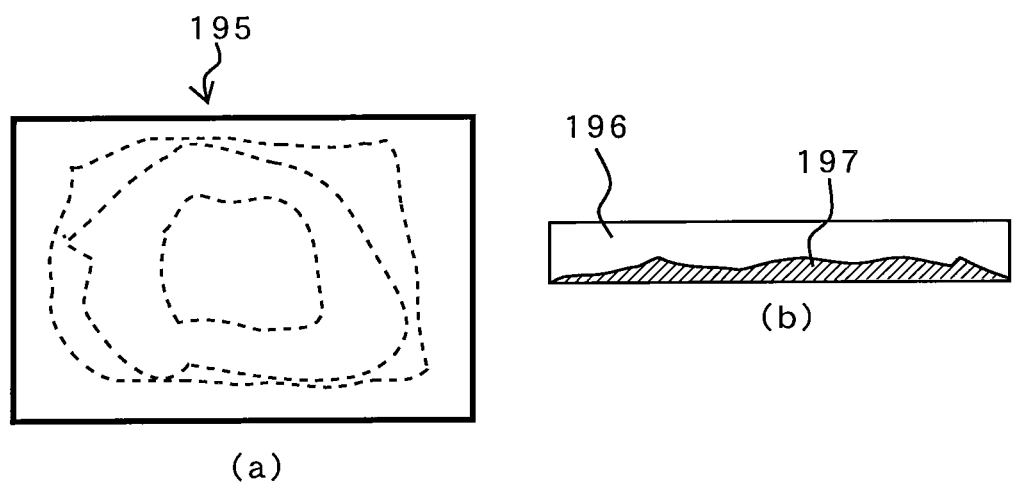
FIG. 25 shows Embodiment 11 of an authentication verifying chip prepared by the iridescence coating.
Figure 26:
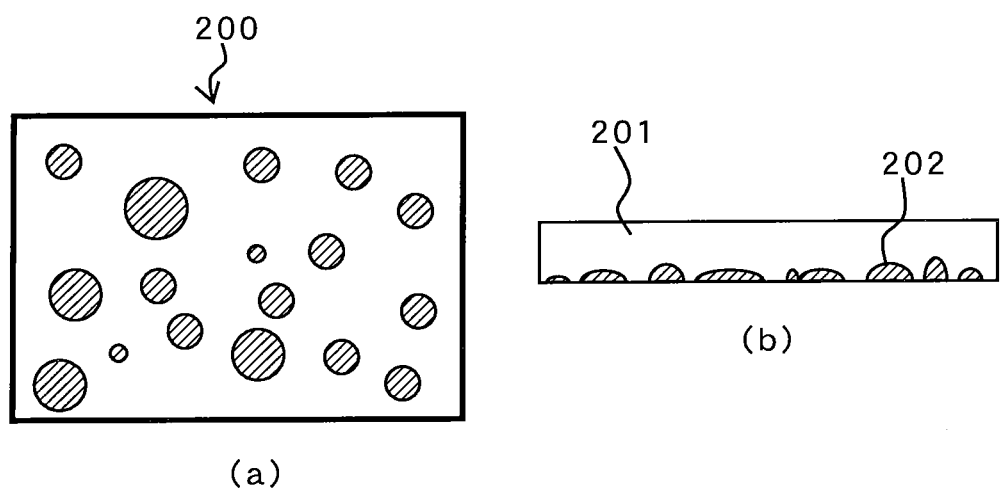
FIG. 26 shows Embodiment 12 of an authentication verifying chip multi-colored of iridescence formed by sprayed liquid drops.

This producing method can also be applied when the authentication verifying chip 195 as shown in FIG. 25 is produced.

In FIG. 52(a), the reference numeral 325 represents an original plate having an area for 16 certificates.

On this original plate, transparent yet-to-be-solidified resin 326 is scattered or spread, and it is solidified, and then, the original plate of the certificate with the authentication verifying information is obtained. This original plate is cut as shown in FIG. 52 (b) and the base plate 327 of the certificate with the authentication verifying information is obtained.

Printing or embossing processing is performed on the certificate base plate 327, and the certificate is obtained.

The yet-to-be-solidified resin 326 is scattered or spread on the original plate 325, and its shape is determined by chance.

It is impossible to copy the shape of the resin, which is scattered or spread by means such as photographing. There is no other way but to transcribe to obtain the same scattering/spread, but it is impossible to transcribe the same.

For this reason, it is very effective to use hologram or iridescence utilizing the interference of light as shown in FIG. 16 to FIG. 26, and it is impossible to falsify or forge the certificate itself.

Industrial Applicability

The authentication verification based on the combination of the certificate and the object to be certified as described above can fulfill functions to find false or forged brand-name products, or to identify stolen goods.

By using the functions to certify the authenticity of the certificate itself, the method can fulfill functions to verify the authentication of a card such as a bank card and a credit card itself.

The invention claimed is:

1. An authentication verifying system, comprising:
   a set of a certificate and an object to be certified;
   an authentication verifying chip non-removably mounted on said certificate and storing first authentication verifying information which is obtained by chance and is copy-unable; and
   said object to be certified being mounted non-removably a storage medium, where said first authentication verifying information is encrypted using a first crypt key of authorities that issue the certificate and certify the object to generate encrypted-by-first-crypt-key first authentication verifying information that is stored, wherein, said first authentication verifying information and said encrypted-by-first-crypt-key first authentication verifying information are read;

said encrypted-by-first-crypt-key first authentication verifying information is decrypted by using the first crypt key of said authorities; and the corresponding relation between said certificate and said object to be certified is confirmed by comparing said first authentication verifying information thus read with said decrypted first authentication verifying information as decrypted from said encrypted-by-first-crypt-key first authentication verifying information.

2. An authentication verifying system according to claim 1, wherein said certificate and said object to be certified are integrated.

3. An authentication verifying system according to claim 1, wherein said certificate and said object to be certified are separated from each other.

4. An authentication verifying system according to claim 1, wherein:

a storage medium, where said first authentication verifying information is encrypted by using a second crypt key of the authorities to encrypted-by-second-crypt-key first authentication verifying information and is stored, is further mounted non-removably on said certificate;

said encrypted-by-second-crypt-key first authentication verifying information is further read;

said encrypted-by-second-crypt-key first authentication verifying information is decrypted by the second crypt key of the authorities;

compare the first authentication verifying information of said certificate and the first authentication verifying information thus decrypted from said encrypted-by-second-crypt-key first authentication verifying information; and the corresponding relation between said certificate and said object to be certified is confirmed.

5. An authentication verifying system according to claim 4, wherein said first crypt key and said second crypt key are the same crypt key.

6. An authentication verifying system according to claim 4, wherein said first crypt key and said second crypt key are crypt keys different from each other.

7. An authentication verifying system according to claim 1, wherein:

a storage medium, storing second authentication verifying information which is obtained by chance and is copy-unable, is further mounted non-removably on said object to be certified;

a storage medium, where said second authentication verifying information is encrypted by using a second crypt key of said authorities to encrypted-by-second-crypt-key second authentication verifying information is stored, is further mounted non-removably on said certificate;

said encrypted-by-second-crypt-key second authentication verifying information is decrypted by said second crypt key;

said encrypted-by-first-crypt-key first authentication verifying information is decrypted by using said first crypt key;

said first authentication verifying information is compared with the first authentication verifying information thus decrypted from said encrypted-by-first-crypt-key first authentication verifying information; said second authentication verifying information is compared with the second authentication verifying information thus decrypted from said encrypted-by-second-crypt-key second authentication verifying information; and the corresponding relation between said certificate and said object to be certified is confirmed.

8. An authentication verifying system according to claim 7, wherein said first authentication verifying information and said second authentication verifying information are the same authentication verifying information.

9. An authentication verifying system according to claim 8, wherein said first crypt key and said second crypt key are crypt keys different from each other.

10. An authentication verifying system according to claim 8, wherein said first crypt key and said second crypt key are the same crypt key.

11. An authentication verifying system according to claim 7, wherein said first authentication verifying information and said second authentication verifying information are the different authentication verifying information.

12. An authentication verifying system according to claim 11, wherein said first crypt key and said second crypt key are crypt keys different from each other.

13. An authentication verifying system according to claim 11, wherein said first crypt key and said second crypt key are the same crypt key.

* * * * *